(12) United States Patent
Mitragotri et al.

(10) Patent No.: US 12,533,315 B2
(45) Date of Patent: Jan. 27, 2026

(54) COMPOSITIONS COMPRISING AT LEAST ONE IONIC LIQUID, A POLYPEPTIDE, AND AT LEAST ONE NON-IONIC SURFACTANT FOR PROTEIN DELIVERY

(71) Applicant: PRESIDENT AND FELLOWS OF HARVARD COLLEGE, Cambridge, MA (US)

(72) Inventors: Samir Mitragotri, Lexington, MA (US); Naoya Ohmori, Togane (JP)

(73) Assignee: PRESIDENT AND FELLOWS OF HARVARD COLLEGE

( * ) Notice: Subject to any disclaimer, the term of this patent is extended or adjusted under 35 U.S.C. 154(b) by 938 days.

(21) Appl. No.: 17/435,169

(22) PCT Filed: Feb. 25, 2020

(86) PCT No.: PCT/US2020/019639
§ 371 (c)(1),
(2) Date: Aug. 31, 2021

(87) PCT Pub. No.: WO2020/180534
PCT Pub. Date: Sep. 10, 2020

(65) Prior Publication Data
US 2022/0144914 A1 May 12, 2022

Related U.S. Application Data

(60) Provisional application No. 62/812,290, filed on Mar. 1, 2019.

(51) Int. Cl.
*A61K 9/08* (2006.01)
*A61K 47/12* (2006.01)
*A61K 47/18* (2017.01)
*A61K 47/26* (2006.01)
*C07K 14/605* (2006.01)
*C07K 16/18* (2006.01)

(52) U.S. Cl.
CPC ............... *A61K 9/08* (2013.01); *A61K 47/12* (2013.01); *A61K 47/186* (2013.01); *A61K 47/26* (2013.01); *C07K 14/605* (2013.01); *C07K 16/18* (2013.01); *C07K 2317/34* (2013.01); *C07K 2317/55* (2013.01)

(58) Field of Classification Search
None
See application file for complete search history.

(56) References Cited

U.S. PATENT DOCUMENTS

| | | | |
|---|---|---|---|
| 3,536,809 A | 10/1970 | Applezweig | |
| 3,598,123 A | 8/1971 | Zaffaroni | |
| 3,845,770 A | 11/1974 | Theeuwes et al. | |
| 3,916,899 A | 11/1975 | Theeuwes et al. | |
| 4,008,719 A | 2/1977 | Theeuwes et al. | |
| 5,059,595 A | 10/1991 | Le Grazie | |
| 5,073,543 A | 12/1991 | Marshall et al. | |
| 5,120,548 A | 6/1992 | McClelland et al. | |
| 5,124,061 A | 6/1992 | Geary | |
| 5,354,556 A | 10/1994 | Sparks et al. | |
| 5,591,767 A | 1/1997 | Mohr et al. | |
| 5,639,476 A | 6/1997 | Oshlack et al. | |
| 5,674,533 A | 10/1997 | Santus et al. | |
| 5,733,566 A | 3/1998 | Lewis | |
| 6,114,304 A | 9/2000 | Kolterman et al. | |
| 6,365,185 B1 | 4/2002 | Ritschel et al. | |
| 7,762,994 B2 | 7/2010 | Klint et al. | |
| 8,114,833 B2 | 2/2012 | Pedersen et al. | |
| 8,129,343 B2 | 3/2012 | Lau et al. | |
| 8,536,122 B2 | 9/2013 | Lau et al. | |
| 8,575,090 B2 | 11/2013 | Schaeffer et al. | |
| 8,579,869 B2 | 11/2013 | Klint et al. | |
| 8,684,969 B2 | 4/2014 | Moller et al. | |
| 8,808,424 B2 | 8/2014 | Dinage | |
| 8,920,383 B2 | 12/2014 | Enggaard et al. | |
| 9,108,002 B2 | 8/2015 | Markussen | |
| 9,132,239 B2 | 9/2015 | Moller et al. | |
| 9,278,123 B2 | 3/2016 | Sauerberg et al. | |
| 9,457,154 B2 | 10/2016 | Moller et al. | |
| RE46,363 E | 4/2017 | Moeller et al. | |
| 9,616,180 B2 | 4/2017 | Markussen | |
| 9,687,611 B2 | 6/2017 | Moeller et al. | |
| 9,764,003 B2 | 9/2017 | Jensen | |
| 9,775,953 B2 | 10/2017 | Enggaard et al. | |
| 9,861,757 B2 | 1/2018 | Moller et al. | |
| 10,086,047 B2 | 10/2018 | Sauerberg et al. | |
| 10,172,790 B2 | 1/2019 | Ueno et al. | |
| 10,220,155 B2 | 3/2019 | Eiland et al. | |
| 10,278,923 B2 | 5/2019 | Nielsen et al. | |

(Continued)

FOREIGN PATENT DOCUMENTS

AU 2015249035 A1 6/2016
CA 2202520 A1 4/1996

(Continued)

OTHER PUBLICATIONS

The translation of WO2017164627 by Lim and colleagues (Year: 2017).*
Banerjee et al., PNAS, 115; 7296-7301, published online Jun. 25, 2018; supplemental information (SI) included (Year: 2018).*
Sharma et al. "High concentration DNA solubility in bio-ionic liquids with long-lasting chemical and structural stability at room temperature." RSC Advances 5:40546-40551 (2015).
AbMole. Product page for GLP-1(7-37) acetate. Cat. No. M13967, CAS No. 1450806-98-0. Retrieved from the internet at <https://www.abmole.com/products/glp-1-7-37-acetate.html> (2010-2023).

(Continued)

*Primary Examiner* — Christina M Borgeest
(74) *Attorney, Agent, or Firm* — NIXON PEABODY LLP; David S. Resnick; Nicole D. Kling

(57) ABSTRACT

The technology described herein is directed to methods and compositions for drug delivery, e.g., comprising an ionic liquid and a non-ionic surfactant.

19 Claims, 10 Drawing Sheets

Specification includes a Sequence Listing.

(56) References Cited

U.S. PATENT DOCUMENTS

| | | | |
|---|---|---|---|
| 10,335,462 | B2 | 7/2019 | Jensen |
| 10,357,616 | B2 | 7/2019 | Moller et al. |
| 10,376,652 | B2 | 8/2019 | Markussen |
| 10,463,733 | B1 | 11/2019 | Slocik et al. |
| 10,888,605 | B2 | 1/2021 | Moeller et al. |
| 10,933,120 | B2 | 3/2021 | Vilhelmsen et al. |
| 10,960,052 | B2 | 3/2021 | Sauerberg et al. |
| 11,097,063 | B2 | 8/2021 | Eiland et al. |
| 11,311,679 | B2 | 4/2022 | Markussen |
| 11,318,191 | B2 | 5/2022 | Engelund et al. |
| 11,382,957 | B2 | 7/2022 | Sauerberg et al. |
| 11,446,443 | B2 | 9/2022 | Moeller et al. |
| 11,752,198 | B2 | 9/2023 | Moeller et al. |
| 11,759,501 | B2 | 9/2023 | Vilhelmsen et al. |
| 11,759,502 | B2 | 9/2023 | Vilhelmsen et al. |
| 11,759,503 | B2 | 9/2023 | Vilhelmsen et al. |
| 2003/0065015 | A1 | 4/2003 | Bacaner et al. |
| 2003/0185902 | A1 | 10/2003 | Hei et al. |
| 2004/0258747 | A1 | 12/2004 | Ponzoni et al. |
| 2005/0209328 | A1 | 9/2005 | Allgood et al. |
| 2006/0239955 | A1 | 10/2006 | Chandar et al. |
| 2009/0181912 | A1 | 7/2009 | Wang et al. |
| 2011/0092493 | A1 | 4/2011 | Levi et al. |
| 2013/0058999 | A1 | 3/2013 | Foeger |
| 2013/0274181 | A1 | 10/2013 | Walewski et al. |
| 2014/0024719 | A1 | 1/2014 | Kite et al. |
| 2014/0221282 | A1 | 8/2014 | Sun et al. |
| 2015/0071922 | A1 | 3/2015 | Larson et al. |
| 2015/0164828 | A1 | 6/2015 | Golini |
| 2015/0328113 | A1 | 11/2015 | Patel et al. |
| 2016/0115478 | A1* | 4/2016 | Schmidts ............... A61K 47/44 514/44 A |
| 2016/0263225 | A1 | 9/2016 | Zakrewsky et al. |
| 2016/0346734 | A1 | 12/2016 | Acciarri et al. |
| 2018/0093011 | A1 | 4/2018 | Kellar et al. |
| 2019/0309040 | A1 | 10/2019 | Thennati et al. |
| 2020/0323799 | A1 | 10/2020 | Koppisch et al. |
| 2021/0030871 | A1 | 2/2021 | Rinaldi et al. |

FOREIGN PATENT DOCUMENTS

| | | |
|---|---|---|
| CN | 1854120 A | 11/2006 |
| CN | 106420610 A | 2/2017 |
| CN | 109464661 A | 3/2019 |
| EP | 3811962 A1 | 4/2021 |
| JP | 2008162899 A | 7/2008 |
| JP | 2009511497 A | 3/2009 |
| JP | 2014131975 A | 7/2014 |
| JP | 2017530196 A | 10/2017 |
| KR | 10-2017-0052278 A | 5/2017 |
| KR | 20170052278 A | 5/2017 |
| KR | 20170052778 A | 5/2017 |
| KR | 20170109377 A | 9/2017 |
| WO | 1998004290 A2 | 2/1998 |
| WO | 2004014387 A1 | 2/2004 |
| WO | 2004052340 A1 | 6/2004 |
| WO | 2005033143 A1 | 4/2005 |
| WO | 2005097731 A2 | 10/2005 |
| WO | 2007044693 A2 | 4/2007 |
| WO | 2007104789 A2 | 9/2007 |
| WO | 2010118384 A2 | 10/2010 |
| WO | 2011/080103 A1 | 7/2011 |
| WO | 2011138421 A1 | 11/2011 |
| WO | 2012098187 A1 | 7/2012 |
| WO | 2012162542 A1 | 11/2012 |
| WO | 2014098867 A1 | 6/2014 |
| WO | 2015066647 A2 | 5/2015 |
| WO | 2015177057 A1 | 11/2015 |
| WO | 2016034604 A1 | 3/2016 |
| WO | 2016054259 A1 | 4/2016 |
| WO | 2016100123 A1 | 6/2016 |
| WO | 2017060500 A1 | 4/2017 |
| WO | 2017164627 A1 | 9/2017 |
| WO | 2018044920 A1 | 3/2018 |
| WO | 2018065634 A1 | 4/2018 |
| WO | 2018098376 A1 | 5/2018 |
| WO | 2018222924 A1 | 12/2018 |
| WO | 2019099837 A1 | 5/2019 |
| WO | 2019122329 A1 | 6/2019 |
| WO | 2019183142 A1 | 9/2019 |
| WO | 2019193204 A1 | 10/2019 |
| WO | 2019201894 A1 | 10/2019 |
| WO | 2019217854 A1 | 11/2019 |

OTHER PUBLICATIONS

Baekdal et al. "Pharmacokinetics, safety, and tolerability of oral semaglutide in subjects with hepatic impairment." The Journal of Clinical Pharmacology 58.10: 1314-1323 (2018).

Lovshin et al.. "Incretin-based therapies for type 2 diabetes mellitus." Nature Reviews Endocrinology 5.5: 262-269 (2009).

Madsbad et al. "An overview of once-weekly glucagon-like peptide-1 receptor agonists—available efficacy and safety data and perspectives for the future." Diabetes, Obesity and Metabolism 13.5: 394-407 (2011).

MedChemExpress. Product data sheet for cagrilintide acetate (2013-2024). Cat No. HY-P3462A. Retrieved from the internet at <https://www.medchemexpress.com/cagrilintide-acetate.html>.

MedChemExpress. Product data sheet for GLP-1(7-37) acetate (2010-2023). Cat No. HY-P0055A. Retrieved from the internet at <https://www.medchemexpress.com/GLP-1_7-37_acetate.html>.

MedChemExpress. Product data sheet for Semaglutide TFA (2013-2024). Cat No. HY-114118A. Retrieved from the internet at <https://www.medchemexpress.com/Semaglutide_TFA.html>.

PubChem. Semaglutide summary page. PubChem CID 56843331. Retrieved from the internet at <https://pubchem.ncbi.nlm.nih.gov/compound/Semaglutide> (created Mar. 21, 2012).

Tiwari et al. "Drug delivery systems: An updated review." International journal of pharmaceutical investigation 2.1:2-11 (2012).

UniProt. TFA_HUMAN, Accession No. P01375. Retrieved from the internet at <https://www.uniprot.org/uniprotkb/P01375/entry> (retrieved Sep. 2024).

UniProt. ITB1_HUMAN, Accession No. P05556. Retrieved from the internet at <https://www.uniprot.org/uniprotkb/P05556/entry> (retrieved Sep. 2024).

UniProt. IAPP_HUMAN, Accession No. P10997. Retrieved from the internet at <https://www.uniprot.org/uniprotkb/P10997/entry> (Retrieved Sep. 2024).

UniProt. ITA4_HUMAN, Accession No. P13612. Retrieved from the internet at <https://www.uniprot.org/uniprotkb/P13612/entry> (retrieved Sep. 2024).

UniProt. ITB7_HUMAN, Accession No. P26010. Retrieved from the internet at <https://www.uniprot.org/uniprotkb/P26010/entry> (retrieved Sep. 2024).

UniProt. IL12A_HUMAN, Accession No. P29459. Retrieved from the internet at <https://www.uniprot.org/uniprotkb/P29459/entry> (retrieved Sep. 2024).

UniProt. IL12B_HUMAN, Accession No. P29460. Retrieved from the internet at <https://www.uniprot.org/uniprotkb/P29460/entry> (retrieved Sep. 2024).

UniProt. IL23A_HUMAN, Accession No. Q9NPF7. Retrieved from the internet at <https://www.uniprot.org/uniprotkb/Q9NPF7/entry> (retrieved Sep. 2024).

Abbott et al., "Deep eutectic solvents formed between choline chloride and carboxylic acids: versatile alternatives to ionic liquids." Journal of the American Chemical Society 126(29):9142-9147 (2004).

Adawiyah et al., "Ionic liquids as a potential tool for drug delivery systems." MedChemComm 7(10):1881-1897 (2016).

Agatemor et al., "Ionic liquids for addressing unmet needs in healthcare." Bioengineering & Translational Medicine 3(1):7-25 (2018).

Banerjee et al., "Transdermal protein delivery using choline and geranate (CAGE) deep eutectic solvent." Advanced Healthcare Materials 6(15):1601411 (2017).

(56) References Cited

OTHER PUBLICATIONS

Berton et al. "Transdermal Bioavailability in Rats of Lidocaine in the Forms of Ionic Liquids, Salts, and Deep Eutectic." ACS Med Chem Lett 8(5): 498-503 (2017).
Carrillo-Conde et al. "Complexation hydrogels as oral delivery vehicles of therapeutic antibodies: an in vitro and ex vivo evaluation of antibody stability and bioactivity." Industrial & engineering chemistry research 54(42): 10197-10205 (2015).
Chen et al. "Enhanced paracellular delivery of vaccine by hydrogel microparticles-mediated reversible tight junction opening for effective oral immunization." Journal of Controlled Release 311-312: 50-64 (2019).
De Ávila et al. "Micromotor-enabled active drug delivery for in vivo treatment of stomach infection." Nature communications 8(1): 272 pp. 1-9 (2017).
Egorova et al., "Biological activity of ionic liquids and their application in pharmaceutics and medicine." Chemical Reviews 117(10):7132-7189 (2017).
Esteban-Fernández De Ávila et al. "Micromotors go in vivo: from test tubes to live animals." Advanced Functional Materials 28(25): 1705640 (2018).
Fan et al. "Functional nanoparticles exploit the bile acid pathway to overcome multiple barriers of the intestinal epithelium for oral insulin delivery." Biomaterials 151: 13-23 (2018).
Fiebig et al., "Quantitative evaluation of myoglobin unfolding in the presence of guanidinium hydrochloride and ionic liquids in solution." The Journal of Physical Chemistry B 118(2):406-412 (2013).
Haidari et al., "Development of topical delivery systems for flightless neutralizing antibody." Journal of Pharmaceutical Sciences 106(7):1795-1804 (2017).
Hough et al., (The Third Evolution of Ionic Liquids: Active Pharmaceutical Ingredients New Journal of Chemistry 31(8): 1429 (2014).
Hsu et al. "Delivery of siRNA and other macromolecules into skin and cells using a peptide enhancer." Proceedings of the National Academy of Sciences 108(38): 15816-15821 (2011).
Ibsen et al. "Mechanism of antibacterial activity of choline-based ionic liquids (CAGE)." ACS Biomaterials Science & Engineering 4(7): 2370-2379 (2018).
Jain et al., "Effect of trehalose on protein structure." Protein Science 18(1):24-36 (2009).
Jean. "Esters et sels de la choline et de quelues acides derives du phosphore." Bulletin de la Societe Chimique de France 5: 783-786 (1957).
Kandimalla et al. "Effect of fatty acids on the permeation of melatonin across rat and pig skin in-vitro and on the transepidermal water loss in rats in-vivo." JPharmPharmacol 51(7): 783-790 (2010).
Karande et al., "Design principles of chemical penetration enhancers for transdermal drug delivery." PNAS 102(13):4688-4693 (2005).
Karande et al. "Discovery of transdermal penetration enhancers by high-throughput screening." Nature Biotechnology 22(2): 192-197 (2004).
Kelley et al., "Understanding the effects of ionicity in salts, solvates, co-crystals, ionic co-crystals, and ionic liquids, rather than nomenclature, is critical to understanding their behavior." Crystal Growth and Design. 13(3):965-975 (2013).
Khan et al., "Key interactions of surfactants in therapeutic protein formulations: A review." European Journal of Pharmaceutics and Biopharmaceutics 97 97(Pt A):60-67 (2015).
Kharroubi et al., "Diabetes mellitus: The epidemic of the century." World Journal of Diabetes 6(6):850-867 (2015).
Korkmaz et al., "Therapeutic intradermal delivery of tumor necrosis factor-alpha antibodies using tip-loaded dissolvable microneedle arrays." Acta Biomaterialla 24:96-105 (2015).
Korkmaz et al., "Topically applied flightless I neutralizing antibodies improve healing of blistered skin in in a murine model of epidermolysis bullosa acquisita." Journal of Investigative Dermatology 133(4):1008-1016 (2013).
Kumar et al. "Peptides as skin penetration enhancers: mechanisms of action." Journal of Controlled Release 199:168-178 (2015).
Lane. "Skin penetration enhancers." International Journal of Pharmaceutics 447(1-2): 12-21 (2013).
Lee et al. "Development of pH-responsive organic-inorganic hybrid nanocomposites as an effective oral delivery system of protein drugs." Journal of Controlled Release 311-312: 74-84 (2019).
Lei et al., "Introduction: ionic liquids." Chem Rev 117(10):6633-6635 (2017).
Lesch et al., "Peptides in the presence of aqueous ionic liquids-tunable co-solutes as denaturants or protectants?" Physical Chemistry Chemical Physics 17(39):26049-26053 (2015).
Li et al. "Investigation on drug solubility enhancement using deep eutectic solvents and their derivatives." International journal of pharmaceutics 505.1-2: 283-288 (2016).
Mondal et al. "Suitability of bio-based ionic liquids for the extraction and purification of IgG antibodies." Green Chemistry 18.22: 6071-6081 (2016).
Li et al. "Micromotors Spontaneously Neutralize Gastric Acid for pH-Responsive Payload Release." Angewandte Chemie International Edition 56(8): 2156-2161 (2017).
Li et al., "Insights into the deactivation of bovine serum albumin with a thermo-responsive ionic liquid." Soft Matter 10(33):6161-6171 (2014).
Marrucho et al., "Ionic liquids in pharmaceutical applications." Annual Review of Chemical and Biomolecular Engineering 5:527-546 (2014).
Monti et al. "Ionic liquids as potential enhancers for transdermal drug delivery." Int J Pharm 516(1-2): 45-51 (2017).
Muheem et al. "A review on the strategies for oral delivery of proteins and peptides and their clinical perspectives." Saudi Pharmaceutical Journal 24(4): 413-428 (2016).
O'Toole et al. "Diphosphonium ionic liquids as broad spectrum antimicrobial agents." Cornea 31(7): 810-816 (2012).
Park et al. "Lidocaine-ibuprofen ionic liquid for dermal anesthesia." AIChE Journal 61(9): 2732-2738 (2015).
Patel et al., "Recent advances in the applications of ionic liquids in protein stability and activity: a review." Applied Biochemistry and Biotechnology 172(8):3701-3720 (2014).
Paul et al., "Deciphering the interaction of a model transport protein with a prototypical imidazolium room temperature ionic liquid: effect on the conformation and activity of the protein." Journal of Photochemistry and Photobiology B: Biology 133:99-107 (2014).
Petkovic et al. "Novel biocompatible cholinium-based ionic liquids—toxicity and biodegradability." Green Chemistry 12(4): 643-649 (2010).
Rogers et al., "Ionic liquids—solvents of the future?" Science 302(5646):792-793 (2003).
Sahbaz et al., "Transformation of poorly water-soluble drugs into lipophilic ionic liquids enhances oral drug exposure from lipid based formulations." Molecular Pharmaceutics 12(6):1980-1991 (2015).
Shamshina et al., "Ionic liquids in drug delivery." Expert Opinion on Drug Delivery 10(10):1367-1381 (2013).
Shao "On the influence of hydrated imidazolium-based ionic liquid on protein structure stability: a molecular dynamics simulation study." The Journal of Chemical Physics 139(11):115102 (2013).
Singh et al., "Dynamics of ionic liquid-assisted refolding of denatured cytochrome c: a study of preferential interactions toward renaturation." Molecular Pharmaceutics 15(7):2648-2697 (2018).
Singh et al., "Effect of polysorbate 20 and polysorbate 80 on the higher-order structure of a monoclonal antibody and its Fab and Fc fragments probed using 2D nuclear magnetic resonance spectroscopy." Journal of Pharmaceutical Sciences 106(12):3486-3498 (2017).
Sivapragasam et al., "Recent advances in exploiting ionic liquids for biomolecules: solubility, stability and applications." Biotechnology Journal 11(8):1000-1013 (2016).
Stärtzel "Arginine as an excipient for protein freeze-drying: A mini review." Journal of Pharmaceutical Sciences 107(4):960-967 (2018).
Streit et al., "Topical application of the tumour necrosis factor-α antibody infliximab improves healing of chronic wounds." International Wound Journal 3(3):171-179 (2006).
Uralcan et al. "A computational study of the ionic liquid-induced destabilization of the miniprotein, Trp-Cage." The Journal of Physical Chemistry B 122(21):5707-5715 (2018).

(56) References Cited

OTHER PUBLICATIONS

Veselinovic et al., "Topical gel formulation of broadly neutralizing anti-HIV-1 monoclonal antibody VRC01 confers protection against HIV-1 vaginal challenge in a humanized mouse model." Virology 432(2):505-510 (2012).
Vllasaliu et al. "Recent advances in oral delivery of biologics: Nanomedicine and physical modes of delivery." Expert opinion on drug delivery 15(8): 759-770 (2018).
Wang et al., "Stabilizing two IgG1 monoclonal antibodies by surfactants: Balance between aggregation prevention and structure perturbation." European Journal of Pharmaceutics and Biopharmaceutics 114:263-277 (2017).
Wei, et al. "Biomimetic Micromotor Enables Active Delivery of Antigens for Oral Vaccination." Nano letters 19(3):1914-1921 (2019).
Williams et al., "Ionic liquids provide unique opportunities for oral drug delivery: structure optimization and in vivo evidence of utility." Chemical Communications 50(14):1688-1690 (2014).
Wu et al. "Improving dermal delivery of hydrophilic macromolecules by biocompatible ionic liquid based on choline and malic acid." Int J Pharm 558: 380-387 (2019).
Yang et al., "Using ionic liquids in whole-cell biocatalysis for the nucleoside acylation." Microbial Cell Factories 13(1):143 (2014).
Zakrewsky et al., "Choline and geranate deep eutectic solvent as a broad-spectrum antiseptic agent for preventive and therapeutic applications." Advanced Healthcare Materials 5(11):1282-1289 (2016).
Zakrewsky et al., "Ionic liquids as a class of materials for transdermal delivery and pathogen neutralization." PNAS 111(37):13313-13318 (2014).
Zeisel. "Choline: Human requirements and effects on human performance." In Food Components to Enhance Performance: An Evaluation of Potential Performance-Enhancing Food Components for Operational Rations. Institute of Medicine, Committee on Military Nutritional Research Food and Nutrition Board, B. M. Marriott, Ed. National Academies Press, Washington DC. Chapter 19: 381-406 (1994).
Zhang et al. "Evaluations of imidazolium ionic liquids as novel skin permeation enhancers for drug transdermal delivery." Pharm Dev Technol 22(4): 511-520 (2017).
Zhang et al., "Impact of the alkyl chain length on binding of imidazolium-based ionic liquids to bovine serum albumin." Spectrochimica Acta Part A: Molecular and Biomolecular Spectroscopy 196:323-333 (2018).
Araki et al. "Ionic liquid-mediated transcutaneous protein delivery with solid-in-oil nanodispersions." MedChemComm 6(12): 2124-2128 (2015).
Banerjee et al. "Ionic liquids for oral insulin delivery." PNAS 115(28): 7296-7301 (2018).
Dobler et al. "Ionic liquids as ingredients in topical drug delivery systems." International Journal of Pharmaceutics 441(1-2): 620-627 (2013).
Goindi et al. "Development of novel ionic liquid-based microemulsion formulation for dermal delivery of 5-fluorouracil." AAPS PharmSciTech 15(4): 810-821 (2014).
Moniruzzaman et al. "Ionic liquid based microemulsion with pharmaceutically accepted components: Formulation and potential applications." Journal of Colloid and Interface Science 352(1): 136-142 (2010).
Tanner et al., "Transdermal insulin delivery using choline-based ionic liquids (CAGE)" Journal of Controlled Release 286:137-144 (2018).
Agruirre et al. "Current status of selected oral peptide technologys in advanced preclinical development and in clinical trials" Adv Drug Deliv Rev 106(Part B):223-241 (2016).
Arbit et al. "Oral Insulin Delivery in a Physiologic Context: Review" J Diabetes Sci Technol 11(4):825-832 (Jul. 2017).
Buckley et al. "Chemically modified peptides and proteins—critical considerations for oral delivery" Tissue Barriers 4(2):e1156805 (2016).

Buckley et al. "Transcellular stomach absorption of a derivatized glucagon-like peptide-1 receptor agonist" Sci Transl Med 10:earr7047 (2018).
Eaimtrakarn et al. "Absorption enhancing effect of labrasol on the intestinal absorption of insulin in rats" J Drug Target 10(3):255-260 (2002).
Esteben-Fernandez de Avila et al. "Micromotor-enabled active drug delivery for in vivo treatment of stomach infection" Nature Communications 8(1):272 (2017).
Fonte et al. "Oral insulin delivery: How far are we?" J Diabetes Sci Technol 7(2):520-531 (2013).
Garber et al. "Long-acting glucagon-like peptide 1 receptor agonists: a review of their effiacay and tolerability" Diabetes Care 34 Supp 2:S279-84 (2011).
Gupta et al. "Glucagon-like peptide-1 analogues: An overview" Indian J Endocrinol metab 17(3):413-421 (2013).
Gupta et al. "Delivery of exenatide and insulin using mucoadhesive intestinal devices" Annals of Biomedical Engineering 44(6):1993-2007 (2016).
Kopecki et al. "Topically applied flightless I neutroalizing antibodies improve healing of blistered skin in a murine model of epidermolysis bullosa acquisita" Journal of Investigative Dermatology 133(4):1008-1016 (2013).
Krug et al. "Sodium caprate as an enhancer of macromolecule permeation across tricellular tight junctions of intestinal cells" Biomaterials 34(1):275-282 (2013).
Kumar et al. "Prevention of insulin self-aggregation by a protic ionic liquid" Royal Society of Chemistry Advances 3:362-367 (2013).
Lau et al. "Discovery of the once-weekly gulcagon-like pepetide-1 (GLP-1) analogue semaglutide" Journal of Medical Chemistry 58:7370-7380 (2015).
Matteucci et al. "Insulin administration: Present strategies and future directions for a noninvasive (possibly more physiological) delivery" Drug Des Devel Ther 9:3109-3118 (2015).
Micaelo et al. "Protein structure and dynamics in ionic liquids. Insights from molecular dynamics simulation studies" J Phys Chem B 112(9):2566-2572 (2008).
Myers et al. "Optimal alignments in linear space." Comput Appl Biosci 4(1):11-17 (1988).
Needleman et al. "A General Method Applciable To The Search For Similarities In The Amino Acid Sequence of Two Proteins" Journal of Molecular Biology 48(3):443-453 (1970).
Oleck et al. "Commentary: Why was inhaled insulin a failure in the market?" Diabetes Spectr 29(3):180-184 (2016).
Olokoba et al. "Type 2 diabetes mellitus: A review of current trends" Oman Med J 27(4):269-273 (2012).
Schroder et al. "Proteins in ionic liquids: Current status of experiments and simulations" Top Curr Chem (Cham) 375(2):25-017-0110-2 (2017).
Scott-Moncrief et al. "Enhancement of intestinal insulin absorption by bile salt—Fatty acid mixed micelles in dogs" J Pharm Sci 83(10):1465-1469 (1994).
Shaji et al. "Protein and Peptide drug delivery: oral approaches" Indian J Pharm Sci 70(3):269-277 (2008).
Smith et al. "Deep Eutectic Solvents (DESs) and Their Applications" Chemical Reviews 114(21):11060-11082 (2014).
Wong et al. "Oral Delivery of insulin for treatment of diabetes: Status quo, challenges, and opportunities" J Pharm Pharmacolo 68(9):1093-1108 (2016).
Wu et al. "An improved synthesis of a fluorescent gabapentin-choline conjugate for single molecule detection" Tetrahedron Letters 50:2100-2102 (2009).
Xu et al. "Ionic Liquids: Ion Mobilities, Glass Temperatures, and Fragilities" J Phys Chem B 107(25):6170-6178 (2003).
Zijlstra et al. "Oral insulin reloaded: A structured approach" J Diabetes Sci Technol 8(3):458-465 (2014).
American Diabetes Association. "Insulin Administration." Diabetes Care 27.1: S106-S109 (2004).
Bristol-Myers Squibb Company. "Taxol® (paclitaxel) Injection." Retrieved from the internet at <https://www.accessdata.fda.gov/drugsatfda_docs/label/2011/020262s049lbl.pdf> (2011).

(56) References Cited

OTHER PUBLICATIONS

Fakhari et al. "Engineered in-situ depot-forming hydrogels for intratumoral drug delivery." Journal of controlled release 220: 465-475 (2015).

US Food and Drug Administration. "FDA's Concerns with Unapproved GLP-1 Drugs Used for Weight Loss." Article retrieved from the Internet at <https://www.fda.gov/drugs/postmarket-drug-safety-information-patients-and-providers/fdas-concerns-unapproved-glp-1-drugs-used-weight-loss> (retrieved on Oct. 4, 2024).

Bhuyan et al. "Protein Stabilization by Urea and Guanidine Hydrochloride," Biochemistry, 41(45):13386-1334 (2002).

Chen et al. "Influenza virus antigenic variation, host antibody production and new approach to control epidemics." Virology journal 6.1: 30 (2009).

Chowdhury, Md Raihan et al. Ionic-Liquid-Based Paclitaxel Preparation: A New Potential Formulation for Cancer Treatment. Mol Pharm 15(6):2484-2488 (2018).

Coppola et al. "Clinical significance of hepatitis B surface antigen mutants." World journal of hepatology 7.27: 2729 (2015).

Drucker et al. Glucagon-like peptide I stimulates insulin gene expression and increases cyclic AMP levels in a rat islet cell line. PNAS USA 84(10):3434-3438 (1987).

Du et al. "Hydrophobic salts markedly diminish viscosity of concentrated protein solutions," Biotechnology and Bioengineering 108(3): 632-636 (2011).

Figueriredo et al. "Protein destabilisation in ionic liquids: the role of preferential interactions in denaturation," Phys. Chem. Chem. Phys. 15(45):19632-19643 (2013).

Hyomen Gijutsu [Journal of The Surface Finishing Society of Japan], 2016, vol. 67 No. 2, pp. 84-89 [Partial English Translation Provided].

Jones et al. "Considerations for the Use of Polysorbates in Biopharmaceuticals," Pharm Res, vol. 35(8):148 (May 24, 2018).

Lanzhou Yulu Fine Chemical Co., Ltd. Choline Chloride. CAS No. 67-48-1, Retrieved from the Internet at <https://www.molbase.com/supplier/765954-product-1766243.html> (2013).

Levy et al. Novel Exenatide Analogs with Peptidic Albumin Binding Domains: Potent Anti-Diabetic Agents with Extended Duration of Action. PLoS One 9(2):e87704 (2014).

Mazid et al. "Inhibited fragmentation of mAbs in buffered ionic liquids," Chem. Commun., 51(38):8089-8092 (2015).

Moss et al. "Glossary of Class Names of Organic Compounds and Reactive Intermediates Based on Structure" Pure & Appl Chem 67:1307-1375 (1995).

Preston. "The role of B. pertussis vaccine antigen gene variants in pertussis resurgence and possible consequences for vaccine development." Human vaccines & immunotherapeutics 12.5: 1274-1276 (2016).

Reslan et al. "Ionic liquids as biocompatible stabilizers of proteins," Biophys Rev, 10(3):781-793 (2018).
Santos et al. Ionic liquids and salts from ibuprofen as promising innovative formulations of an old drug. ChemMedChem 14(9):907-911 (2019).
Sen et al. "Logaruthmic partition coefficient comparison study and molecular weight of synthesized prodrugs of ibuprofen+ paracetamol, diclofenac sodium+ paracetamol and ibuprofen+ diclofenac sodium." Am. J. Adv. Drug Deliv 4.5: 64-68 (2016).
Tian et al. Effect of imidazolium-based surface-active ionic liquids on the orientation of liquid crystals at various fluid/liquid crystal interfaces. Langmuir 32(45): 117 45-11753 (2016).
Wang et al. "Viscosity-Lowering Effect of Amino Acids and Salts on Highly Concentrated Solutions of Two IgG1 Monoclonal Antibodies," Mol. Pharmaceutics 12(12):4478-4487 (2015).
Wang et al. "Preparation, characterization, and formulation development of drug-drug protic ionic liquids of diphenhydramine with ibuprofen and naproxen." Molecular pharmaceutics 15.9: 4190-4201 (2018).
Whitaker et al. "A Formulation Development Approach to Identify and Select Stable Ultra-High-Concentration Monoclonal Antibody Formulations With Reduced Viscosities," Journal of Pharmaceutical Sciences 106(11):3230-3241 (2017).
Zheng et al. Synergistic effects between the two choline-based ionic liquids as lubricant additives in glycerol aqueous solution. Tribology Letters 67:47, 1-13 (2019).
Ammar et al. "Generalized allergy due to zinc in insulin treated with zinc-free insulin." Acta diabetologica 49.3: 239-241 (2012).
Gradel et al. "Factors affecting the absorption of subcutaneously administered insulin: effect on variability." Journal of diabetes research 2018.1: 1205121 (2018).
Matheu et al. "Insulin allergy and resistance successfully treated by desensitisation with Aspart insulin." Clinical and Molecular Allergy 3.1: 16 (2005).
MRSNY. "Metabolic processes at injection sites affecting pharmacokinetics, pharmacodynamics, and metabolism of protein and peptide therapeutics." Proteins and Peptides. CRC Press: 80-105 (2009).
Pedro et al., "The Role of Ionic Liquids in the Pharmaceutical Field: An Overview of Relevant Applications,". Int. J. Mol. Sci., 21: 8298. https://doi.org/10.3390/ijms21218298 (2020).
Richardson et al. "Skin-related complications of insulin therapy: epidemiology and emerging management strategies." American journal of clinical dermatology 4.10: 661-667 (2003).

* cited by examiner

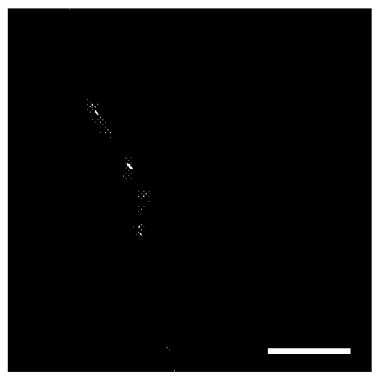
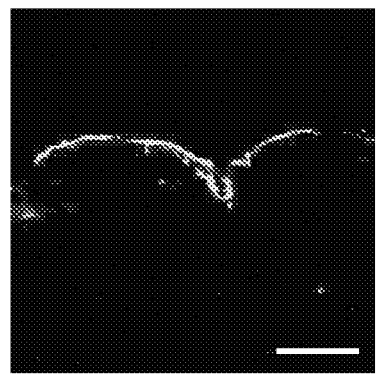
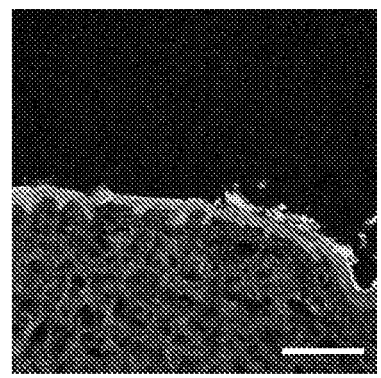
FIG. 3A   FIG. 3B   FIG. 3C
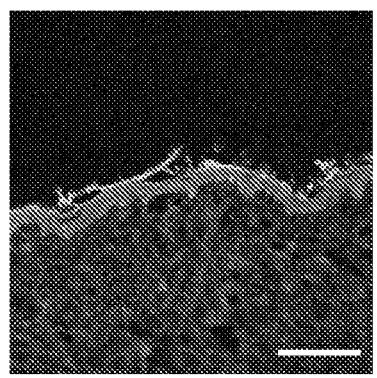
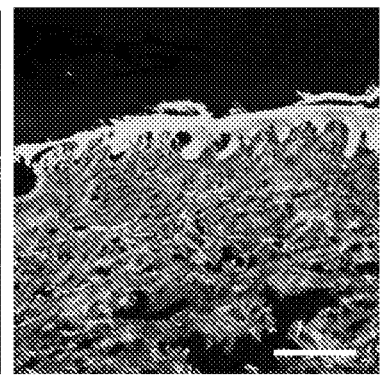
FIG. 3D   FIG. 3E

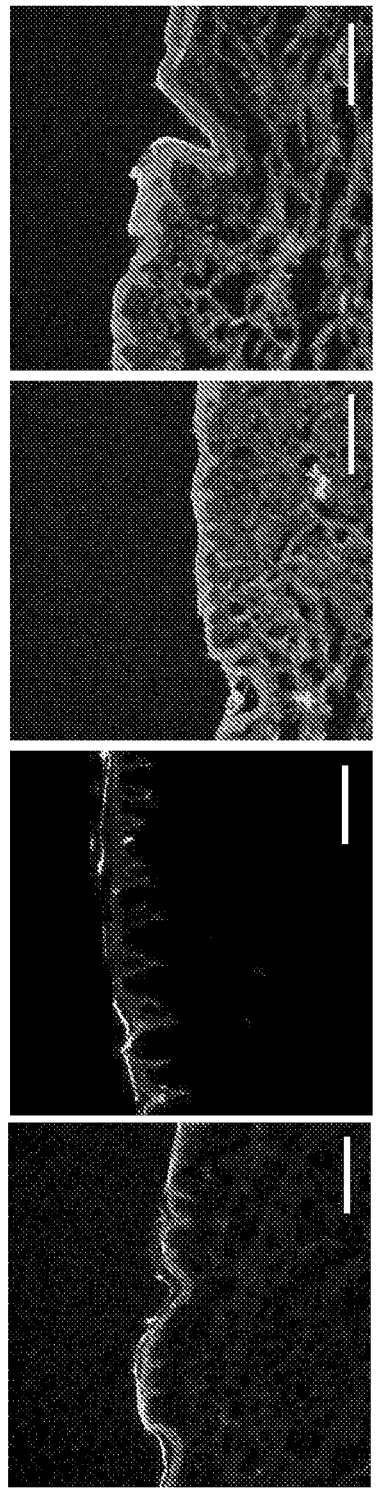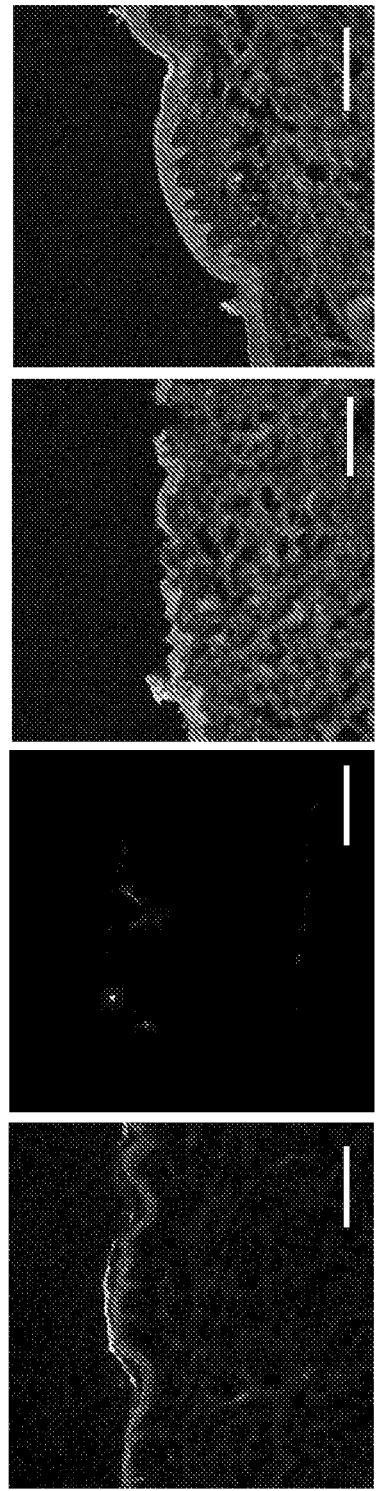

SEQUENCE LISTING

<160> NUMBER OF SEQ ID NOS: 7

<210> SEQ ID NO 1
<211> LENGTH: 180
<212> TYPE: PRT
<213> ORGANISM: Homo sapiens

<400> SEQUENCE: 1

Met Lys Ser Ile Tyr Phe Val Ala Gly Leu Phe Val Met Leu Val Gln
1               5                   10                  15

Gly Ser Trp Gln Arg Ser Leu Gln Asp Thr Glu Glu Lys Ser Arg Ser
            20                  25                  30

Phe Ser Ala Ser Gln Ala Asp Pro Leu Ser Asp Pro Asp Gln Met Asn
        35                  40                  45

Glu Asp Lys Arg His Ser Gln Gly Thr Phe Thr Ser Asp Tyr Ser Lys
50                  55                  60

Tyr Leu Asp Ser Arg Arg Ala Gln Asp Phe Val Gln Trp Leu Met Asn
65                  70                  75                  80

Thr Lys Arg Asn Arg Asn Asn Ile Ala Lys Arg His Asp Glu Phe Glu
                85                  90                  95

Arg His Ala Glu Gly Thr Phe Thr Ser Asp Val Ser Ser Tyr Leu Glu
            100                 105                 110

Gly Gln Ala Ala Lys Glu Phe Ile Ala Trp Leu Val Lys Gly Arg Gly
        115                 120                 125

Arg Arg Asp Phe Pro Glu Glu Val Ala Ile Val Glu Glu Leu Gly Arg
    130                 135                 140

Arg His Ala Asp Gly Ser Phe Ser Asp Glu Met Asn Thr Ile Leu Asp
145                 150                 155                 160

Asn Leu Ala Ala Arg Asp Phe Ile Asn Trp Leu Ile Gln Thr Lys Ile
                165                 170                 175

Thr Asp Arg Lys
            180

<210> SEQ ID NO 2
<211> LENGTH: 37
<212> TYPE: PRT
<213> ORGANISM: Homo sapiens

<400> SEQUENCE: 2

His Asp Glu Phe Glu Arg His Ala Glu Gly Thr Phe Thr Ser Asp Val
1               5                   10                  15

Ser Ser Tyr Leu Glu Gly Gln Ala Ala Lys Glu Phe Ile Ala Trp Leu
            20                  25                  30

Val Lys Gly Arg Gly
            35

<210> SEQ ID NO 3
<211> LENGTH: 30
<212> TYPE: PRT
<213> ORGANISM: Homo sapiens

<400> SEQUENCE: 3

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Lys Gly Arg
            20                  25                  30

<210> SEQ ID NO 4

```
<211> LENGTH: 31
<212> TYPE: PRT
<213> ORGANISM: Homo sapiens

<400> SEQUENCE: 4

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Lys Gly Arg Gly
            20                  25                  30

<210> SEQ ID NO 5
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 5

Gly Gly Gly Gly Ser
1               5

<210> SEQ ID NO 6
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic 6xHis tag"

<400> SEQUENCE: 6

His His His His His His
1               5

<210> SEQ ID NO 7
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 7

Ser Ser Val Leu Tyr Gly Gly Pro Pro Ser Ala Ala
1               5                   10
```

COMPOSITIONS COMPRISING AT LEAST ONE IONIC LIQUID, A POLYPEPTIDE, AND AT LEAST ONE NON-IONIC SURFACTANT FOR PROTEIN DELIVERY

CROSS-REFERENCE TO RELATED APPLICATIONS

This application is a 35 U.S.C. § 371 National Phase Entry Application of International Application No. PCT/US2020/019639 filed Feb. 25, 2020, which designates the U.S. and claims benefit under 35 U.S.C. § 119(e) of U.S. Provisional Application No. 62/812,290 filed Mar. 1, 2019, the contents of which are incorporated herein by reference in their entireties.

SEQUENCE LISTING

The instant application contains a Sequence Listing which has been submitted electronically in ASCII format and is hereby incorporated by reference in its entirety. Said ASCII copy, created on Feb. 4, 2020, is named 002806-094350WOPT_SL.txt and is 3,616 bytes in size.

TECHNICAL FIELD

The technology described herein relates to methods and compositions for drug delivery, e.g, of large polypeptides such as antibodies.

BACKGROUND

Ionic liquids have been demonstrated to improve the delivery of drugs of diverse structural classes, particularly for transdermal delivery. However, large polypeptides can be destabilized by ionic liquids, resulting in successful delivery of the polypeptide but in a form or conformation which negatively impacts the drugs efficacy.

SUMMARY

Provided herein are novel compositions and methods which retain the drug delivery ability of ionic liquids while providing dramatically improved stability of polypeptides, e.g., antibody drugs.

In one aspect of any of the embodiments, described herein is a method of administering at least one active compound, the method comprising administering the active compound in combination with a composition comprising:
  a. an ionic liquid; and
  b. at least one non-ionic surfactant.

In one aspect of any of the embodiments, described herein is a combination of an active compound and a composition comprising:
  a. an ionic liquid; and
  b. at least one non-ionic surfactant,
e.g., for use in delivery of the active compound to a cell, tissue, or subject or for use in treatment of a disease.

In some embodiments of any of the aspects, the at least one non-ionic surfactant has a neutral hydrophilic head group. In some embodiments of any of the aspects, the at least one non-ionic surfactant is a tween or polysorbate. In some embodiments of any of the aspects, the polysorbate is selected from the group consisting of polysorbate 20, polysorbate 40, polysorbate 60, and polysorbate 80.

In some embodiments of any of the aspects, the at least one polysorbate is present at a concentration of about 0.1% to about 50% w/v. In some embodiments of any of the aspects, the at least one polysorbate is present at a concentration of about 1% to about 5% w/v. In some embodiments of any of the aspects, the at least one polysorbate is present at a concentration of about 3% to about 10% w/v. In some embodiments of any of the aspects, the at least one polysorbate is polysorbate 40 and/or polysorbate 60, present at a concentration of less than about 5% w/v. In some embodiments of any of the aspects, the at least one polysorbate is polysorbate 40 and/or polysorbate 60, present at a concentration of about 3% w/v or less.

In some embodiments of any of the aspects, the ionic liquid is Choline And GEranate (CAGE). In some embodiments of any of the aspects, ionic liquid is at a concentration of at least 0.1% w/v. In some embodiments of any of the aspects, ionic liquid is at a concentration of from about 10 to about 70% w/v. In some embodiments of any of the aspects, the ionic liquid is at a concentration of from about 30 to about 50% w/v. In some embodiments of any of the aspects, the ionic liquid is at a concentration of from about 30 to about 40% w/v. In some embodiments of any of the aspects, the CAGE comprises a ratio of choline:geranic acid or geranate of from about 2:1 to about 1:10. In some embodiments of any of the aspects, the CAGE comprises a ratio of choline:geranic acid or geranate of from about 1:1 to about 1:4. In some embodiments of any of the aspects, the CAGE comprises a ratio of choline:geranic acid or geranate is about 1:2. In some embodiments of any of the aspects, the ionic liquid's anion comprises geranate and/or geranic acid.

In some embodiments of any of the aspects, the active compound comprises a polypeptide. In some embodiments of any of the aspects, the active compound has a molecular weight of greater than 450. In some embodiments of any of the aspects, the active compound has a molecular weight of greater than 500. In some embodiments of any of the aspects, the active compound is polar. In some embodiments of any of the aspects, the active compound comprises an antibody or antibody reagent. In some embodiments of any of the aspects, the active compound comprises insulin. In some embodiments of any of the aspects, the active compound comprises a GLP-1 polypeptide or mimetic or analog thereof.

In some embodiments of any of the aspects, the administration is transdermal. In some embodiments of any of the aspects, the administration is transdermal, to a mucus membrane, oral, subcutaneous, intradermal, parenteral, intratumoral, or intravenous. In some embodiments of any of the aspects, the mucus membrane is nasal, oral, or vaginal. In some embodiments of any of the aspects, the combination is administered once. In some embodiments of any of the aspects, the combination is administered in multiple doses. In some embodiments of any of the aspects, the active compound is provided at a dosage of 1-20 mg/kg. In some embodiments of any of the aspects, the combination further comprises a further pharmaceutically acceptable carrier. In some embodiments of any of the aspects, the administration is oral and the combination is provided in a degradable capsule. In some embodiments of any of the aspects, the combination is an admixture. In some embodiments of any of the aspects, the combination is provided in one or more nanoparticles. In some embodiments of any of the aspects, the combination is provided in the form of one or more nanoparticles comprising the active compound, the nanoparticles in solution or suspension in a composition comprising the ionic liquid and the at least one polysorbate.

BRIEF DESCRIPTION OF THE DRAWINGS

FIGS. 3A-3E depict confocal photomicrographs of (FIG. 3A) nonlabeled Fab+50% CAGE (1:2) and of FITC-labeled Fab dissolved, (FIG. 3B) PBS, (FIG. 3C) 30% CAGE (1:2), (FIG. 3D) 40% CAGE (1:2), and (FIG. 3E) 50% CAGE (1:2) in the porcine skin penetrability test. The bar indicates 300 μm.

FIG. 7A: 30% CAGE (1:2), FIG. 7B: 40% CAGE (1:2), and FIG. 7C: 50% CAGE (1:2). The Fab concentration is 10 μg/mL in 10 mM phosphate buffer.

FIGS. 8A-8H depict confocal photomicrographs of FITC-labelled Fab in 30% CAGE (1:2) (upper row) and 40% CAGE (1:2) (lower row). PBS (FIG. 8A, 8E), 3% polysorbate 60 alone (FIG. 8B, 8F), CAGE alone (FIG. 8C, 8G), CAGE with 3% polysorbate 60 (FIG. 8D, 8H). The bar indicates 300 μm.

DETAILED DESCRIPTION

Figure 1:
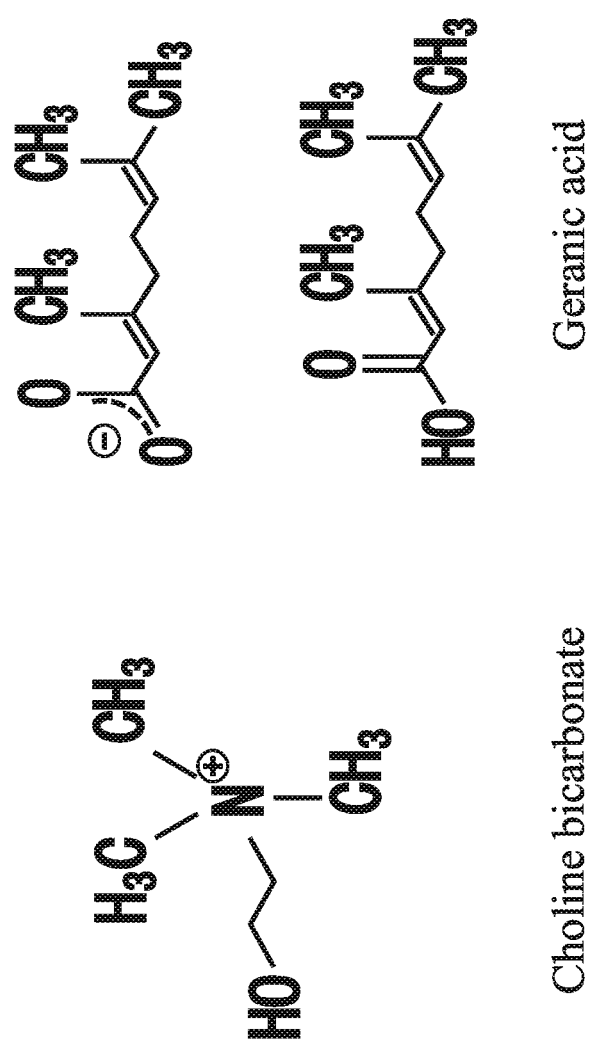
FIG. 1 depicts the structure of CAGE (1:2)
Figure 2A:
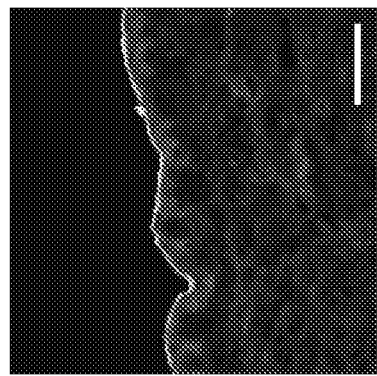
FIGS. 2A-2H depict confocal photomicrographs of FITC-labeled Fab in (FIG. 2A) CAGE (1:1), (FIG. 2B) CAGE (1:1.5), (FIG. 2C) CAGE (1:1.8), (FIG. 2D) CAGE (1:2), (FIG. 2E) CAGE (1:3), (FIG. 2F) CAGE (1:4), (FIG. 2G) PBS, and (FIG. 2H) nonlabeled Fab in PBS, phosphate buffered solution. The bar indicates 300 μm.
Figure 2B:
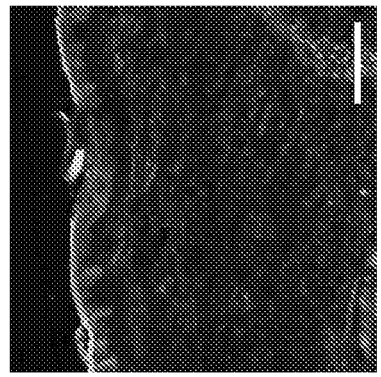
Figure 2C:
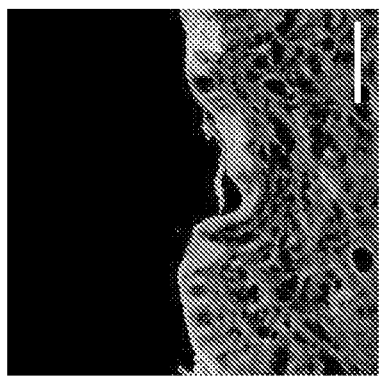
Figure 2D:
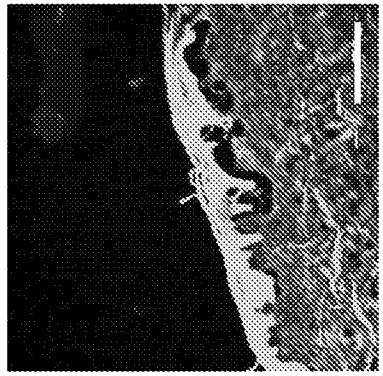
Figure 2E:
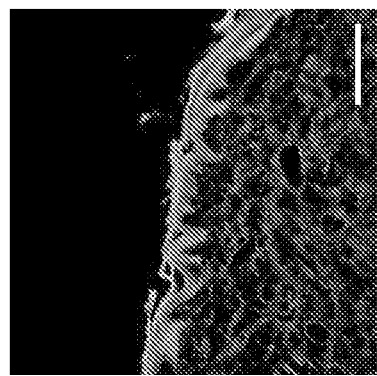
Figure 2F:
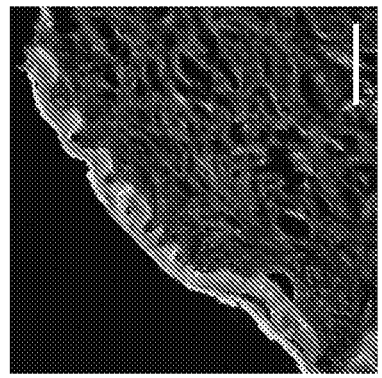
Figure 2G:
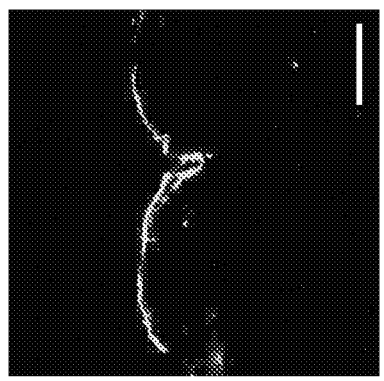
Figure 2H:
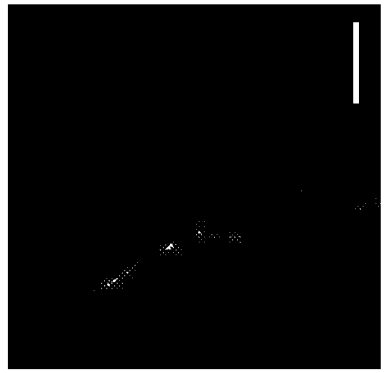

Described herein are compositions and methods relating to the combination of at least one ionic liquid and at least one non-ionic surfactant. Such compositions are surprisingly advantageous for delivery of polypeptides, providing both excellent drug delivery characteristics and superior stability of the polypeptides (e.g., large polypeptides and antibody reagents).

Accordingly, in one aspect, described herein is a composition comprising at least one ionic liquid and at least one non-ionic surfactant. In some embodiments of any of the aspects, the composition can further comprise at least one active compound, e.g., at least one active compound in combination with the compositions comprising the at least one ionic liquid and at least one non-ionic surfactant.

The term "ionic liquids (ILs)" as used herein refers to organic salts or mixtures of organic salts which are in liquid state at room temperature. This class of solvents has been shown to be useful in a variety of fields, including in industrial processing, catalysis, pharmaceuticals, and electrochemistry. The ionic liquids contain at least one anionic and at least one cationic component. Ionic liquids can comprise an additional hydrogen bond donor (i.e. any molecule that can provide an —OH or an —NH group), examples include but are not limited to alcohols, fatty acids, and amines. The at least one anionic and at least one cationic component may be present in any molar ratio. Exemplary molar ratios (cation:anion) include but are not limited to 1:1, 1:2, 2:1, 1:3, 3:1, 2:3, 3:2, and ranges between these ratios. For further discussion of ionic liquids, see, e.g., Hough, et ah, "The third evolution of ionic liquids: active pharmaceutical ingredients", New Journal of Chemistry, 31: 1429 (2007) and Xu, et al., "Ionic Liquids: Ion Mobilities, Glass Temperatures, and Fragilities", Journal of Physical Chemistry B, 107(25): 6170-6178 (2003); each of which is incorporated by reference herein in its entirety. In some embodiments of any of the aspects, the ionic liquid or solvent exists as a liquid below 100° C. In some embodiments of any of the aspects, the ionic liquid or solvent exists as a liquid at room temperature.

Non-limiting examples of ionic liquids comprise CAGE, [$C_6$MIM]Cl, [$C_4$MIM][$PF_6$], [$C_{4-8}$MIM][$PF_6$], [$C_{2-10}$MIM][NTf2], [$C_{2-10}$MIM][$CF_3SO_3$], [$N_{111C2OH}$][$NO_3$], ammonium anions with long (didecyldimethylammonium anion) and short [ethyl(2-hydroxyethyl)dimethylammonium] alkyl chains combined with [$NTf_2$] and [$NO_3$] anions, [$C_{4-8}$MIM][$PF_6$], [poly(3-butyl-1vinylimidazolium) L-prolinate], [$C_2$MIM][$BF_4$], [$C_2$MIM][$CH_3SO_3$], and [$C_2$MIM][$CF_3SO_3$], N-dodecyldabco bromide, N-methyl-N-decylmorpholinium bromide, choline combined with carboxylic acids, and the like. Further non-limiting examples include the ionic liquids described in Agatemor et al. Bioengineering and Translational Medicine 3:7-25 (2018), the contents of which are incorporated by reference herein in their entirety.

In some embodiments of any of the aspects, the ionic liquid described herein is CAGE (Choline And GEranate). CAGE is an ionic liquid comprising the cation choline (see, e.g., Structure I) and the anion geranate or geranic acid (see, e.g., Structures II and III). Preparation of CAGE can be, e.g., as described in International Patent Publication WO 2015/066647; which is incorporated by reference herein in its entirety, or as described in the examples herein.

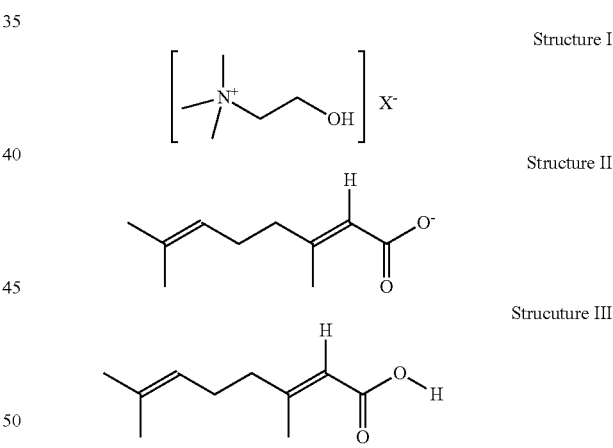

Structure I

Structure II

Strucuture III

In some embodiments of any of the aspects, the ionic liquid's anion comprises geranate and/or geranic acid. In some embodiments of any of the aspects, the ionic liquid's anion comprises geranate. In some embodiments of any of the aspects, the ionic liquid's anion comprises geranic acid.

In some embodiments of any of the aspects, the IL is at a concentration of at least 0.01% w/v. In some embodiments of any of the aspects, the IL is at a concentration of at least 0.05% w/v. In some embodiments of any of the aspects, the IL is at a concentration of at least 0.1% w/v. In some embodiments of any of the aspects, the IL is at a concentration of at least 0.2% w/v, at least 0.3% w/v, at least 0.4% w/v, at least 0.5% w/v, at least 1% w/v or greater. In some embodiments of any of the aspects, the IL is at a concentration of from about 0.01% w/v to about 10% w/v. In some embodiments of any of the aspects, the IL is at a concentration of from 0.01% w/v to 1% w/v. In some embodiments of any of the aspects, the IL is at a concentration of from about 0.05% w/v to about 0.5% w/v. In some embodiments of any of the aspects, the IL is at a concentration of from 0.05% w/v to 0.5% w/v.

In some embodiments of any of the aspects, the IL is at a concentration of at least about 25% w/w. In some embodiments of any of the aspects, the IL is at a concentration of at least 25% w/w. In some embodiments of any of the aspects, the IL is at a concentration of from about 5% w/w to about 75% w/w. In some embodiments of any of the aspects, the IL is at a concentration of from 5% w/w to 75% w/w.

In some embodiments of any of the aspects, the IL is at a concentration of at least about 0.1% w/w. In some embodiments of any of the aspects, the IL is at a concentration of at least 0.1% w/w. In some embodiments of any of the aspects, the IL is at a concentration of from about 10% w/w to about 70% w/w. In some embodiments of any of the aspects, the IL is at a concentration of from 10% w/w to 70% w/w. In some embodiments of any of the aspects, the IL is at a concentration of from about 30% w/w to about 50% w/w. In some embodiments of any of the aspects, the IL is at a concentration of from 30% w/w to 40% w/w. In some embodiments of any of the aspects, the IL is at a concentration of from about 30% w/w to about 50% w/w. In some embodiments of any of the aspects, the IL is at a concentration of from 30% w/w to 40% w/w.

In some embodiments of any of the aspects, the % w/w concentration of the IL is % w/w concentration in water, saline, or a physiologically compatible buffer.

In some embodiments of any of the aspects, the IL is 100% by w/w or w/v.

In some embodiments of any of the aspects, the IL has a ratio of cation:anion of from about 10:1 to about 1:10. In some embodiments of any of the aspects, the IL has a ratio of cation:anion of from 10:1 to 1:10. In some embodiments of any of the aspects, the IL has a ratio of cation:anion of from about 5:1 to about 1:5. In some embodiments of any of the aspects, the IL has a ratio of cation:anion of from 5:1 to 1:5. In some embodiments of any of the aspects, the IL has a ratio of cation:anion of from about 2:1 to about 1:10. In some embodiments of any of the aspects, the IL has a ratio of cation:anion of from 2:1 to 1:10. In some embodiments of any of the aspects, the IL has a ratio of cation:anion of from about 2:1 to about 1:4. In some embodiments of any of the aspects, the IL has a ratio of cation:anion of from 2:1 to 1:4. In some embodiments of any of the aspects, the IL has a ratio of cation:anion of from about 1:1 to about 1:4. In some embodiments of any of the aspects, the IL has a ratio of cation:anion of from 1:1 to 1:4. In some embodiments of any of the aspects, the IL has a ratio of cation:anion of about 1:1, 1:2, 1:3, or 1:4. In some embodiments of any of the aspects, the IL has a ratio of cation:anion of 1:1, 1:2, 1:3, or 1:4.

Without wishing to be constrained by theory, CAGE compositions with higher ratios of geranic acid and/or geranate display greater hydrophobicity and toxicity while compositions with higher ratios of choline display greater hydrophilicity and are more inert. In some embodiments of any of the aspects, CAGE compositions with higher ratios of geranic acid and/or geranate display greater hydrophobicity while compositions with higher ratios of choline display greater hydrophilicity. In some embodiments of any of the aspects, the CAGE is a gel, or a shear-thinning Newtonian gel.

In some embodiments of any of the aspects, the CAGE has a ratio of choline:geranic acid (or geranate) of about 1:4 and is at a concentration of about 5% w/w, providing a microemulsion. In some embodiments of any of the aspects, the CAGE has a ratio of choline:geranic acid (or geranate) of about 1:3 to about 1:4 and is at a concentration of about 20% w/w, providing vesicles. In some embodiments of any of the aspects, the CAGE has a ratio of choline:geranic acid (or geranate) of about 1:2 and is at a concentration of about 20% w/w, providing micelles. In some embodiments of any of the aspects, the CAGE has a ratio of choline:geranic acid (or geranate) of about 1:4 and is at a concentration of about 50% w/w, providing a sol-gel.

In some embodiments of any of the aspects, the CAGE is at a concentration of at least 25% w/w and has a ratio of choline:geranic acid (or geranate) of at least 1:3. In some embodiments of any of the aspects, the CAGE is at a concentration of at least 25% w/w in water and has a ratio of choline:geranic acid (or geranate) of at least 1:3. In some embodiments of any of the aspects, the CAGE is at a concentration of at least 25% w/w and has a ratio of choline:geranic acid (or geranate) of 1:3 or 1:4. In some embodiments of any of the aspects, the CAGE is at a concentration of at least 25% w/w in water and has a ratio of choline:geranic acid (or geranate) of 1:3 or 1:4.

In some embodiments of any of the aspects, the ionic liquid (e.g., CAGE) concentration in the composition or formulation is about 0.1 mM to 20 mM. In some embodiments of any of the aspects, the ionic liquid (e.g., CAGE) concentration in the composition or formulation is about 0.5 mM to 20 mM, 0.5 mM to 18 mM, 0.5 mM to 16 mM, 0.5 mM to 14 mM, 0.5 mM to 12 mM, 0.5 mM to 10 mM, 0.5 mM to 8 mM, 1 mM to 20 mM, 1 mM to 18 mM, 1 mM to 16 mM, 1 mM to 14 mM, 1 mM to 12 mM, 1 mM to 10 mM, 1 mM to 8 mM, 2 mM to 20 mM, 2 mM to 18 mM, 2 mM to 16 mM, 2 mM to 14 mM, 2 mM to 12 mM, 2 mM to 10 mM, 2 mM to 8 mM, 4 mM to 20 mM, 4 mM to 18 mM, 4 mM to 16 mM, 4 mM to 14 mM, 4 mM to 12 mM, 4 mM to 10 mM, 4 mM to 8 mM, 6 mM to 20 mM, 6 mM to 18 mM, 6 mM to 14 mM, 6 mM to 12 mM, 6 mM to 10 mM, 6 mM to 8 mM, 8 mM to 20 mM, 8 mM to 18 mM, 8 mM to 16 mM, 8 mM to 14 mM, 8 mM to 12 mM, 8 mM to 10 mM, 10 mM to 20 mM, 10 mM to 18 mM, 10 mM to 16 mM, 10 mM to 14 mM, 10 mM to 12 mM, 12 mM to 20 mM, 12 mM to 18 mM, 12 mM to 16 mM, 12 mM to 14 mM, 14 mM to 20 mM, 14 mM to 18 mM, 14 mM to 16 mM, 16 mM to 20 mM, 16 mM to 18 mM, or 18 mM to 20 mM. In some embodiments of any of the aspects, the ionic liquid (e.g., CAGE) concentration in the composition or formulation is about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM or about 20 mM.

As used herein, "non-ionic surfactant" refers to a surfactant which lacks a net ionic charge and does not dissociate to an appreciable extent in aqueous media. The properties of non-ionic surfactants are largely dependent upon the proportions of the hydrophilic and hydrophobic groups in the molecule. Hydrophilic groups include the oxyethylene group (—OCH2 CH2—) and the hydroxy group. By varying the number of these groups in a hydrophobic molecule, such as a fatty acid, substances are obtained which range from strongly hydrophobic and water insoluble compounds, such as glyceryl monostearate, to strongly hydrophilic and water-soluble compounds, such as the macrogols. Between these two extremes types include those in which the proportions of the hydrophilic and hydrophobic groups are more evenly balanced, such as the macrogol esters and ethers and sorbitan derivatives. Suitable non-ionic surfactants may be found in Martindale, The Extra Pharmacopoeia, 28th Edition, 1982, The Pharmaceutical Press, London, Great Britain, pp. 370 to 379. Non-limiting examples of non-ionic surfactants include polysorbates, a Tween™, block copolymers of ethylene oxide and propylene oxide, glycol and glyceryl esters of fatty acids and their derivatives, polyoxyethylene esters of fatty acids (macrogol esters), polyoxyethylene ethers of fatty acids and their derivatives (macrogol ethers), polyvinyl alcohols, and sorbitan esters, sorbitan monoesters, ethers formed from fatty alcohols and polyethylene glycol, polyoxyethylene-polypropylene glycol, alkyl polyglycoside, Cetomacrogol 1000, cetostearyl alcohol, cetyl alcohol, cocamide DEA, cocamide MEA, decyl glucoside, decyl polyglucose, glycerol monostearate, IGEPAL CA-630, isoceteth-20, lauryl glucoside, maltosides, monolaurin, mycosubtilin, Nonidet P-40, nonoxynol-9, nonoxynols, NP-40, octaethylene glycol monododecyl ether, N-Octyl beta-D-thioglucopyranoside, octyl glucoside, oleyl alcohol, PEG-10 sunflower glycerides, pentaethylene glycol monododecyl ether, polidocanol, poloxamer, poloxamer 407, polyethoxylated tallow amine, polyglycerol polyricinoleate, sorbitan, sorbitan monolaurate, sorbitan monostearate, sorbitan tristearate, stearyl alcohol, surfactin, Triton X-100, and the like. In some embodiments of any of the aspects, the at least one non-ionic surfactant has a neutral hydrophilic head group.

As used herein, "polysorbate" refers to a surfactant derived from ethoxylated sorbitan (a derivative of sorbitol) esterified with fatty acids. Common brand names for polysorbates include Scattics™, Alkest™, Canarcel™, and Tween™. Exemplary polysorbates include polysorbate 20 (polyoxyethylene (20) sorbitan monolaurate), polysorbate 40 (polyoxyethylene (20) sorbitan monopalmitate), polysorbate 60 (polyoxyethylene (20) sorbitan monostearate), and polysorbate 80 (polyoxyethylene (20) sorbitan monooleate). Structures of exemplary polysorbates are provided in FIG. 5.

In some embodiments of any of the aspects, the at least one non-ionic surfactant (e.g., at least one polysorbate) is present at a concentration of about 0.1% to about 50% w/v. In some embodiments of any of the aspects, the at least one non-ionic surfactant (e.g., at least one polysorbate) is present at a concentration of 0.1% to 50% w/v. In some embodiments of any of the aspects, the at least one non-ionic surfactant (e.g., at least one polysorbate) is present at a concentration of about 1% to about 5% w/v. In some embodiments of any of the aspects, the at least one non-ionic surfactant (e.g., at least one polysorbate) is present at a concentration of 1% to 5% w/v. In some embodiments of any of the aspects, the at least one non-ionic surfactant (e.g., at least one polysorbate) is present at a concentration of about 3% to about 10% w/v. In some embodiments of any of the aspects, the at least one non-ionic surfactant (e.g., at least one polysorbate) is present at a concentration of 3% to 10% w/v. In some embodiments of any of the aspects, the at least one non-ionic surfactant (e.g., at least one polysorbate) is present at a concentration of less than about 5% w/v. In some embodiments of any of the aspects, the at least one non-ionic surfactant (e.g., at least one polysorbate) is present at a concentration of less than 5% w/v.

In some embodiments of any of the aspects, the at least one ionic liquid comprises CAGE, the at least one non-ionic surfactant is polysorbate, and the concentrations and polysorbate identities are selected from one of the exemplars provided in Table 1. In some embodiments of any of the aspects, the at least one ionic liquid comprises CAGE, the at least one non-ionic surfactant is polysorbate, and the concentrations and polysorbate identities are selected from exemplars 10, 11, and 17 provided in Table 1. In some embodiments of any of the aspects, the at least one ionic liquid comprises CAGE, the at least one non-ionic surfactant is polysorbate, and the concentrations and polysorbate identities are selected from exemplars 10, 11, 17, 18, 19, 23-25, 32, 33, 47-49, 53, 55, and 56 provided in Table 1. In some embodiments of any of the aspects, the at least one ionic liquid comprises CAGE, the at least one non-ionic surfactant is polysorbate, and the concentrations and polysorbate identities are selected from exemplars 8-12, 16-20, 22-26, 30-34, 39, 42, 47-50, 52-56, 63, 64, 71, and 80 provided in Table 1.

In some embodiments of any of the aspects, the at least one ionic liquid comprises CAGE at a cation:anion ratio of 1:2, the at least one non-ionic surfactant is polysorbate, and the concentrations and polysorbate identities are selected from one of the exemplars provided in Table 1. In some embodiments of any of the aspects, the at least one ionic liquid comprises CAGE at a cation:anion ratio of 1:2, the at least one non-ionic surfactant is polysorbate, and the concentrations and polysorbate identities are selected from exemplars 10, 11, and 17 provided in Table 1. In some embodiments of any of the aspects, at least one ionic liquid comprises CAGE at a cation:anion ratio of 1:2, the at least one non-ionic surfactant is polysorbate, and the concentrations and polysorbate identities are selected from exemplars 10, 11, 17, 18, 19, 23-25, 32, 33, 47-49, 53, 55, and 56 provided in Table 1. In some embodiments of any of the aspects, the at least one ionic liquid comprises CAGE at a cation:anion ratio of 1:2, the at least one non-ionic surfactant is polysorbate, and the concentrations and polysorbate identities are selected from exemplars 8-12, 16-20, 22-26, 30-34, 39, 42, 47-50, 52-56, 63, 64, 71, and 80 provided in Table 1.

TABLE 1

| Exemplar | Concentration of CAGE (%) | Concentration of polysorbate (%) | Identity of polysorbate |
|---|---|---|---|
| 1 | 30-50 | 3-30 | Polysorbate 20 |
| 2 | 30-50 | 3-10 | Polysorbate 20 |
| 3 | 30-50 | 3 | Polysorbate 20 |
| 4 | 30-50 | 5 | Polysorbate 20 |
| 5 | 30-50 | 8 | Polysorbate 20 |
| 6 | 30-50 | 10 | Polysorbate 20 |
| 7 | 30 | 3-30 | Polysorbate 20 |
| 8 | 30 | 3-10 | Polysorbate 20 |
| 9 | 30 | 3 | Polysorbate 20 |
| 10 | 30 | 5 | Polysorbate 20 |
| 11 | 30 | 8 | Polysorbate 20 |
| 12 | 30 | 10 | Polysorbate 20 |

TABLE 1-continued

| Exemplar | Concentration of CAGE (%) | Concentration of polysorbate (%) | Identity of polysorbate |
| --- | --- | --- | --- |
| 13 | 30 | 20 | Polysorbate 20 |
| 14 | 30 | 30 | Polysorbate 20 |
| 15 | 30 | 3-30 | Polysorbate 40 |
| 16 | 30 | 3-10 | Polysorbate 40 |
| 17 | 30 | 3 | Polysorbate 40 |
| 18 | 30 | 5 | Polysorbate 40 |
| 19 | 30 | 8 | Polysorbate 40 |
| 20 | 30 | 10 | Polysorbate 40 |
| 21 | 30 | 3-30 | Polysorbate 60 |
| 22 | 30 | 3-10 | Polysorbate 60 |
| 23 | 30 | 3 | Polysorbate 60 |
| 24 | 30 | 5 | Polysorbate 60 |
| 25 | 30 | 8 | Polysorbate 60 |
| 26 | 30 | 10 | Polysorbate 60 |
| 27 | 30 | 20 | Polysorbate 60 |
| 28 | 30 | 30 | Polysorbate 60 |
| 29 | 30 | 3-30 | Polysorbate 80 |
| 30 | 30 | 3-10 | Polysorbate 80 |
| 31 | 30 | 3 | Polysorbate 80 |
| 32 | 30 | 5 | Polysorbate 80 |
| 33 | 30 | 8 | Polysorbate 80 |
| 34 | 30 | 10 | Polysorbate 80 |
| 35 | 30 | 20 | Polysorbate 80 |
| 36 | 30 | 30 | Polysorbate 80 |
| 37 | 40 | 3-30 | Polysorbate 20 |
| 38 | 40 | 3-10 | Polysorbate 20 |
| 39 | 40 | 3 | Polysorbate 20 |
| 40 | 40 | 5 | Polysorbate 20 |
| 41 | 40 | 8 | Polysorbate 20 |
| 42 | 40 | 10 | Polysorbate 20 |
| 43 | 40 | 20 | Polysorbate 20 |
| 44 | 40 | 30 | Polysorbate 20 |
| 45 | 40 | 3-30 | Polysorbate 40 |
| 46 | 40 | 3-10 | Polysorbate 40 |
| 47 | 40 | 3 | Polysorbate 40 |
| 48 | 40 | 5 | Polysorbate 40 |
| 49 | 40 | 8 | Polysorbate 40 |
| 50 | 40 | 10 | Polysorbate 40 |
| 51 | 40 | 3-30 | Polysorbate 60 |
| 52 | 40 | 3-10 | Polysorbate 60 |
| 53 | 40 | 3 | Polysorbate 60 |
| 54 | 40 | 5 | Polysorbate 60 |
| 55 | 40 | 8 | Polysorbate 60 |
| 56 | 40 | 10 | Polysorbate 60 |
| 57 | 40 | 20 | Polysorbate 60 |
| 58 | 40 | 30 | Polysorbate 60 |
| 59 | 40 | 3-30 | Polysorbate 80 |
| 60 | 40 | 3-10 | Polysorbate 80 |
| 61 | 40 | 3 | Polysorbate 80 |
| 62 | 40 | 5 | Polysorbate 80 |
| 63 | 40 | 8 | Polysorbate 80 |
| 64 | 40 | 10 | Polysorbate 80 |
| 65 | 40 | 20 | Polysorbate 80 |
| 66 | 40 | 30 | Polysorbate 80 |
| 67 | 50 | 3-30 | Polysorbate 20 |
| 68 | 50 | 3-10 | Polysorbate 20 |
| 69 | 50 | 3 | Polysorbate 20 |
| 70 | 50 | 5 | Polysorbate 20 |
| 71 | 50 | 8 | Polysorbate 20 |
| 72 | 50 | 10 | Polysorbate 20 |
| 73 | 50 | 20 | Polysorbate 20 |
| 74 | 50 | 30 | Polysorbate 20 |
| 75 | 50 | 3-30 | Polysorbate 40 |
| 76 | 50 | 3-10 | Polysorbate 40 |
| 77 | 50 | 3 | Polysorbate 40 |
| 78 | 50 | 5 | Polysorbate 40 |
| 79 | 50 | 8 | Polysorbate 40 |
| 80 | 50 | 10 | Polysorbate 40 |
| 81 | 50 | 3-30 | Polysorbate 60 |
| 82 | 50 | 3-10 | Polysorbate 60 |
| 83 | 50 | 3 | Polysorbate 60 |
| 84 | 50 | 5 | Polysorbate 60 |
| 85 | 50 | 8 | Polysorbate 60 |
| 86 | 50 | 10 | Polysorbate 60 |
| 87 | 50 | 20 | Polysorbate 60 |
| 88 | 50 | 30 | Polysorbate 60 |
| 89 | 50 | 3-30 | Polysorbate 80 |

TABLE 1-continued

| Exemplar | Concentration of CAGE (%) | Concentration of polysorbate (%) | Identity of polysorbate |
| --- | --- | --- | --- |
| 90 | 50 | 3-10 | Polysorbate 80 |
| 91 | 50 | 3 | Polysorbate 80 |
| 92 | 50 | 5 | Polysorbate 80 |
| 93 | 50 | 8 | Polysorbate 80 |
| 94 | 50 | 10 | Polysorbate 80 |
| 95 | 50 | 20 | Polysorbate 80 |
| 96 | 50 | 30 | Polysorbate 80 |
| 97 | 30 | 3-30 | Polysorbate 20, 40, 60, and/or 80 |
| 98 | 30 | 3-10 | Polysorbate 20, 40, 60, and/or 80 |
| 99 | 30 | 3 | Polysorbate 20, 40, 60, and/or 80 |
| 100 | 30 | 5 | Polysorbate 20, 40, 60, and/or 80 |
| 101 | 30 | 8 | Polysorbate 20, 40, 60, and/or 80 |
| 102 | 30 | 10 | Polysorbate 20, 40, 60, and/or 80 |
| 103 | 30 | 20 | Polysorbate 20, 40, 60, and/or 80 |
| 104 | 30 | 30 | Polysorbate 20, 40, 60, and/or 80 |
| 105 | 40 | 3-30 | Polysorbate 20, 40, 60, and/or 80 |
| 106 | 40 | 3-10 | Polysorbate 20, 40, 60, and/or 80 |
| 107 | 40 | 3 | Polysorbate 20, 40, 60, and/or 80 |
| 108 | 40 | 5 | Polysorbate 20, 40, 60, and/or 80 |
| 109 | 40 | 8 | Polysorbate 20, 40, 60, and/or 80 |
| 110 | 40 | 10 | Polysorbate 20, 40, 60, and/or 80 |
| 111 | 40 | 20 | Polysorbate 20, 40, 60, and/or 80 |
| 112 | 40 | 30 | Polysorbate 20, 40, 60, and/or 80 |
| 113 | 50 | 3-30 | Polysorbate 20, 40, 60, and/or 80 |
| 114 | 50 | 3-10 | Polysorbate 20, 40, 60, and/or 80 |
| 115 | 50 | 3 | Polysorbate 20, 40, 60, and/or 80 |
| 116 | 50 | 5 | Polysorbate 20, 40, 60, and/or 80 |
| 117 | 50 | 8 | Polysorbate 20, 40, 60, and/or 80 |
| 118 | 50 | 10 | Polysorbate 20, 40, 60, and/or 80 |
| 119 | 50 | 20 | Polysorbate 20, 40, 60, and/or 80 |
| 120 | 50 | 30 | Polysorbate 20, 40, 60, and/or 80 |

As used herein, an "active compound" or "active agent" is any agent which will exert an effect on a target cell or organism. The terms "compound" and "agent" refer to any entity which is normally not present or not present at the levels being administered and/or provided to a cell, tissue or subject. An agent can be selected from a group comprising: chemicals; small organic or inorganic molecules; signaling molecules; nucleic acid sequences; nucleic acid analogues; proteins; peptides; enzymes; aptamers; peptidomimetic, peptide derivative, peptide analogs, antibodies; intrabodies; biological macromolecules, extracts made from biological materials such as bacteria, plants, fungi, or animal cells or tissues; naturally occurring or synthetic compositions or functional fragments thereof. In some embodiments, the agent is any chemical, entity or moiety, including without limitation synthetic and naturally-occurring non-proteinaceous entities. Agents can be known to have a desired activity and/or property, or can be selected from a library of diverse compounds. Non-limiting examples of active compounds contemplated for use in the methods described herein include small molecules, polypeptides, nucleic acids, chemotherapies/chemotherapeutic compounds, antibodies, antibody reagents, vaccines, a GLP-1 polypeptide or mimetic/analog thereof, and insulin.

A nucleic acid molecule, as described herein, can be a vector, an expression vector, an inhibitory nucleic acid, an aptamer, a template molecule or cassette (e.g., for gene editing), or a targeting molecule (e.g., for CRISPR-Cas technologies), or any other nucleic acid molecule that one wishes to deliver to a cell. The nucleic acid molecule can be RNA, DNA, or synthetic or modified versions thereof.

As used herein, the term "small molecule" refers to a chemical agent which can include, but is not limited to, a peptide, a peptidomimetic, an amino acid, an amino acid analog, a polynucleotide, a polynucleotide analog, an aptamer, a nucleotide, a nucleotide analog, an organic or inorganic compound (i.e., including heteroorganic and organometallic compounds) having a molecular weight less than about 10,000 grams per mole, organic or inorganic compounds having a molecular weight less than about 5,000 grams per mole, organic or inorganic compounds having a molecular weight less than about 1,000 grams per mole, organic or inorganic compounds having a molecular weight less than about 500 grams per mole, and salts, esters, and other pharmaceutically acceptable forms of such compounds.

In some embodiments of any of the aspects, the active compound can be a therapeutic compound or drug, e.g., an agent or compound which is therapeutically effective for the treatment of at least one condition in a subject. Therapeutic compounds are known in the art for a variety of conditions, see, e.g., the database available on the world wide web at drugs.com or the catalog of FDA-approved compounds available on the world wide web at catalog.data.gov/dataset/drugsfda-database; each of which is incorporated by reference herein in its entirety.

As used herein the term "chemotherapeutic agent" refers to any chemical or biological agent with therapeutic usefulness in the treatment of diseases characterized by abnormal cell growth. Such diseases include tumors, neoplasms and cancer as well as diseases characterized by hyperplastic growth. These agents can function to inhibit a cellular activity upon which the cancer cell depends for continued proliferation. In some aspect of all the embodiments, a chemotherapeutic agent is a cell cycle inhibitor or a cell division inhibitor. Categories of chemotherapeutic agents that are useful in the methods of the invention include alkylating/alkaloid agents, antimetabolites, hormones or hormone analogs, and miscellaneous antineoplastic drugs.

Most of these agents are directly or indirectly toxic to cancer cells. In one embodiment, a chemotherapeutic agent is a radioactive molecule.

In some embodiments of any of the aspects, the active compound is a hydrophobic molecule, e.g., estradiol, testosterone, imiquimod, corticosterone, paclitaxel, doxorubicin, cisplatin, and/or camptothecin. In some embodiments of any of the aspects, the active compound is a hydrophobic molecule, e.g., estradiol, testosterone, paclitaxel, doxorubicin, cisplatin, and/or camptothecin.

In some embodiments of any of the aspects, the active compound is an antibody or antibody reagent. As used herein, the term "antibody reagent" refers to a polypeptide that includes at least one immunoglobulin variable domain or immunoglobulin variable domain sequence and which specifically binds a given antigen. An antibody reagent can comprise an antibody or a polypeptide comprising an antigen-binding domain of an antibody. In some embodiments, an antibody reagent can comprise a monoclonal antibody or a polypeptide comprising an antigen-binding domain of a monoclonal antibody. For example, an antibody can include a heavy (H) chain variable region (abbreviated herein as VH), and a light (L) chain variable region (abbreviated herein as VL). In another example, an antibody includes two heavy (H) chain variable regions and two light (L) chain variable regions. The term "antibody reagent" encompasses antigen-binding fragments of antibodies (e.g., single chain antibodies, Fab and sFab fragments, F(ab')2, Fd fragments, Fv fragments, scFv, and domain antibodies (dAb) fragments as well as complete antibodies.

In some embodiments of any of the aspects, the active compound is a GLP-1 polypeptide or mimetic/analog thereof or insulin. Glucagon-Like Peptide-1 (GLP-1), is known to reduce food intake and hunger feelings in humans and is an incretin derived from the transcription product of the proglucagon gene that contributes to glucose homeostasis. GLP-1 mimetics are currently being used in the treatment of Type 2 diabetes. Recent clinical trials have shown that these treatments not only improve glucose homeostasis but also succeed in inducing weight loss. As used herein. "GLP-1 polypeptide" refers to the various pre- and pro-peptides and cleavage products of GLP-1, e.g., for human: GLP-1 (1-37) (SEQ ID NO: 2), GLP-1 (7-36) (SEQ ID NO: 3), and GLP-1 (7-37) (SEQ ID NO: 4). In some embodiments, a GLP-1 polypeptide can be GLP-1 (7-36) and/or GLP-1 (7-37) or the correlating polypeptides from a species other than human. Sequences for GLP-1 polypeptides are known in the art for a number of species, e.g. human GLP-1 (NCBI Gene ID: 2641) polypeptides (e.g., NCBI Ref Seq: NP_002045.1; SEQ ID NO: 1) and SEQ ID NOs: 2-4. In some embodiments, a pre or pro-peptide of GLP-1 can be used in the methods or compositions described herein, e.g., a glucagon preproprotein (e.g., SEQ ID NO: 1). Naturally-occurring alleles or variants of any of the polypeptides described herein are also specifically contemplated for use in the methods and compositions described herein.

```
                                                           SEQ ID NO: 1
    1    mksiyfvagl fvmlvqgswq rslqdteeks rsfsasqadp lsdpdgmned krhsqgtfts 61    dyskyldsrr aqdfvqwlmn tkrnrnniak rhdeferhae gtftsdvssy legqaakefi 121    awlvkgrgrr dfpeevaive elgrrhadgs fsdemntild nlaardfinw liqtkitdrk SEQ ID NO: 2
         hdeferhae gtftsdvssy legqaakefi awlvkgrg SEQ ID NO: 3
         hae gtftsdvssy legqaakefi awlvkgr SEQ ID NO: 4
         hae gtftsdvssy legqaakefi awlvkgrg
```

Various GLP-1 mimetics are known in the art and used in the treatment of diabetes. GLP-1 mimetics (or analogues) can include exendin-4 (a Heloderma lizard polypeptide with homology to human GLP-1) and derivatives thereof, GLP-1 analogs modified to be DPP-IV resistant, or human GLP-1 polypeptides conjugated to various further agents, e.g., to extend the half-life. GLP-1 mimetics/analogues can include, e.g., exenatide, lixisenatide, dulaglutide, semaglutide, albiglutide, LY2189265, liraglutide, and taspoglutide. Examples of such molecules and further discussion of their manufacture and activity can be found in the art, e.g., Gupta. Indian J. Endocrinol Metab 17:413-421 (2013); Garber. Diabetes Treatments 41:S279-S284 (2018); US Patent Publication US2009/0181912; and International Patent Publication WO2011/080103, each of which is incorporated by reference herein in its entirety.

In some embodiments of any of the aspects, the active compound has a molecular weight of greater than about 450. In some embodiments of any of the aspects, the active compound has a molecular weight of greater than about 500. In some embodiments of any of the aspects, the active compound has a molecular weight of greater than 450, e.g., greater than 450, greater than 500, greater than 550, greater than 600, greater than 1000 or more. In some embodiments of any of the aspects, the active compound is polar.

In one aspect of any of the embodiments, described herein is a method of delivering an active compound to a cell, tissue, or subject, the method comprising contacting the cell, tissue, or subject with the active compound in combination with a composition as described herein. In some embodiments of any of the aspects, the cell is a cell in a subject and the contacting step comprises administering the active compound in combination with a composition as described herein to the subject. In some embodiments of any of the aspects, the cell or tissue is in vitro, in vivo, or ex vivo. In some embodiments of any of the aspects, the cell is eurkaryotic. In some embodiments of any of the aspects, the cell is mammalian.

In one aspect of any of the embodiments, described herein is a composition comprising at least one active compound in combination with at least one ionic liquid and at least one non-ionic surfactant. In some embodiments, the pharmaceutical composition comprises the at least one ionic liquid, the at least one non-ionic surfactant and the one or more active compounds as described herein. In some embodiments, the pharmaceutical composition consists essentially of the at least one ionic liquid, the at least one non-ionic surfactant and the one or more active compounds as described herein. In some embodiments, the pharmaceutical composition consists of the at least one ionic liquid, the at least one non-ionic surfactant and the one or more active compounds as described herein. In some embodiments, the pharmaceutical composition consists essentially of an aqeuous solution of the at least one ionic liquid, the at least one non-ionic surfactant and the one or more active compounds as described herein. In some embodiments, the pharmaceutical composition consists of an aqeuous solution of the at least one ionic liquid, the at least one non-ionic surfactant and the one or more active compounds as described herein.

In some embodiments of any of the aspects, a combination or composition as described herein can further comprise a pharmaceutically acceptable carrier. As used herein, the terms "pharmaceutically acceptable", "physiologically tolerable" and grammatical variations thereof, as they refer to compositions, carriers, diluents and reagents, are used interchangeably and represent that the materials are capable of administration to or upon a mammal without the production of undesirable physiological effects such as nausea, dizziness, gastric upset and the like. A pharmaceutically acceptable carrier will not promote the raising of an immune response to an agent with which it is admixed, unless so desired. The preparation of a pharmacological composition that contains active ingredients dissolved or dispersed therein is well understood in the art and need not be limited based on formulation. Typically, such compositions are prepared as injectable either as liquid solutions or suspensions, however, solid forms suitable for solution, or suspensions, in liquid prior to use can also be prepared. The preparation can also be emulsified or presented as a liposome composition. The active ingredient can be mixed with excipients which are pharmaceutically acceptable and compatible with the active ingredient and in amounts suitable for use in the therapeutic methods described herein. Suitable excipients include, for example, water, saline, dextrose, glycerol, ethanol or the like and combinations thereof. In addition, if desired, the composition can contain minor amounts of auxiliary substances such as wetting or emulsifying agents, pH buffering agents and the like which enhance the effectiveness of the active ingredient. The therapeutic composition of the present disclosure can include pharmaceutically acceptable salts of the components therein. Pharmaceutically acceptable salts include the acid addition salts (formed with the free amino groups of the polypeptide) that are formed with inorganic acids such as, for example, hydrochloric or phosphoric acids, or such organic acids as acetic, tartaric, mandelic and the like. Salts formed with the free carboxyl groups can also be derived from inorganic bases such as, for example, sodium, potassium, ammonium, calcium or ferric hydroxides, and such organic bases as isopropylamine, trimethylamine, 2-ethylamino ethanol, histidine, procaine and the like. Physiologically tolerable carriers are well known in the art. Exemplary liquid carriers are sterile aqueous solutions that contain no materials in addition to the active ingredients and water, or contain a buffer such as sodium phosphate at physiological pH value, physiological saline or both, such as phosphate-buffered saline. Still further, aqueous carriers can contain more than one buffer salt, as well as salts such as sodium and potassium chlorides, dextrose, polyethylene glycol and other solutes. Liquid compositions can also contain liquid phases in addition to and to the exclusion of water. Exemplary of such additional liquid phases are glycerin, vegetable oils such as cottonseed oil, and water-oil emulsions. The amount of an active agent used in the methods described herein that will be effective in the treatment of a particular disorder or condition will depend on the nature of the disorder or condition, and can be determined by standard clinical techniques. Suitable pharmaceutical carriers are described in Remington's Pharmaceutical Sciences, A. Osol, a standard reference text in this field of art. For example, a parenteral composition suitable for administration by injection is prepared by dissolving 1.5% by weight of active ingredient in 0.9% sodium chloride solution.

The term "carrier" in the context of a pharmaceutical carrier refers to a diluent, adjuvant, excipient, or vehicle with which the therapeutic is administered. Such pharmaceutical carriers can be sterile liquids, such as water and oils, including those of petroleum, animal, vegetable or synthetic origin, such as peanut oil, soybean oil, mineral oil, sesame oil and the like. Water is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained-release formulations, and the like. The composition can be formulated as a suppository, with traditional binders and carriers such as triglycerides. Oral formulation can include standard carriers such as pharmaceutical grades of mannitol, lactose, starch, magnesium stearate, sodium saccharine, cellulose, magnesium carbonate, etc. Examples of suitable pharmaceutical carriers are described in Remington's Pharmaceutical Sciences, 18th Ed., Gennaro, ed. (Mack Publishing Co., 1990). The formulation should suit the mode of administration.

Pharmaceutically acceptable carriers and diluents include saline, aqueous buffer solutions, solvents and/or dispersion media. The use of such carriers and diluents is well known in the art. Some non-limiting examples of materials which can serve as pharmaceutically-acceptable carriers include: (1) sugars, such as lactose, glucose and sucrose; (2) starches, such as corn starch and potato starch; (3) cellulose, and its derivatives, such as sodium carboxymethyl cellulose, methylcellulose, ethyl cellulose, microcrystalline cellulose and cellulose acetate; (4) powdered tragacanth; (5) malt; (6) gelatin; (7) lubricating agents, such as magnesium stearate, sodium lauryl sulfate and talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol (PEG); (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) pH buffered solutions; (21) polyesters, polycarbonates and/or polyanhydrides; (22) bulking agents, such as polypeptides and amino acids (23) serum component, such as serum albumin, HDL and LDL; (22) $C_2$-$C_{12}$ alcohols, such as ethanol; and (23) other non-toxic compatible substances employed in pharmaceutical formulations. Wetting agents, coloring agents, release agents, coating agents, sweetening agents, flavoring agents, perfuming agents, preservative and antioxidants can also be present in the formulation. The terms such as "excipient", "carrier", "pharmaceutically acceptable carrier" or the like are used interchangeably herein. In some embodiments, the carrier inhibits the degradation of the active compound. The term "pharmaceutically acceptable carrier" excludes tissue culture medium.

In some embodiments of any of the aspects, a composition or combination as described herein, can be formulated as a transdermal, oral, subcutaneous, intravenous, intradermal, or parenteral formulation. In some embodiments of any of the aspects, a composition or combination as described herein, can be formulated for administration which is to a mucus membrane (e.g., a nasal, oral, or vaginal membrane), oral, subcutaneous, intradermal, parenteral, intratumoral, or intravenous In some embodiments of any of the aspects, an oral formulation can be a degradable capsule comprising the composition or combination described herein.

In some embodiments of any of the aspects described herein, the biological activity of the active compound is improved or stabilized as compared to the activity in the absence of the ionic liquid and/or non-ionic surfactant.

It is specifically contemplated that a composition or combination described herein can comprise one, two, three, or more of any of the types of components described herein. For example, a composition can comprise a mixture, solution, combination, or emulsion of two or more different ionic liquids, and/or a a mixture, solution, combination, or emulsion of two or more different non-ionic surfactants, and/or a mixture, solution, combination, or emulsion of two or more different active compounds.

As used herein, "in combination with" refers to two or more substances being present in the same formulation in any molecular or physical arrangement, e.g, in an admixture, in a solution, in a mixture, in a suspension, in a colloid, in an emulsion. The formulation can be a homogeneous or heterogenous mixture. In some embodiments of any of the aspects, the active compound(s) can be comprised by a superstructure, e.g., nanoparticles, liposomes, vectors, cells, scaffolds, or the like, and said superstructure is in solution, mixture, admixture, suspension, etc., with the at least one IL and at least one non-ionic surfactant.

In one aspect of any of the embodiments, the composition or combination described herein is for a method of administering or delivering at least one active compound, e.g., for the treatment of a disease. In one aspect of any of the embodiments, described herein is a method of administering at least one active compound, the method comprising administering the active compound in combination with a composition comprising:
a. an ionic liquid; and
b. at least one non-ionic surfactant.

In one aspect of any of the embodiments, described herein is a method of treating a disease by administering at least one active compound, the method comprising administering the active compound in combination with a composition comprising:
c. an ionic liquid; and
d. at least one non-ionic surfactant.

In some embodiments, the methods described herein relate to treating a subject having or diagnosed as having a condition with a composition or combination as described herein. Subjects having a condition, e.g., diabetes, can be identified by a physician using current methods of diagnosing diabetes. Symptoms and/or complications of diabetes which characterize these conditions and aid in diagnosis are well known in the art and include but are not limited to, weight loss, slow healing, polyuria, polydipsia, polyphagiam headaches, itchy skin, and fatigue. Tests that may aid in a diagnosis of, e.g. diabetes include, but are not limited to, blood tests (e.g., for fasting glucose levels). A family history of diabetes, or exposure to risk factors for diabetes (e.g. overweight) can also aid in determining if a subject is likely to have diabetes or in making a diagnosis of diabetes.

The compositions, combinations, and methods described herein can be administered to a subject having or diagnosed as having a condition described herein. In some embodiments, the methods described herein comprise administering an effective amount of a composition or combination described herein to a subject in order to alleviate a symptom of a condition described herein. As used herein, "alleviating a symptom" is ameliorating any marker or symptom associated with a condition. As compared with an equivalent untreated control, such reduction is by at least 5%, 10%, 20%, 40%, 50%, 60%, 80%, 90%, 95%, 99% or more as measured by any standard technique. A variety of means for administering the compositions described herein to subjects are known to those of skill in the art. Such methods can include, but are not limited to oral, parenteral, intravenous, intramuscular, subcutaneous, transdermal, airway (aerosol), pulmonary, cutaneous, injection, or intratumoral administration. In some embodiments of any of the aspects, the administration is transdermal, to a mucus membrane (e.g., a nasal, oral, or vaginal membrane), oral, subcutaneous, intradermal, parenteral, intratumoral, or intravenous. Administration can be local or systemic.

The term "effective amount" as used herein refers to the amount of a composition needed to alleviate at least one or more symptom of the disease or disorder, and relates to a sufficient amount of pharmacological composition to provide the desired effect. The term "therapeutically effective amount" therefore refers to an amount of a composition that is sufficient to provide a particular effect when administered to a typical subject. An effective amount as used herein, in various contexts, would also include an amount sufficient to delay the development of a symptom of the disease, alter the course of a symptom disease (for example but not limited to, slowing the progression of a symptom of the disease), or reverse a symptom of the disease. Thus, it is not generally practicable to specify an exact "effective amount". However, for any given case, an appropriate "effective amount" can be determined by one of ordinary skill in the art using only routine experimentation.

Effective amounts, toxicity, and therapeutic efficacy can be determined by standard pharmaceutical procedures in cell cultures or experimental animals, e.g., for determining the LD50 (the dose lethal to 50% of the population) and the ED50 (the dose therapeutically effective in 50% of the population). The dosage can vary depending upon the dosage form employed and the route of administration utilized. The dose ratio between toxic and therapeutic effects is the therapeutic index and can be expressed as the ratio LD50/ED50. Compositions and methods that exhibit large therapeutic indices are preferred. A therapeutically effective dose can be estimated initially from cell culture assays. Also, a dose can be formulated in animal models to achieve a circulating plasma concentration range that includes the IC50 (i.e., the concentration of the active compound, which achieves a half-maximal inhibition of symptoms) as determined in cell culture, or in an appropriate animal model. Levels in plasma can be measured, for example, by high performance liquid chromatography. The effects of any particular dosage can be monitored by a suitable bioassay, e.g., assay for blood glucose, among others. The dosage can be determined by a physician and adjusted, as necessary, to suit observed effects of the treatment.

In some embodiments of any of the aspects, the composition as described herein, e.g., a composition comprising CAGE in combination with at least one active compound, is administered as a monotherapy, e.g., another treatment for the condition is not administered to the subject.

In some embodiments of any of the aspects, the methods described herein can further comprise administering a second agent and/or treatment to the subject, e.g. as part of a combinatorial therapy, either in the composition or combination described herein, or as a separate formulation. For example, non-limiting examples of a second agent and/or treatment for treatment of cancer can include radiation therapy, surgery, gemcitabine, cisplastin, paclitaxel, carboplatin, bortezomib, AMG479, vorinostat, rituximab, temozolomide, rapamycin, ABT-737, PI-103; alkylating agents such as thiotepa and CYTOXAN® cyclosphosphamide; alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethiylenethiophosphoramide and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, and ranimnustine; antibiotics such as the enediyne antibiotics (e.g., calicheamicin, especially calicheamicin gamma1I and calicheamicin omega1I (see, e.g., Agnew, Chem. Intl. Ed. Engl., 33: 183-186 (1994)); dynemicin, including dynemicin A; bisphosphonates, such as clodronate; an esperamicin; as well as neocarzinostatin chromophore and related chromoprotein enediyne antibiotic chromophores), aclacinomysins, actinomycin, authramycin, azaserine, bleomycins, cactinomycin, carabicin, caminomycin, carzinophilin, chromomycinis, dactinomycin, daunorubicin, detorubicin, 6-diazo-5-oxo-L-norleucine, ADRIAMYCIN® doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins such as mitomycin C, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSK® polysaccharide complex (JHS Natural Products, Eugene, Oreg.); razoxane; rhizoxin; sizofuran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; thiotepa; taxoids, e.g., TAXOL® paclitaxel (Bristol-Myers Squibb Oncology, Princeton, N.J.), ABRAXANE® Cremophor-free, albumin-engineered nanoparticle formulation of paclitaxel (American Pharmaceutical Partners, Schaumberg, Ill.), and TAXOTERE® doxetaxel (Rhone-Poulenc Rorer, Antony, France); chloranbucil; GEMZAR® gemcitabine; 6-thioguanine; mercaptopurine; methotrexate; platinum analogs such as cisplatin, oxaliplatin and carboplatin; vinblastine; platinum; etoposide (VP-16); ifosfamide; mitoxantrone; vincristine; NAVELBINE® vinorelbine; novantrone; teniposide; edatrexate; daunomycin; aminopterin; xeloda; ibandronate; irinotecan (Camptosar, CPT-11) (including the treatment regimen of irinotecan with 5-FU and leucovorin); topoisomerase inhibitor RFS 2000; difluoromethylornithine (DMFO); retinoids such as retinoic acid; capecitabine; combretastatin; leucovorin (LV); oxaliplatin, including the oxaliplatin treatment regimen (FOLFOX); lapatinib (Tykerb®); inhibitors of PKC-alpha, Raf, H-Ras, EGFR (e.g., erlotinib (Tarceva®)) and VEGF-A that reduce cell proliferation and pharmaceutically acceptable salts, acids or derivatives of any of the above. In addition, the methods of treatment can further include the use of radiation or radiation therapy. Further, the methods of treatment can further include the use of surgical treatments.

In certain embodiments, an effective dose of a composition or combination described herein can be administered to a patient once. In certain embodiments, an effective dose of a composition or combination described herein can be administered to a patient repeatedly. For systemic administration, subjects can be administered a therapeutic amount of a composition or combination as described herein, e.g. 0.1 mg/kg, 0.5 mg/kg, 1.0 mg/kg, 2.0 mg/kg, 2.5 mg/kg, 5 mg/kg, 10 mg/kg, 15 mg/kg, 20 mg/kg, 25 mg/kg, 30 mg/kg, 40 mg/kg, 50 mg/kg, or more.

In some embodiments, the active compound can be administered at a dose of from about 0.1 mg/kg to about 1,000 mg/kg. In some embodiments, the active compound can be administered at a dose of from 0.1 mg/kg to 1,000 mg/kg. In some embodiments, the active compound can be administered at a dose of from about 1 mg/kg to about 20 mg/kg. In some embodiments, the active compound can be administered at a dose of from 1 mg/kg to 20 mg/kg.

In some embodiments, the active compound is insulin and the concentration or dosage of insulin can be from about 1 U/kg to about 20 U/kg. In some embodiments, the active compound is insulin and the concentration or dosage of insulin can be from 1 U/kg to 20 U/kg. In some embodiments, the active compound is insulin and the concentration or dosage of insulin can be less than 20 U/kg. In some embodiments, the active compound is insulin and the concentration or dosage of insulin can be from about 2 U/kg to about 10 U/kg. In some embodiments, the active compound is insulin and the concentration or dosage of insulin can be from 2 U/kg to 10 U/kg. In some embodiments, the active compound is insulin and the concentration or dosage of insulin can be from about 2 U/kg to about 5 U/kg. In some embodiments, the active compound is insulin and the concentration or dosage of insulin can be from 2 U/kg to 5 U/kg. In some embodiments, the active compound is insulin and the concentration or dosage of insulin can be from about 5 U/kg to about 10 U/kg. In some embodiments, the active compound is insulin and the concentration or dosage of insulin can be from 5 U/kg to 10 U/kg. In some embodiments, the active compound is insulin and the concentration or dosage of insulin can be 2 U/kg, 5 U/kg, or 10 U/kg.

In some embodiments, after an initial treatment regimen, the treatments can be administered on a less frequent basis. For example, after treatment biweekly for three months, treatment can be repeated once per month, for six months or a year or longer. Treatment according to the methods described herein can reduce levels of a marker or symptom of a condition, by at least 10%, at least 15%, at least 20%, at least 25%, at least 30%, at least 40%, at least 50%, at least 60%, at least 70%, at least 80% or at least 90% or more.

The dosage of a composition as described herein can be determined by a physician and adjusted, as necessary, to suit observed effects of the treatment. With respect to duration and frequency of treatment, it is typical for skilled clinicians to monitor subjects in order to determine when the treatment is providing therapeutic benefit, and to determine whether to increase or decrease dosage, increase or decrease administration frequency, discontinue treatment, resume treatment, or make other alterations to the treatment regimen. The dosing schedule can vary from once a week to daily depending on a number of clinical factors, such as the subject's sensitivity to the active compound. The desired dose or amount of activation can be administered at one time or divided into subdoses, e.g., 2-4 subdoses and administered over a period of time, e.g., at appropriate intervals through the day or other appropriate schedule. In some embodiments, administration can be chronic, e.g., one or more doses and/or treatments daily over a period of weeks or months. Examples of dosing and/or treatment schedules are administration daily, twice daily, three times daily or four or more times daily over a period of 1 week, 2 weeks, 3 weeks, 4 weeks, 1 month, 2 months, 3 months, 4 months, 5 months, or 6 months, or more. A composition or combination described herein can be administered over a period of time, such as over a 5 minute, 10 minute, 15 minute, 20 minute, or 25 minute period.

The dosage ranges for the administration of the compositions described herein, according to the methods described herein depend upon, for example, the form of the active compound, its potency, and the extent to which symptoms, markers, or indicators of a condition described herein are desired to be reduced, for example the percentage reduction desired for symptoms or markers. The dosage should not be so large as to cause adverse side effects. Generally, the dosage will vary with the age, condition, and sex of the patient and can be determined by one of skill in the art. The dosage can also be adjusted by the individual physician in the event of any complication.

The efficacy of a composition described in, e.g. the treatment of a condition described herein, or to induce a response as described herein can be determined by the skilled clinician. However, a treatment is considered "effective treatment," as the term is used herein, if one or more of the signs or symptoms of a condition described herein are altered in a beneficial manner, other clinically accepted symptoms are improved, or even ameliorated, or a desired response is induced e.g., by at least 10% following treatment according to the methods described herein. Efficacy can be assessed, for example, by measuring a marker, indicator, symptom, and/or the incidence of a condition treated according to the methods described herein or any other measurable parameter appropriate. Efficacy can also be measured by a failure of an individual to worsen as assessed by hospitalization, or need for medical interventions (i.e., progression of the disease is halted). Methods of measuring these indicators are known to those of skill in the art and/or are described herein. Treatment includes any treatment of a disease in an individual or an animal (some non-limiting examples include a human or an animal) and includes: (1) inhibiting the disease, e.g., preventing a worsening of symptoms (e.g. pain or inflammation); or (2) relieving the severity of the disease, e.g., causing regression of symptoms. An effective amount for the treatment of a disease means that amount which, when administered to a subject in need thereof, is sufficient to result in effective treatment as that term is defined herein, for that disease. Efficacy of an agent can be determined by assessing physical indicators of a condition or desired response. It is well within the ability of one skilled in the art to monitor efficacy of administration and/or treatment by measuring any one of such parameters, or any combination of parameters. Efficacy can be assessed in animal models of a condition described herein, for example treatment of diabetes or cancer. When using an experimental animal model, efficacy of treatment is evidenced when a statistically significant change in a marker is observed.

In vitro and animal model assays are provided herein which allow the assessment of a given dose of a composition described herein. By way of non-limiting example, the effects of a dose of a composition or combination described herein can be assessed using a mouse model, e.g., of a disease the active compound is therapeutic for.

In some embodiments of any of the aspects, the active compound is therapeutically effective in treating obesity. In some embodiments of any of the aspects, the active compound is therapeutically effective in treating a disease associated with obesity. In some embodiments of any of the aspects, the active compound is therapeutically effective in treating a disease caused by obesity. In some embodiments of any of the aspects, the active compound is therapeutically effective in treating a disease which causes obesity. In some embodiments of any of the aspects, the active compound is therapeutically effective in treating metabolic syndrome. In some embodiments of any of the aspects, the subject administered a composition or combination described herein is a subject having, diagnosed as having, or in need of treatment for obesity, excess weight, or prevention of weight gain. In some embodiments, the subject is overweight. The methods described herein comprises methods of treating obesity, reducing weight gain, preventing weight gain, promoting weight loss, and the like. Such methods can, e.g., promote metabolic health, be pursued for aesthetic reasons, and/or prepare patients for surgical interventions which are counterindicated for those with high BMIs or weights. In some embodiments, weight loss can be medically necessary and/or medically indicated, e.g. when the subject is overweight and/or obese. In some embodiments, weight loss can be for cosmetic purposes, e.g. when the subject desires to lose weight whether or not weight loss is medically necessary and/or medically indicated.

The term "obesity" refers to excess fat in the body. Obesity can be determined by any measure accepted and utilized by those of skill in the art. Currently, an accepted measure of obesity is body mass index (BMI), which is a measure of body weight in kilograms relative to the square of height in meters. Generally, for an adult over age 20, a BMI between about 18.5 and 24.9 is considered normal, a BMI between about 25.0 and 29.9 is considered overweight, a BMI at or above about 30.0 is considered obese, and a BMI at or above about 40 is considered morbidly obese. (See, e.g., Gallagher et al. (2000) Am J Clin Nutr 72:694-701.) These BMI ranges are based on the effect of body weight on increased risk for disease. Some common conditions related to high BMI and obesity include cardiovascular disease, high blood pressure (i.e., hypertension), osteoarthritis, cancer, and diabetes. Although BMI correlates with body fat, the relation between BMI and actual body fat differs with age and gender. For example, women are more likely to have a higher percent of body fat than men for the same BMI. Furthermore, the BMI threshold that separates normal, overweight, and obese can vary, e.g. with age, gender, ethnicity, fitness, and body type, amongst other factors. In some embodiments, a subject with obesity can be a subject with a body mass index of at least about 25 kg/m$^2$ prior to administration of a treatment as described herein. In some embodiments, a subject with obesity can be a subject with a body mass index of at least about 30 kg/m$^2$ prior to administration of a treatment as described herein.

In some embodiments of any of the aspects, the subject administered a composition or combination described herein is a subject having, diagnosed as having, or in need of treatment for a metabolic disorder or metabolic syndrome. The term "metabolic disorder" refers to any disorder associated with or aggravated by impaired or altered glucose regulation or glycemic control, such as, for example, insulin resistance. Such disorders include, but are not limited to obesity; excess adipose tissue; diabetes; fatty liver disease; non-alcoholic fatty liver disease; metabolic syndrome; dyslipidemia; hypertension; hyperglycemia; and cardiovascular disease. "Metabolic syndrome", which is distinct from metabolic disorder, refers to a combination of medical disorders that, when occurring together, increase the risk of developing cardiovascular disease and diabetes. A number of definitions of metabolic syndrome have been established, e.g by the American Heart Association and the International Diabetes Foundation. As but one example, the WHO defines metabolic syndrome as the presence of any one of diabetes mellitus, impaired glucose tolerance, impaired fasting glucose or insulin resistance and two of the following: blood pressure equal to or greater than 140/90 mmHg, dyslipidemia, central obesity, and microalbuminuria. In some embodiments, the metabolic disorder can be selected from the group consisting of: obesity; excess adipose tissue; diabetes; and cardiovascular disease.

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail.

For convenience, certain terms employed herein, in the specification, examples and appended claims are collected here.

The terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g. the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, a "increase" is a statistically significant increase in such level.

As used herein, a "subject" means a human or animal. Usually the animal is a vertebrate such as a primate, rodent, domestic animal or game animal. Primates include chimpanzees, cynomologous monkeys, spider monkeys, and macaques, e.g., Rhesus. Rodents include mice, rats, woodchucks, ferrets, rabbits and hamsters. Domestic and game animals include cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human. The terms, "individual," "patient" and "subject" are used interchangeably herein.

Preferably, the subject is a mammal. The mammal can be a human, non-human primate, mouse, rat, dog, cat, horse, or cow, but is not limited to these examples. Mammals other than humans can be advantageously used as subjects that represent animal models of a given condition. A subject can be male or female.

A subject can be one who has been previously diagnosed with or identified as suffering from or having a condition in need of treatment or one or more complications related to such a condition, and optionally, have already undergone treatment for the condition or the one or more complications related to the condition. Alternatively, a subject can also be one who has not been previously diagnosed as having the condition or one or more complications related to the condition. For example, a subject can be one who exhibits one or more risk factors for the condition or one or more complications related to the condition or a subject who does not exhibit risk factors.

A "subject in need" of treatment for a particular condition can be a subject having that condition, diagnosed as having that condition, or at risk of developing that condition.

As used herein, "diabetes" refers to diabetes mellitus, a metabolic disease characterized by a deficiency or absence of insulin secretion by the pancreas. As used throughout, "diabetes" includes Type 1, Type 2, Type 3, and Type 4 diabetes mellitus unless otherwise specified herein. The onset of diabetes is typically due to a combination of hereditary and environmental causes, resulting in abnormally high blood sugar levels (hyperglycemia). The two most common forms of diabetes are due to either a diminished production of insulin (in type 1), or diminished response by the body to insulin (in type 2 and gestational). Both lead to hyperglycemia, which largely causes the acute signs of diabetes: excessive urine production, resulting compensatory thirst and increased fluid intake, blurred vision, unexplained weight loss, lethargy, and changes in energy metabolism. Diabetes can cause many complications. Acute complications (hypoglycemia, ketoacidosis, or nonketotic hyperosmolar coma) may occur if the disease is not adequately controlled. Serious long-term complications (i.e. chronic side effects) include cardiovascular disease (doubled risk), chronic renal failure, retinal damage (which can lead to blindness), nerve damage (of several kinds), and microvascular damage, which may cause impotence and poor wound healing. Poor healing of wounds, particularly of the feet, can lead to gangrene, and possibly to amputation. In some embodiments, the diabetes can be Type 2 diabetes. Type 2 diabetes (non-insulin-dependent diabetes mellitus (NIDDM), or adult-onset diabetes) is a metabolic disorder that is primarily characterized by insulin resistance (diminished response by the body to insulin), relative insulin deficiency, and hyperglycemia. In some embodiments, a subject can be pre-diabetic, which can be characterized, for example, as having elevated fasting blood sugar or elevated post-prandial blood sugar.

As used herein, the term "cancer" relates generally to a class of diseases or conditions in which abnormal cells divide without control and can invade nearby tissues. Cancer cells can also spread to other parts of the body through the blood and lymph systems. There are several main types of cancer. Carcinoma is a cancer that begins in the skin or in tissues that line or cover internal organs. Sarcoma is a cancer that begins in bone, cartilage, fat, muscle, blood vessels, or other connective or supportive tissue. Leukemia is a cancer that starts in blood-forming tissue such as the bone marrow, and causes large numbers of abnormal blood cells to be produced and enter the blood. Lymphoma and multiple myeloma are cancers that begin in the cells of the immune system. Central nervous system cancers are cancers that begin in the tissues of the brain and spinal cord.

In some embodiments of any of the aspects, the cancer is a primary cancer. In some embodiments of any of the aspects, the cancer is a malignant cancer. As used herein, the term "malignant" refers to a cancer in which a group of tumor cells display one or more of uncontrolled growth (i.e., division beyond normal limits), invasion (i.e., intrusion on and destruction of adjacent tissues), and metastasis (i.e., spread to other locations in the body via lymph or blood). As used herein, the term "metastasize" refers to the spread of cancer from one part of the body to another. A tumor formed by cells that have spread is called a "metastatic tumor" or a "metastasis." The metastatic tumor contains cells that are like those in the original (primary) tumor. As used herein, the term "benign" or "non-malignant" refers to tumors that may grow larger but do not spread to other parts of the body. Benign tumors are self-limited and typically do not invade or metastasize.

A "cancer cell" or "tumor cell" refers to an individual cell of a cancerous growth or tissue. A tumor refers generally to a swelling or lesion formed by an abnormal growth of cells, which may be benign, pre-malignant, or malignant. Most cancer cells form tumors, but some, e.g., leukemia, do not necessarily form tumors. For those cancer cells that form tumors, the terms cancer (cell) and tumor (cell) are used interchangeably.

As used herein the term "neoplasm" refers to any new and abnormal growth of tissue, e.g., an abnormal mass of tissue, the growth of which exceeds and is uncoordinated with that of the normal tissues. Thus, a neoplasm can be a benign neoplasm, premalignant neoplasm, or a malignant neoplasm.

A subject that has a cancer or a tumor is a subject having objectively measurable cancer cells present in the subject's body. Included in this definition are malignant, actively proliferative cancers, as well as potentially dormant tumors or micrometastatses. Cancers which migrate from their original location and seed other vital organs can eventually lead to the death of the subject through the functional deterioration of the affected organs.

Examples of cancer include but are not limited to, carcinoma, lymphoma, blastoma, sarcoma, leukemia, basal cell carcinoma, biliary tract cancer; bladder cancer; bone cancer; brain and CNS cancer; breast cancer; cancer of the peritoneum; cervical cancer; choriocarcinoma; colon and rectum cancer; connective tissue cancer; cancer of the digestive system; endometrial cancer; esophageal cancer; eye cancer; cancer of the head and neck; gastric cancer (including gastrointestinal cancer); glioblastoma (GBM); hepatic carcinoma; hepatoma; intra-epithelial neoplasm; kidney or renal cancer; larynx cancer; leukemia; liver cancer; lung cancer (e.g., small-cell lung cancer, non-small cell lung cancer, adenocarcinoma of the lung, and squamous carcinoma of the lung); lymphoma including Hodgkin's and non-Hodgkin's lymphoma; melanoma; myeloma; neuroblastoma; oral cavity cancer (e.g., lip, tongue, mouth, and pharynx); ovarian cancer; pancreatic cancer; prostate cancer; retinoblastoma; rhabdomyosarcoma; rectal cancer; cancer of the respiratory system; salivary gland carcinoma; sarcoma; skin cancer; squamous cell cancer; stomach cancer; testicular cancer; thyroid cancer; uterine or endometrial cancer; cancer of the urinary system; vulval cancer; as well as other carcinomas and sarcomas; as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblastic leukemia; and post-transplant lymphoproliferative disorder (PTLD), as well as abnormal vascular proliferation associated with phakomatoses, edema (such as that associated with brain tumors), and Meigs' syndrome.

A "cancer cell" is a cancerous, pre-cancerous, or transformed cell, either in vivo, ex vivo, or in tissue culture, that has spontaneous or induced phenotypic changes that do not necessarily involve the uptake of new genetic material. Although transformation can arise from infection with a transforming virus and incorporation of new genomic nucleic acid, or uptake of exogenous nucleic acid, it can also arise spontaneously or following exposure to a carcinogen, thereby mutating an endogenous gene. Transformation/cancer is associated with, e.g., morphological changes, immortalization of cells, aberrant growth control, foci formation, anchorage independence, malignancy, loss of contact inhibition and density limitation of growth, growth factor or serum independence, tumor specific markers, invasiveness or metastasis, and tumor growth in suitable animal hosts such as nude mice.

As used herein, the terms "protein" and "polypeptide" are used interchangeably herein to designate a series of amino acid residues, connected to each other by peptide bonds between the alpha-amino and carboxy groups of adjacent residues. The terms "protein", and "polypeptide" refer to a polymer of amino acids, including modified amino acids (e.g., phosphorylated, glycated, glycosylated, etc.) and amino acid analogs, regardless of its size or function. "Protein" and "polypeptide" are often used in reference to relatively large polypeptides, whereas the term "peptide" is often used in reference to small polypeptides, but usage of these terms in the art overlaps. The terms "protein" and "polypeptide" are used interchangeably herein when referring to a gene product and fragments thereof. Thus, exemplary polypeptides or proteins include gene products, naturally occurring proteins, homologs, orthologs, paralogs, fragments and other equivalents, variants, fragments, and analogs of the foregoing.

In the various embodiments described herein, it is further contemplated that variants (naturally occurring or otherwise), alleles, homologs, conservatively modified variants, and/or conservative substitution variants of any of the particular polypeptides described are encompassed. As to amino acid sequences, one of skill will recognize that individual substitutions, deletions or additions to a nucleic acid, peptide, polypeptide, or protein sequence which alters a single amino acid or a small percentage of amino acids in the encoded sequence is a "conservatively modified variant" where the alteration results in the substitution of an amino acid with a chemically similar amino acid and retains the desired activity of the polypeptide. Such conservatively modified variants are in addition to and do not exclude polymorphic variants, interspecies homologs, and alleles consistent with the disclosure.

A given amino acid can be replaced by a residue having similar physiochemical characteristics, e.g., substituting one aliphatic residue for another (such as Ile, Val, Leu, or Ala for one another), or substitution of one polar residue for another (such as between Lys and Arg; Glu and Asp; or Gln and Asn). Other such conservative substitutions, e.g., substitutions of entire regions having similar hydrophobicity characteristics, are well known. Polypeptides comprising conservative amino acid substitutions can be tested in any one of the assays described herein to confirm that a desired activity, e.g. the activity and specificity of a native or reference polypeptide is retained.

Amino acids can be grouped according to similarities in the properties of their side chains (in A. L. Lehninger, in Biochemistry, second ed., pp. 73-75, Worth Publishers, New York (1975)): (1) non-polar: Ala (A), Val (V), Leu (L), Ile (I), Pro (P), Phe (F), Trp (W), Met (M); (2) uncharged polar: Gly (G), Ser (S), Thr (T), Cys (C), Tyr (Y), Asn (N), Gln (Q); (3) acidic: Asp (D), Glu (E); (4) basic: Lys (K), Arg (R), His (H). Alternatively, naturally occurring residues can be divided into groups based on common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; (6) aromatic: Trp, Tyr, Phe. Non-conservative substitutions will entail exchanging a member of one of these classes for another class. Particular conservative substitutions include, for example; Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into Ile or into Val; Lys into Arg, into Gln or into Glu; Met into Leu, into Tyr or into Ile; Phe into Met, into Leu or into Tyr; Ser into Thr; Thr into Ser; Trp into Tyr; Tyr into Trp; and/or Phe into Val, into Ile or into Leu.

In some embodiments, the polypeptide described herein (or a nucleic acid encoding such a polypeptide) can be a functional fragment of one of the amino acid sequences described herein. As used herein, a "functional fragment" is a fragment or segment of a peptide which retains at least 50% of the wildtype reference polypeptide's activity according to the assays described below herein. A functional fragment can comprise conservative substitutions of the sequences disclosed herein.

In some embodiments, the polypeptide described herein can be a variant of a sequence described herein. In some embodiments, the variant is a conservatively modified variant. Conservative substitution variants can be obtained by mutations of native nucleotide sequences, for example. A "variant," as referred to herein, is a polypeptide substantially homologous to a native or reference polypeptide, but which has an amino acid sequence different from that of the native or reference polypeptide because of one or a plurality of deletions, insertions or substitutions. Variant polypeptide-encoding DNA sequences encompass sequences that comprise one or more additions, deletions, or substitutions of nucleotides when compared to a native or reference DNA sequence, but that encode a variant protein or fragment thereof that retains activity. A wide variety of PCR-based site-specific mutagenesis approaches are known in the art and can be applied by the ordinarily skilled artisan.

A variant amino acid or DNA sequence can be at least 90%, at least 91%, at least 92%, at least 93%, at least 94%, at least 95%, at least 96%, at least 97%, at least 98%, at least 99%, or more, identical to a native or reference sequence. The degree of homology (percent identity) between a native and a mutant sequence can be determined, for example, by comparing the two sequences using freely available computer programs commonly employed for this purpose on the world wide web (e.g. BLASTp or BLASTn with default settings).

Alterations of the native amino acid sequence can be accomplished by any of a number of techniques known to one of skill in the art. Mutations can be introduced, for example, at particular loci by synthesizing oligonucleotides containing a mutant sequence, flanked by restriction sites enabling ligation to fragments of the native sequence. Following ligation, the resulting reconstructed sequence encodes an analog having the desired amino acid insertion, substitution, or deletion. Alternatively, oligonucleotide-directed site-specific mutagenesis procedures can be employed to provide an altered nucleotide sequence having particular codons altered according to the substitution, deletion, or insertion required. Techniques for making such alterations are very well established and include, for example, those disclosed by Walder et al. (Gene 42:133, 1986); Bauer et al. (Gene 37:73, 1985); Craik (BioTechniques, January 1985, 12-19); Smith et al. (Genetic Engineering: Principles and Methods, Plenum Press, 1981); and U.S. Pat. Nos. 4,518,584 and 4,737,462, which are herein incorporated by reference in their entireties. Any cysteine residue not involved in maintaining the proper conformation of the polypeptide also can be substituted, generally with serine, to improve the oxidative stability of the molecule and prevent aberrant crosslinking. Conversely, cysteine bond(s) can be added to the polypeptide to improve its stability or facilitate oligomerization.

As used herein, the term "antibody" refers to immunoglobulin molecules and immunologically active portions of immunoglobulin molecules, i.e., molecules that contain an antigen binding site that immunospecifically binds an antigen. The term also refers to antibodies comprised of two immunoglobulin heavy chains and two immunoglobulin light chains as well as a variety of forms including full length antibodies and antigen-binding portions thereof; including, for example, an immunoglobulin molecule, a monoclonal antibody, a chimeric antibody, a CDR-grafted antibody, a humanized antibody, a Fab, a Fab', a F(ab')2, a Fv, a disulfide linked Fv, a scFv, a single domain antibody (dAb), a diabody, a multispecific antibody, a dual specific antibody, an anti-idiotypic antibody, a bispecific antibody, a functionally active epitope-binding portion thereof, and/or bifunctional hybrid antibodies.

Each heavy chain is composed of a variable region of said heavy chain (abbreviated here as HCVR or VH) and a constant region of said heavy chain. The heavy chain constant region consists of three domains CH1, CH2 and CH3. Each light chain is composed of a variable region of said light chain (abbreviated here as LCVR or VL) and a constant region of said light chain. The light chain constant region consists of a CL domain. The VH and VL regions may be further divided into hypervariable regions referred to as complementarity-determining regions (CDRs) and interspersed with conserved regions referred to as framework regions (FR). Each VH and VL region thus consists of three CDRs and four FRs which are arranged from the N terminus to the C terminus in the following order: FR1, CDR1, FR2, CDR2, FR3, CDR3, FR4. This structure is well known to those skilled in the art.

As used herein, the term "CDR" refers to the complementarity determining regions within antibody variable sequences. There are three CDRs in each of the variable regions of the heavy chain and of the light chain, which are designated CDR1, CDR2 and CDR3, for each of the variable regions. The exact boundaries of these CDRs have been defined differently according to different systems. The system described by Kabat (Kabat et al., Sequences of Proteins of Immunological Interest (National Institutes of Health, Bethesda, Md. (1987) and (1991)) not only provides an unambiguous residue numbering system applicable to any variable region of an antibody, but also provides precise residue boundaries defining the three CDRs. These CDRs may be referred to as Kabat CDRs. Other boundaries defining CDRs overlapping with the Kabat CDRs have been described by Padlan (FASEB J. 9:133-139 (1995)) and MacCallum (J Mol Biol 262(5):732-45 (1996)) and Chothia (J. Mol. Biol. 196:901-917 (1987) and Nature 342:877-883 (1989)). Still other CDR boundary definitions may not strictly follow one of the above systems, but will nonetheless overlap with the Kabat CDRs, although they may be shortened or lengthened in light of prediction or experimental findings that particular residues or groups of residues or even entire CDRs do not significantly impact antigen binding. The methods used herein may utilize CDRs defined according to any of these systems, although preferred embodiments use Kabat defined CDRs.

The term "antigen-binding portion" of an antibody refers to one or more portions of an antibody as described herein, said portions) still having the binding affinities as defined above herein. Portions of a complete antibody have been shown to be able to carry out the antigen-binding function of an antibody. In accordance with the term "antigen-binding portion" of an antibody, examples of binding portions include (i) an Fab portion, i.e., a monovalent portion composed of the VL, VH, CL and CH1 domains; (ii) an F(ab')2 portion, i.e., a bivalent portion comprising two Fab portions linked to one another in the hinge region via a disulfide bridge; (iii) an Fd portion composed of the VH and CH1 domains; (iv) an Fv portion composed of the FL and VH domains of a single arm of an antibody; and (v) a dAb portion consisting of a VH domain or of VH, CH1, CH2, DH3, or VH, CH2, CH3 (dAbs, or single domain antibodies, comprising only $V_L$ domains have also been shown to specifically bind to target epitopes). Although the two domains of the Fv portion, namely VL and VH, are encoded by separate genes, they may further be linked to one another using a synthetic linker, e.g., a poly-G4S amino acid sequence ('G4S' disclosed as SEQ ID NO: 5), and recombinant methods, making it possible to prepare them as a single protein chain in which the VL and VH regions combine in order to form monovalent molecules (known as single chain Fv (ScFv)). The term "antigen-binding portion" of an antibody is also intended to comprise such single chain antibodies. Other forms of single chain antibodies such as "diabodies" are likewise included here. Diabodies are bivalent, bispecific antibodies in which VH and VL domains are expressed on a single polypeptide chain, but using a linker which is too short for the two domains being able to combine on the same chain, thereby forcing said domains to pair with complementary domains of a different chain and to form two antigen-binding sites. An immunoglobulin constant domain refers to a heavy or light chain constant domain. Human IgG heavy chain and light chain constant domain amino acid sequences are known in the art.

An antibody can have the structural features of IgA, IgG, IgE, IgD, IgM (as well as subtypes and combinations thereof). Antibodies can be from any source, including mouse, rabbit, pig, rat, and primate (human and non-human primate) and primatized antibodies. Antibodies also include midibodies, humanized antibodies, chimeric antibodies, and the like.

Furthermore, an antibody, antibody reagent, or antigen-binding portion thereof as described herein may be part of a larger immunoadhesion molecule formed by covalent or noncovalent association of said antibody or antibody portion with one or more further proteins or peptides. Relevant to such immunoadhesion molecules are the use of the streptavidin core region in order to prepare a tetrameric scFv molecule and the use of a cystein residue, a marker peptide and a C-terminal polyhistidinyl, e.g., hexahistidinyl tag ('hexahistidinyl tag' disclosed as SEQ ID NO: 6) in order to produce bivalent and biotinylated scFv molecules.

In some embodiments, the antibody, antibody reagent, or antigen-binding portion thereof described herein can be an immunoglobulin molecule, a monoclonal antibody, a chimeric antibody, a CDR-grafted antibody, a humanized antibody, a Fab, a Fab', a F(ab')2, a Fv, a disulfide linked Fv, a scFv, a single domain antibody, a diabody, a multispecific antibody, a dual specific antibody, an anti-idiotypic antibody, a bispecific antibody, and a functionally active epitope-binding portion thereof.

In some embodiments, the antibody or antigen-binding portion thereof is a fully human antibody. In some embodiments, the antibody, antigen-binding portion thereof, is a humanized antibody or antibody reagent. In some embodiments, the antibody, antigen-binding portion thereof, is a fully humanized antibody or antibody reagent. In some embodiments, the antibody or antigen-binding portion thereof, is a chimeric antibody or antibody reagent. In some embodiments, the antibody, antigen-binding portion thereof, is a recombinant polypeptide.

The term "human antibody" refers to antibodies whose variable and constant regions correspond to or are derived from immunoglobulin sequences of the human germ line, as described, for example, by Kabat et al. (see Kabat, et al. (1991) Sequences of Proteins of Immunological Interest, Fifth Edition, U.S. Department of Health and Human Services, NIH Publication No. 91-3242). However, the human antibodies can contain amino acid residues not encoded by human germ line immunoglobulin sequences (for example mutations which have been introduced by random or site-specific mutagenesis in vitro or by somatic mutation in vivo), for example in the CDRs, and in particular in CDR3. Recombinant human antibodies as described herein have variable regions and may also contain constant regions derived from immunoglobulin sequences of the human germ line (see Kabat, E. A., et al. (1991) Sequences of Proteins of Immunological Interest, Fifth Edition, U.S. Department of Health and Human Services, NIH Publication No. 91-3242). According to particular embodiments, however, such recombinant human antibodies are subjected to in-vitro mutagenesis (or to a somatic in-vivo mutagenesis, if an animal is used which is transgenic due to human Ig sequences) so that the amino acid sequences of the VH and VL regions of the recombinant antibodies are sequences which although related to or derived from VH and VL sequences of the human germ line, do not naturally exist in vivo within the human antibody germ line repertoire. According to particular embodiments, recombinant antibodies of this kind are the result of selective mutagenesis or back mutation or of both. Preferably, mutagenesis leads to an affinity to the target which is greater, and/or an affinity to non-target structures which is smaller than that of the parent antibody. Generating a humanized antibody from the sequences and information provided herein can be practiced by those of ordinary skill in the art without undue experimentation. In one approach, there are four general steps employed to humanize a monoclonal antibody, see, e.g., U.S. Pat. Nos. 5,585,089; 6,835,823; 6,824,989. These are: (1) determining the nucleotide and predicted amino acid sequence of the starting antibody light and heavy variable domains; (2) designing the humanized antibody, i.e., deciding which antibody framework region to use during the humanizing process; (3) the actual humanizing methodologies/techniques; and (4) the transfection and expression of the humanized antibody.

Usually the CDR regions in humanized antibodies and human antibody variants are substantially identical, and more usually, identical to the corresponding CDR regions in the mouse or human antibody from which they were derived. In some embodiments, it is possible to make one or more conservative amino acid substitutions of CDR residues without appreciably affecting the binding affinity of the resulting humanized immunoglobulin or human antibody variant. In some embodiments, substitutions of CDR regions can enhance binding affinity.

The term "chimeric antibody" refers to antibodies which contain sequences for the variable region of the heavy and light chains from one species and constant region sequences from another species, such as antibodies having murine heavy and light chain variable regions linked to human constant regions. Humanized antibodies have variable region framework residues substantially from a human antibody (termed an acceptor antibody) and complementarity determining regions substantially from a non-human antibody, e.g., a mouse-antibody, (referred to as the donor immunoglobulin). The constant region(s), if present, are also substantially or entirely from a human immunoglobulin. The human variable domains are usually chosen from human antibodies whose framework sequences exhibit a high degree of sequence identity with the (murine) variable region domains from which the CDRs were derived. The heavy and light chain variable region framework residues can be substantially similar to a region of the same or different human antibody sequences. The human antibody sequences can be the sequences of naturally occurring human antibodies or can be consensus sequences of several human antibodies.

In addition, techniques developed for the production of "chimeric antibodies" by splicing genes from a mouse, or other species, antibody molecule of appropriate antigen specificity together with genes from a human antibody molecule of appropriate biological activity can be used. The variable segments of chimeric antibodies are typically linked to at least a portion of an immunoglobulin constant region (Fc), typically that of a human immunoglobulin. Human constant region DNA sequences can be isolated in accordance with well-known procedures from a variety of human cells, such as immortalized B-cells. The antibody can contain both light chain and heavy chain constant regions. The heavy chain constant region can include CH1, hinge, CH2, CH3, and, sometimes, CH4 regions. For therapeutic purposes, the CH2 domain can be deleted or omitted.

Additionally, and as described herein, a recombinant humanized antibody can be further optimized to decrease potential immunogenicity, while maintaining functional activity, for therapy in humans. In this regard, functional activity means a polypeptide capable of displaying one or more known functional activities associated with a recombinant antibody, or antigen-binding portion thereof as described herein. Such functional activities include binding to cancer cells and/or anti-cancer activity. Additionally, a polypeptide having functional activity means the polypeptide exhibits activity similar, but not necessarily identical to, an activity of a reference antibody, antibody reagent, or antigen-binding portion thereof as described herein, including mature forms, as measured in a particular assay, for example, a biological assay, with or without dose dependency. In the case where dose dependency does exist, it need not be identical to that of the reference antibody, antibody reagent, or antigen-binding portion thereof but rather substantially similar to the dose-dependence in a given activity as compared to the reference antibody, antibody reagent, or antigen-binding portion thereof as described herein (i.e., the candidate polypeptide will exhibit greater activity, or not more than about 25-fold less, about 10-fold less, or about 3-fold less activity relative to the antibodies, antibody reagents, and/or antigen-binding portions described herein).

In some embodiments, the antibody reagents (e.g., antibodies) described herein are not naturally-occurring biomolecules. For example, a murine antibody raised against an antigen of human origin would not occur in nature absent human intervention and manipulation, e.g., manufacturing steps carried out by a human. Chimeric antibodies are also not naturally-occurring biomolecules, e.g., in that they comprise sequences obtained from multiple species and assembled into a recombinant molecule. In certain particular embodiments, the human antibody reagents described herein are not naturally-occurring biomolecules, e.g., fully human antibodies directed against a human antigen would be subject to negative selection in nature and are not naturally found in the human body.

In some embodiments, the antibody, antibody reagent, and/or antigen-binding portion thereof is an isolated polypeptide. In some embodiments, the antibody, antibody reagent, and/or antigen-binding portion thereof is a purified polypeptide. In some embodiments, the antibody, antibody reagent, and/or antigen-binding portion thereof is an engineered polypeptide.

As used herein, the term "nanobody" or single domain antibody (sdAb) refers to an antibody comprising the small single variable domain (VHH) of antibodies obtained from camelids and dromedaries. Antibody proteins obtained from members of the camel and dromedary (*Camelus baclrianus* and *Calelus dromaderius*) family including new world members such as llama species (*Lama paccos, Lama glama* and *Lama vicugna*) have been characterized with respect to size, structural complexity and antigenicity for human subjects. Certain IgG antibodies from this family of mammals as found in nature lack light chains, and are thus structurally distinct from the typical four chain quaternary structure having two heavy and two light chains, for antibodies from other animals. See PCT/EP93/02214 (WO 94/04678 published 3 Mar. 1994; which is incorporated by reference herein in its entirety).

A region of the camelid antibody which is the small single variable domain identified as VHH can be obtained by genetic engineering to yield a small protein having high affinity for a target, resulting in a low molecular weight antibody-derived protein known as a "camelid nanobody". See U.S. Pat. No. 5,759,808 issued Jun. 2, 1998; see also Stijlemans, B. et al., 2004 J Biol Chem 279: 1256-1261; Dumoulin, M. et al., 2003 Nature 424: 783-788; Pleschberger, M. et al. 2003 Bioconjugate Chem 14: 440-448; Cortez-Retamozo, V. et al. 2002 Int J Cancer 89: 456-62; and Lauwereys, M. et al. 1998 EMBO J. 17: 3512-3520; each of which is incorporated by reference herein in its entirety. Engineered libraries of camelid antibodies and antibody fragments are commercially available, for example, from Ablynx, Ghent, Belgium. As with other antibodies of non-human origin, an amino acid sequence of a camelid antibody can be altered recombinantly to obtain a sequence that more closely resembles a human sequence, i.e., the nanobody can be "humanized". Thus the natural low antigenicity of camelid antibodies to humans can be further reduced.

The camelid nanobody has a molecular weight approximately one-tenth that of a human IgG molecule and the protein has a physical diameter of only a few nanometers. One consequence of the small size is the ability of camelid nanobodies to bind to antigenic sites that are functionally invisible to larger antibody proteins, i.e., camelid nanobodies are useful as reagents detect antigens that are otherwise cryptic using classical immunological techniques, and as possible therapeutic agents. Thus yet another consequence of small size is that a camelid nanobody can inhibit as a result of binding to a specific site in a groove or narrow cleft of a target protein, and hence can serve in a capacity that more closely resembles the function of a classical low molecular weight drug than that of a classical antibody. The low molecular weight and compact size further result in camelid nanobodies being extremely thermostable, stable to extreme pH and to proteolytic digestion, and poorly antigenic. See U.S. patent application 20040161738 published Aug. 19, 2004; which is incorporated by reference herein in its entirety. These features combined with the low antigenicity to humans indicate great therapeutic potential.

As used herein, the term "nucleic acid" or "nucleic acid sequence" refers to any molecule, preferably a polymeric molecule, incorporating units of ribonucleic acid, deoxyribonucleic acid or an analog thereof. The nucleic acid can be either single-stranded or double-stranded. A single-stranded nucleic acid can be one nucleic acid strand of a denatured double-stranded DNA. Alternatively, it can be a single-stranded nucleic acid not derived from any double-stranded DNA. In one aspect, the nucleic acid can be DNA. In another aspect, the nucleic acid can be RNA. Suitable DNA can include, e.g., genomic DNA or cDNA. Suitable RNA can include, e.g., mRNA.

In some embodiments of any of the aspects, a polypeptide, nucleic acid, or cell as described herein can be engineered. As used herein, "engineered" refers to the aspect of having been manipulated by the hand of man. For example, a polypeptide is considered to be "engineered" when at least one aspect of the polypeptide, e.g., its sequence, has been manipulated by the hand of man to differ from the aspect as it exists in nature. As is common practice and is understood by those in the art, progeny of an engineered cell are typically still referred to as "engineered" even though the actual manipulation was performed on a prior entity.

As used herein, the terms "treat," "treatment," "treating," or "amelioration" refer to therapeutic treatments, wherein the object is to reverse, alleviate, ameliorate, inhibit, slow down or stop the progression or severity of a condition associated with a disease or disorder, e.g. condition. The term "treating" includes reducing or alleviating at least one adverse effect or symptom of a condition, disease or disorder associated with a condition. Treatment is generally "effective" if one or more symptoms or clinical markers are reduced. Alternatively, treatment is "effective" if the progression of a disease is reduced or halted. That is, "treatment" includes not just the improvement of symptoms or markers, but also a cessation of, or at least slowing of, progress or worsening of symptoms compared to what would be expected in the absence of treatment. Beneficial or desired clinical results include, but are not limited to, alleviation of one or more symptom(s), diminishment of extent of disease, stabilized (i.e., not worsening) state of disease, delay or slowing of disease progression, amelioration or palliation of the disease state, remission (whether partial or total), and/or decreased mortality, whether detectable or undetectable. The term "treatment" of a disease also includes providing relief from the symptoms or side-effects of the disease (including palliative treatment).

As used herein, the term "pharmaceutical composition" refers to the active agent in combination with a pharmaceutically acceptable carrier e.g. a carrier commonly used in the pharmaceutical industry. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. In some embodiments of any of the aspects, a pharmaceutically acceptable carrier can be a carrier other than water. In some embodiments of any of the aspects, a pharmaceutically acceptable carrier can be a cream, emulsion, gel, liposome, nanoparticle, and/or ointment. In some embodiments of any of the aspects, a pharmaceutically acceptable carrier can be an artificial or engineered carrier, e.g., a carrier that the active ingredient would not be found to occur in in nature.

As used herein, the term "administering," refers to the placement of a compound as disclosed herein into a subject by a method or route which results in at least partial delivery of the agent at a desired site. Pharmaceutical compositions comprising the compounds disclosed herein can be administered by any appropriate route which results in an effective treatment in the subject. In some embodiments, administration comprises physical human activity, e.g., an injection, act of ingestion, an act of application, and/or manipulation of a delivery device or machine. Such activity can be performed, e.g., by a medical professional and/or the subject being treated.

As used herein, "contacting" refers to any suitable means for delivering, or exposing, an agent to at least one cell. Exemplary delivery methods include, but are not limited to, direct delivery to cell culture medium, perfusion, injection, or other delivery method well known to one skilled in the art. In some embodiments, contacting comprises physical human activity, e.g., an injection; an act of dispensing, mixing, and/or decanting; and/or manipulation of a delivery device or machine.

The term "statistically significant" or "significantly" refers to statistical significance and generally means a two standard deviation (2SD) or greater difference.

Other than in the operating examples, or where otherwise indicated, all numbers expressing quantities of ingredients or reaction conditions used herein should be understood as modified in all instances by the term "about." The term "about" when used in connection with percentages can mean±1%.

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention.

As used herein, the term "specific binding" refers to a chemical interaction between two molecules, compounds, cells and/or particles wherein the first entity binds to the second, target entity with greater specificity and affinity than it binds to a third entity which is a non-target. In some embodiments, specific binding can refer to an affinity of the first entity for the second target entity which is at least 10 times, at least 50 times, at least 100 times, at least 500 times, at least 1000 times or greater than the affinity for the third nontarget entity. A reagent specific for a given target is one that exhibits specific binding for that target under the conditions of the assay being utilized.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only, and is not intended to limit the scope of the present invention, which is defined solely by the claims. Definitions of common terms in immunology and molecular biology can be found in The Merck Manual of Diagnosis and Therapy, 20th Edition, published by Merck Sharp & Dohme Corp., 2018 (ISBN 0911910190, 978-0911910421); Robert S. Porter et al. (eds.), The Encyclopedia of Molecular Cell Biology and Molecular Medicine, published by Blackwell Science Ltd., 1999-2012 (ISBN 9783527600908); and Robert A. Meyers (ed.), Molecular Biology and Biotechnology: a Comprehensive Desk Reference, published by VCH Publishers, Inc., 1995 (ISBN 1-56081-569-8); Immunology by Werner Luttmann, published by Elsevier, 2006; Janeway's Immunobiology, Kenneth Murphy, Allan Mowat, Casey Weaver (eds.), W. W. Norton & Company, 2016 (ISBN 0815345054, 978-0815345053); Lewin's Genes XI, published by Jones & Bartlett Publishers, 2014 (ISBN-1449659055); Michael Richard Green and Joseph Sambrook, Molecular Cloning: A Laboratory Manual, 4th ed., Cold Spring Harbor Laboratory Press, Cold Spring Harbor, N.Y., USA (2012) (ISBN 1936113414); Davis et al., Basic Methods in Molecular Biology, Elsevier Science Publishing, Inc., New York, USA (2012) (ISBN 044460149X); Laboratory Methods in Enzymology: DNA, Jon Lorsch (ed.) Elsevier, 2013 (ISBN 0124199542); Current Protocols in Molecular Biology (CPMB), Frederick M. Ausubel (ed.), John Wiley and Sons, 2014 (ISBN 047150338X, 9780471503385), Current Protocols in Protein Science (CPPS), John E. Coligan (ed.), John Wiley and Sons, Inc., 2005; and Current Protocols in Immunology (CPI) (John E. Coligan, ADA M Kruisbeek, David H Margulies, Ethan M Shevach, Warren Strobe, (eds.) John Wiley and Sons, Inc., 2003 (ISBN 0471142735, 9780471142737), the contents of which are all incorporated by reference herein in their entireties.

One of skill in the art can readily identify a chemotherapeutic agent of use (e.g. see Physicians' Cancer Chemotherapy Drug Manual 2014, Edward Chu, Vincent T. DeVita Jr., Jones & Bartlett Learning; Principles of Cancer Therapy, Chapter 85 in Harrison's Principles of Internal Medicine, 18th edition; Therapeutic Targeting of Cancer Cells: Era of Molecularly Targeted Agents and Cancer Pharmacology, Chs. 28-29 in Abeloff's Clinical Oncology, 2013 Elsevier; and Fischer D S (ed): The Cancer Chemotherapy Handbook, 4th ed. St. Louis, Mosby-Year Book, 2003).

Other terms are defined herein within the description of the various aspects of the invention.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting.

Some embodiments of the technology described herein can be defined according to any of the following numbered paragraphs:

1. A method of administering at least one active compound, the method comprising administering the active compound in combination with a composition comprising:
    a. an ionic liquid; and
    b. at least one non-ionic surfactant.
2. The method of paragraph 1, wherein the at least one non-ionic surfactant has a neutral hydrophilic head group.
3. The method of paragraph 2, wherein the at least one non-ionic surfactant is a tween or polysorbate.
4. The method of paragraph 2, wherein the polysorbate is selected from the group consisting of polysorbate 20, polysorbate 40, polysorbate 60, and polysorbate 80.
5. The method of any of the preceding paragraphs, wherein the at least one polysorbate is present at a concentration of about 0.1% to about 50% w/v.
6. The method of any of the preceding paragraphs, wherein the at least one polysorbate is present at a concentration of about 1% to about 5% w/v.
7. The method of any of the preceding paragraphs, wherein the at least one polysorbate is present at a concentration of about 3% to about 10% w/v.
8. The method of any of the preceding paragraphs, wherein the at least one polysorbate is polysorbate 40 and/or polysorbate 60, present at a concentration of less than about 5% w/v.
9. The method of any of the preceding paragraphs, wherein the at least one polysorbate is polysorbate 40 and/or polysorbate 60, present at a concentration of about 3% w/v or less.
10. The method of any of the preceding paragraphs, wherein the ionic liquid is Choline And GEranate (CAGE).
11. The method of any of the preceding paragraphs, wherein ionic liquid is at a concentration of at least 0.1% w/v.
12. The method of any of the preceding paragraphs, wherein ionic liquid is at a concentration of from about 10 to about 70% w/v.
13. The method of any of the preceding paragraphs, wherein ionic liquid is at a concentration of from about 30 to about 50% w/v.
14. The method of any of the preceding paragraphs, wherein ionic liquid is at a concentration of from about 30 to about 40% w/v.
15. The method of any of the preceding paragraphs, wherein the CAGE comprises a ratio of choline:geranic acid or geranate of from about 2:1 to about 1:10.
16. The method of any of the preceding paragraphs, wherein the CAGE comprises a ratio of choline:geranic acid or geranate of from about 1:1 to about 1:4.
17. The method of any of the preceding paragraphs, wherein the CAGE comprises a ratio of choline:geranic acid or geranate is about 1:2.
18. The method of any of the preceding paragraphs, wherein the ionic liquid's anion comprises geranate and/or geranic acid.
19. The method of any of the preceding paragraphs, wherein the active compound comprises a polypeptide.
20. The method of any of the preceding paragraphs, wherein the active compound has a molecular weight of greater than 450.
21. The method of any of the preceding paragraphs, wherein the active compound has a molecular weight of greater than 500.
22. The method of any of the preceding paragraphs, wherein the active compound is polar.
23. The method of any of the preceding paragraphs, wherein the active compound comprises an antibody or antibody reagent.
24. The method of any of the preceding paragraphs, wherein the active compound comprises insulin.
25. The method of any of the preceding paragraphs, wherein the active compound comprises a GLP-1 polypeptide or mimetic or analog thereof.
26. The method of any of the preceding paragraphs, wherein the administration is transdermal.

27. The method of any of the preceding paragraphs, wherein the administration is transdermal, to a mucus membrane, oral, subcutaneous, intradermal, parenteral, intratumoral, or intravenous.

28. The method of paragraph 27, wherein the mucus membrane is nasal, oral, or vaginal.

29. The method of any of the preceding paragraphs, wherein the combination is administered once.

30. The method of any of the preceding paragraphs, wherein the combination is administered in multiple doses.

31. The method of any of the preceding paragraphs, wherein the active compound is provided at a dosage of 1-20 mg/kg.

32. The method of any of the preceding paragraphs, wherein the combination further comprises a further pharmaceutically acceptable carrier.

33. The method of any of the preceding paragraphs, wherein the administration is oral and the combination is provided in a degradable capsule.

34. The method of any of the preceding paragraphs, wherein the combination is an admixture.

35. The method of any of the preceding paragraphs, wherein the combination is provided in one or more nanoparticles.

36. The method of any of the preceding paragraphs, wherein the combination is provided in the form of one or more nanoparticles comprising the active compound, the nanoparticles in solution or suspension in a composition comprising the ionic liquid and the at least one polysorbate.

37. A combination of an active compound and a composition comprising:
   a. an ionic liquid; and
   b. at least one non-ionic surfactant.

38. A combination of an active compound and a composition comprising:
   a. an ionic liquid; and
   b. at least one non-ionic surfactant,
   for use in delivery of the active compound to a cell, tissue, or subject.

39. A combination of an active compound and a composition comprising:
   a. an ionic liquid; and
   b. at least one non-ionic surfactant,
   for use in treatment of a disease.

40. The combination of any of paragraphs 37-39, wherein the at least one non-ionic surfactant has a neutral hydrophilic head group.

41. The combination of any of paragraphs 37-40, wherein the at least one non-ionic surfactant is a tween or polysorbate.

42. The combination of paragraph 41, wherein the polysorbate is selected from the group consisting of polysorbate 20, polysorbate 40, polysorbate 60, and polysorbate 80.

43. The combination of any of the preceding paragraphs, wherein the at least one polysorbate is present at a concentration of about 0.1% to about 50% w/v.

44. The combination of any of the preceding paragraphs, wherein the at least one polysorbate is present at a concentration of about 1% to about 5% w/v.

45. The combination of any of the preceding paragraphs, wherein the at least one polysorbate is present at a concentration of about 3% to about 10% w/v.

46. The combination of any of the preceding paragraphs, wherein the at least one polysorbate is polysorbate 40 and/or polysorbate 60, present at a concentration of less than about 5% w/v.

47. The combination of any of the preceding paragraphs, wherein the at least one polysorbate is polysorbate 40 and/or polysorbate 60, present at a concentration of about 3% w/v or less.

48. The combination of any of the preceding paragraphs, wherein the ionic liquid is Choline And GEranate (CAGE).

49. The combination of any of the preceding paragraphs, wherein ionic liquid is at a concentration of at least 0.10% w/v.

50. The combination of any of the preceding paragraphs, wherein ionic liquid is at a concentration of from about 10 to about 70% w/v.

51. The combination of any of the preceding paragraphs, wherein ionic liquid is at a concentration of from about 30 to about 50% w/v.

52. The combination of any of the preceding paragraphs, wherein ionic liquid is at a concentration of from about 30 to about 40% w/v.

53. The combination of any of the preceding paragraphs, wherein the CAGE comprises a ratio of choline:geranic acid or geranate of from about 2:1 to about 1:10.

54. The combination of any of the preceding paragraphs, wherein the CAGE comprises a ratio of choline:geranic acid or geranate of from about 1:1 to about 1:4.

55. The combination of any of the preceding paragraphs, wherein the CAGE comprises a ratio of choline:geranic acid or geranate is about 1:2.

56. The combination of any of the preceding paragraphs, wherein the ionic liquid's anion comprises geranate and/or geranic acid.

57. The combination of any of the preceding paragraphs, wherein the active compound comprises a polypeptide.

58. The combination of any of the preceding paragraphs, wherein the active compound has a molecular weight of greater than 450.

59. The combination of any of the preceding paragraphs, wherein the active compound has a molecular weight of greater than 500.

60. The combination of any of the preceding paragraphs, wherein the active compound is polar.

61. The combination of any of the preceding paragraphs, wherein the active compound comprises an antibody or antibody reagent.

62. The combination of any of the preceding paragraphs, wherein the active compound comprises insulin.

63. The combination of any of the preceding paragraphs, wherein the active compound comprises a GLP-1 polypeptide or mimetic or analog thereof.

64. The combination of any of the preceding paragraphs, wherein the combination is administered by a transdermal route.

65. The combination of any of the preceding paragraphs, wherein the combination is administered by a transdermal, oral, subcutaneous, intradermal, parenteral, intratumoral, or intravenous route or to a mucus membrane.

66. The combination of paragraph 65, wherein the mucus membrane is nasal, oral, or vaginal.

67. The combination of any of the preceding paragraphs, wherein the combination is administered once.

68. The combination of any of the preceding paragraphs, wherein the combination is administered in multiple doses.

69. The combination of any of the preceding paragraphs, wherein the active compound is provided at a dosage of 1-20 mg/kg.
70. The combination of any of the preceding paragraphs, wherein the combination further comprises a further pharmaceutically acceptable carrier.
71. The combination of any of the preceding paragraphs, wherein the administration is oral and the combination is provided in a degradable capsule.
72. The combination of any of the preceding paragraphs, wherein the combination is an admixture.
73. The combination of any of the preceding paragraphs, wherein the combination is provided in one or more nanoparticles.
74. The combination of any of the preceding paragraphs, wherein the combination is provided in the form of one or more nanoparticles comprising the active compound, the nanoparticles in solution or suspension in a composition comprising the ionic liquid and the at least one polysorbate.

Some embodiments of the technology described herein can be defined according to any of the following numbered paragraphs:

1. A method of administering at least one active compound, the method comprising administering the active compound in combination with a composition comprising:
   a. an ionic liquid; and
   b. at least one non-ionic surfactant.
2. The method of paragraph 1, wherein the at least one non-ionic surfactant has a neutral hydrophilic head group.
3. The method of paragraph 2, wherein the at least one non-ionic surfactant is a tween or polysorbate.
4. The method of paragraph 2, wherein the polysorbate is selected from the group consisting of polysorbate 20, polysorbate 40, polysorbate 60, and polysorbate 80.
5. The method of any of the preceding paragraphs, wherein the at least one polysorbate is present at a concentration of about 0.1% to about 50% w/v.
6. The method of any of the preceding paragraphs, wherein the at least one polysorbate is present at a concentration of about 1% to about 5% w/v.
7. The method of any of the preceding paragraphs, wherein the at least one polysorbate is present at a concentration of about 3% to about 10% w/v.
8. The method of any of the preceding paragraphs, wherein the at least one polysorbate is polysorbate 40 and/or polysorbate 60, present at a concentration of less than about 5% w/v.
9. The method of any of the preceding paragraphs, wherein the at least one polysorbate is polysorbate 40 and/or polysorbate 60, present at a concentration of about 3% w/v or less.
10. The method of any of the preceding paragraphs, wherein the ionic liquid is Choline And GEranate (CAGE).
11. The method of any of the preceding paragraphs, wherein ionic liquid is at a concentration of at least 0.1% w/v.
12. The method of any of the preceding paragraphs, wherein ionic liquid is at a concentration of from about 10 to about 70% w/v.
13. The method of any of the preceding paragraphs, wherein ionic liquid is at a concentration of from about 30 to about 50% w/v.
14. The method of any of the preceding paragraphs, wherein ionic liquid is at a concentration of from about 30 to about 40% w/v.
15. The method of any of the preceding paragraphs, wherein the CAGE comprises a ratio of choline:geranic acid or geranate of from about 2:1 to about 1:10.
16. The method of any of the preceding paragraphs, wherein the CAGE comprises a ratio of choline:geranic acid or geranate of from about 1:1 to about 1:4.
17. The method of any of the preceding paragraphs, wherein the CAGE comprises a ratio of choline:geranic acid or geranate is about 1:2.
18. The method of any of the preceding paragraphs, wherein the ionic liquid's anion comprises geranate and/or geranic acid.
19. The method of any of the preceding paragraphs, wherein the active compound comprises a polypeptide.
20. The method of any of the preceding paragraphs, wherein the active compound has a molecular weight of greater than 450.
21. The method of any of the preceding paragraphs, wherein the active compound has a molecular weight of greater than 500.
22. The method of any of the preceding paragraphs, wherein the active compound is polar.
23. The method of any of the preceding paragraphs, wherein the active compound comprises an antibody or antibody reagent.
24. The method of the preceding paragraph, wherein the antibody reagent is a nanobody.
25. The method of any of the preceding paragraphs, wherein the active compound comprises insulin.
26. The method of any of the preceding paragraphs, wherein the active compound comprises a GLP-1 polypeptide or mimetic or analog thereof.
27. The method of any of the preceding paragraphs, wherein the administration is transdermal.
28. The method of any of the preceding paragraphs, wherein the administration is transdermal, to a mucus membrane, oral, subcutaneous, intradermal, parenteral, intratumoral, or intravenous.
29. The method of paragraph 27, wherein the mucus membrane is nasal, oral, or vaginal.
30. The method of any of the preceding paragraphs, wherein the combination is administered once.
31. The method of any of the preceding paragraphs, wherein the combination is administered in multiple doses.
32. The method of any of the preceding paragraphs, wherein the active compound is provided at a dosage of 1-20 mg/kg.
33. The method of any of the preceding paragraphs, wherein the combination further comprises a further pharmaceutically acceptable carrier.
34. The method of any of the preceding paragraphs, wherein the administration is oral and the combination is provided in a degradable capsule.
35. The method of any of the preceding paragraphs, wherein the combination is an admixture.
36. The method of any of the preceding paragraphs, wherein the combination is provided in one or more nanoparticles.
37. The method of any of the preceding paragraphs, wherein the combination is provided in the form of one or more nanoparticles comprising the active compound, the nanoparticles in solution or suspension in a composition comprising the ionic liquid and the at least one polysorbate.

38. A combination of an active compound and a composition comprising:
    a. an ionic liquid; and
    b. at least one non-ionic surfactant.
39. A combination of an active compound and a composition comprising:
    a. an ionic liquid; and
    b. at least one non-ionic surfactant,
    for use in delivery of the active compound to a cell, tissue, or subject.
40. A combination of an active compound and a composition comprising:
    a. an ionic liquid; and
    b. at least one non-ionic surfactant,
    for use in treatment of a disease.
41. The combination of any of paragraphs 38-40, wherein the at least one non-ionic surfactant has a neutral hydrophilic head group.
42. The combination of any of paragraphs 38-41, wherein the at least one non-ionic surfactant is a tween or polysorbate.
43. The combination of paragraph 42, wherein the polysorbate is selected from the group consisting of polysorbate 20, polysorbate 40, polysorbate 60, and polysorbate 80.
44. The combination of any of the preceding paragraphs, wherein the at least one polysorbate is present at a concentration of about 0.1% to about 50% w/v.
45. The combination of any of the preceding paragraphs, wherein the at least one polysorbate is present at a concentration of about 1% to about 5% w/v.
46. The combination of any of the preceding paragraphs, wherein the at least one polysorbate is present at a concentration of about 3% to about 10% w/v.
47. The combination of any of the preceding paragraphs, wherein the at least one polysorbate is polysorbate 40 and/or polysorbate 60, present at a concentration of less than about 5% w/v.
48. The combination of any of the preceding paragraphs, wherein the at least one polysorbate is polysorbate 40 and/or polysorbate 60, present at a concentration of about 3% w/v or less.
49. The combination of any of the preceding paragraphs, wherein the ionic liquid is Choline And GEranate (CAGE).
50. The combination of any of the preceding paragraphs, wherein ionic liquid is at a concentration of at least 0.10% w/v.
51. The combination of any of the preceding paragraphs, wherein ionic liquid is at a concentration of from about 10 to about 70% w/v.
52. The combination of any of the preceding paragraphs, wherein ionic liquid is at a concentration of from about 30 to about 50% w/v.
53. The combination of any of the preceding paragraphs, wherein ionic liquid is at a concentration of from about 30 to about 40% w/v.
54. The combination of any of the preceding paragraphs, wherein the CAGE comprises a ratio of choline:geranic acid or geranate of from about 2:1 to about 1:10.
55. The combination of any of the preceding paragraphs, wherein the CAGE comprises a ratio of choline:geranic acid or geranate of from about 1:1 to about 1:4.
56. The combination of any of the preceding paragraphs, wherein the CAGE comprises a ratio of choline:geranic acid or geranate is about 1:2.
57. The combination of any of the preceding paragraphs, wherein the ionic liquid's anion comprises geranate and/or geranic acid.
58. The combination of any of the preceding paragraphs, wherein the active compound comprises a polypeptide.
59. The combination of any of the preceding paragraphs, wherein the active compound has a molecular weight of greater than 450.
60. The combination of any of the preceding paragraphs, wherein the active compound has a molecular weight of greater than 500.
61. The combination of any of the preceding paragraphs, wherein the active compound is polar.
62. The combination of any of the preceding paragraphs, wherein the active compound comprises an antibody or antibody reagent.
63. The combination of the preceding paragraph, wherein the antibody reagent is a nanobody.
64. The combination of any of the preceding paragraphs, wherein the active compound comprises insulin.
65. The combination of any of the preceding paragraphs, wherein the active compound comprises a GLP-1 polypeptide or mimetic or analog thereof.
66. The combination of any of the preceding paragraphs, wherein the combination is administered by a transdermal route.
67. The combination of any of the preceding paragraphs, wherein the combination is administered by a transdermal, oral, subcutaneous, intradermal, parenteral, intratumoral, or intravenous route or to a mucus membrane.
68. The combination of paragraph 67, wherein the mucus membrane is nasal, oral, or vaginal.
69. The combination of any of the preceding paragraphs, wherein the combination is administered once.
70. The combination of any of the preceding paragraphs, wherein the combination is administered in multiple doses.
71. The combination of any of the preceding paragraphs, wherein the active compound is provided at a dosage of 1-20 mg/kg.
72. The combination of any of the preceding paragraphs, wherein the combination further comprises a further pharmaceutically acceptable carrier.
73. The combination of any of the preceding paragraphs, wherein the administration is oral and the combination is provided in a degradable capsule.
74. The combination of any of the preceding paragraphs, wherein the combination is an admixture.
75. The combination of any of the preceding paragraphs, wherein the combination is provided in one or more nanoparticles.
76. The combination of any of the preceding paragraphs, wherein the combination is provided in the form of one or more nanoparticles comprising the active compound, the nanoparticles in solution or suspension in a composition comprising the ionic liquid and the at least one polysorbate.

EXAMPLES

Example 1: Transdermal Delivery of an Antibody Fragment Fab Using a Choline- and Geranic Acid-Based (CAGE) Ionic Liquid The transdermal delivery of antibodies offers a promising opportunity for the treatment of dermatological and systemic conditions. Described herein is the transdermal delivery of an antibody fragment (Fab) using choline- and geranic acid (CAGE) variants. The antibody fragment was stabilized in CAGE (1:2) using polysorbates in a concentration-dependent manner. The topical application of Fab in CAGE (1:2) induced deep penetration into skin in vitro.

The transdermal delivery of drugs provides advantages over injections (e.g., avoidance of the first pass effect of the liver, improvement in patient compliance, and sustained blood drug concentrations). Skin's topmost layer, stratum corneum, however, provides a significant barrier to the entry of molecules into the skin. Hydrophobic molecules with a molecular weight of ≤500 can generally permeate the skin [1]. In general, therefore, devices using microneedles [2-6], sonophoresis [7-11], and iontophoresis [10-17], as well as absorption enhancers [18-21] are required to transdermally deliver molecules that have a larger molecular weight or polarity (e.g., proteins).

Antibody-based drugs have now become a mainstay in the treatment of several diseases. The number of target diseases for antibody drugs increased significantly over the last 10 years, extending from the major targets of cancers to other disorders including autoimmune diseases. In 2017, 10 antibody drugs were newly launched in Europe and the United States; five of them are targeted at diseases other than cancer [22]. Antibodies are generally delivered by an intravenous, and occasionally subcutaneous, route. The transdermal delivery of antibodies through non-injectable drugs is limited by their large size, high susceptibility to enzymes, complex structures, and low biomembrane permeability [23]. Therefore, antibodies are forced to be delivered by the systemic route even for local diseases which may potentially cause undesired adverse reactions [24].

The transdermal delivery of antibodies is an appealing mode for their administration, especially for dermatological diseases. However, antibodies cannot easily penetrate the skin due to their high molecular weight and high polarity. Some studies have reported on the transdermal delivery of antibodies-gel formulations containing the anti-tumor necrosis factor-α antibody and the anti-HIV-antibody [25,26], cream formulations containing antibodies [27,28], and microneedles containing the anti-tumor necrosis factor-α antibody [29].

Ionic liquids are organic salts resulting from the combination of electrically charged substances. Deep Eutectic Solvents (DESs) have also been identified as a novel class of materials for biological applications [30-35]. DESs often have a strong contribution from hydrogen bond interactions and a lower melting point than that of the respective components [31]. DESs have several advantages (e.g., low melting point and high biocompatibility). Several medical applications of ionic liquids and DESs have been explored [32,36]. An ionic liquid based on choline and geranic acid (CAGE) exhibits characteristics of an ionic liquid as well as DES [37,38]. CAGE enabled the skin permeation of large proteins (e.g., insulin and BSA) [39]. The physicochemical properties of CAGE variants are impacted by their composition. CAGE with a choline-to-geranic acid molar ratio of 1:2 was found to exert the most potent effect as a skin permeation enhancer for insulin [40].

Described herein is the exploration of CAGE for transdermal delivery of a Fab. Some ionic liquids and DESs have been known to denature proteins [41-49]. Hence, ensuring the stability of Fabs in CAGE is of utmost significance. Antihistone H1 antibody was used for these studies. Nakano et al. reported that the antihistone H1 antibody has a suppressive effect on the recipient's immune rejection after liver transplantation [50]. Furthermore, Chiang et al. identified the epitope sequence (SSVLYGGPPSAA [SSV]) (SEQ ID NO: 7) that the antihistone H1 antibody recognizes through cross-reaction and reported that the anti-SSV antibody has immunosuppressive activity as with the antihistone H1 antibody [51]. In the present study, we used Fab, a fragment of the abovementioned antibody, to assess the possibility of using CAGE (1:2) to deliver Fab transdermally.

Materials and Methods

Method of CAGE Synthesis

Synthesis of CAGE (1:2). Six variants of CAGE (1:2) were synthesized according to the method of Zakrewsky et al [37]. One sample of CAGE (1:2) synthesis is shown in FIG. 1. Briefly, the choline-to-geranic acid molar ratio of 1:2 was used to synthesize CAGE (1:2) via a salt metathesis reaction. A round-bottomed flask was used to measure and collect 250 mL of choline bicarbonate (molecular weight 165.19, 80% aqueous solution), and the solution was stirred in a water bath. Purified geranic acid (molecular weight 168.24) was measured and collected and was then instilled into the stirred choline solution. The reaction was allowed to occur at room temperature after the instillation of geranic acid. Subsequently, the complete reaction was allowed to occur during overnight stirring at 40° C. The reaction was stopped at 24 hours after the instillation of geranic acid, followed by 2-hour vacuum evaporation (30 mbar) of the solution in a hot water bath at 60° C. The reaction solution was collected in a petri plate, followed by 2-day drying in a vacuum oven at 60° C. and under pressure reduction.

Method for the Synthesis of CAGE Variants

Purification of geranic acid. Geranic acid was purified according to the method of Eller et al. [52]. Concretely, 50 mL of acetone for high-performance liquid chromatography (HPLC) were added into 100 mL of geranic acid (85% solution in purity), and the mixed solution was allowed to stand overnight in a freezer at −80° C. After the removal of the supernatant, 50 mL of acetone for HPLC were newly added. After the complete melting of the solid component at room temperature, the solution was again allowed to stand overnight in a freezer at −80° C. This operation was repeated 5 times in total. Finally, the geranic acid solution removed from the freezer at −80° C. was completely returned to a solution at room temperature. Subsequently, residual acetone was completely removed by 1-hour vacuum evaporation (40 mbar) in a hot water bath at 40° C. Purified geranic acid thus obtained was then put in a light-resistant container and was stored in a refrigerator at 4° C.

Dialysis

Preparation of the Fab-CAGE (1:2) mixed solutions. The Fab solution (10 mM phosphate buffer, pH 7.4) was mixed with CAGE (1:2) at the volume ratios of 50%/50% (v/v %), 40%/60% (v/v %), and 30%/70% (v/v %), and the mixed solutions were allowed to stand at room temperature for 1 hour. The Fab solution was prepared to obtain the final concentration of 10 μg/mL.

Preparation of the Fab-CAGE (1:2)-polysorbate mixed solutions. Polysorbates 20, 40, 60, and 80 were mixed with the Fab solution (10 mM phosphate buffer, pH 7.4) to respectively obtain the final concentrations of 3% to 10%. Subsequently, the resulting solutions were mixed with CAGE (1:2) at the volume ratios of 50%/50% (v/v %) [=50% CAGE (1:2)], 40%/60% (v/v %) [=40% CAGE (1:2)], and 30%/70% (v/v %) [=30% CAGE (1:2)]. Unlike other polysorbates, polysorbate 60 only is solid at room temperature. Therefore, polysorbate 60 was dissolved by 30-minute warming at 37° C. prior to the addition. Furthermore, the solution was warmed for 10 minutes at 37° C. to completely dissolve polysorbate 60 and was then mixed with CAGE (1:2). The resulting mixed solutions were allowed to stand at room temperature for 1 hour. The final concentration of antibodies was adjusted to 10 µg/mL.

Dialysis removal of CAGE (1:2) from the Fab-CAGE (1:2) mixed solution. The Fab-CAGE (1:2) mixed solution, 500 µL, was put into the Slide-A-Lyzer™ Dialysis Cassette (molecular weight cutoff 7 kDa), ThermoFisher Scientific. The solution was dialyzed with 10 mM phosphate buffer (pH 7.4) used as the dialysate at room temperature for 48 hours. The dialysate was replaced appropriately during the dialysis. At 48 hours later, the solution thus obtained was stored in a refrigerator at 4° C.

ELISA

ELISA was conducted according to the method of Chiang et al. [51]. Briefly, 2 µg of KLH-SSV peptide (0.1 M sodium bicarbonate-sodium carbonate buffer, pH 9.6±0.2) were instilled into each well, and the solution was allowed to stand overnight at room temperature. After the removal of the KLH-SSV solution and the washing of each well with PBS (0.05% Tween 20®), 300 µL of SuperBlock Blocking Buffer™ in PBS were added into each well, and the solution was allowed to stand for 1 hour at room temperature. After the removal of the solution from each well at 1 hour later, 100 µL each of the Fab solution obtained after dialysis, the CAGE (1:2) mixed solution, or the CAGE (1:2)-polysorbate mixed solution were added into each well; the solutions were allowed to stand at room temperature for 1 hour. The solution was removed from each well at 1 hour later, and each well was washed with PBS (0.05%, Tween 20®). Subsequently, 100 µL each of the 2,000-fold diluted secondary antibody goat-anti-mouse IgG Fab-HRP conjugate were added into each well; the solution was allowed to stand for 1 hour. The solution was removed at 1 hour later, and each well was washed with PBS (0.05% Tween 20®). Subsequently, 100 mL of BioFX ABTS One Component Substrate™, a substrate, were added into each well. At 20 minutes later, SpectraMax i3™ (Molecular Devices) was used to measure absorbance at 405 nm. Each experiment was conducted in triplicate.

Formula for calculating the relative rate of Fab deactivation

Relative rate of Fab denaturation(%) =

$$\frac{\text{Sample } absrobance_{405\,nm}}{10\,\mu g/mL\,\text{Fab } absorbance_{405\,nm}} \times 100$$

Formula for calculating the relative prevention rate of Fab deactivation

Relative prevention rate of Fab denaturation(%) =

$$\frac{\text{Sample } absrobance_{405\,nm}}{10\,\mu g/mL\,\text{Fab } absorbance_{405\,nm}} \times 100$$

Confocal Fluorescence Microscopy

Preparation of FITC-labeled Fab. The Pierce™ FITC Antibody-Labeling Kit (ThermoFisher Scientific) was used to label Fab purchased from Chemical & Scientific Corporation with FITC. Briefly, 925 µL of sterilized water were added into 75 µL of 0.67 M borate buffer that had been attached to the kit, and the labeling buffer (50 mM sodium borate, pH 8.5) was prepared. Lyophilized Fab, 1 mg, was added into 0.5 mL of the labeling buffer and was then melted. The Fab solution, 0.5 mL, was added into the FITC reagent vial that had been attached to the kit and was then pipetted 10 times for the complete melting of the pigment. After the collection of the slightly centrifuged sample solution in the vial's bottom, the reaction was incubated at room temperature for 60 minutes and under light blocking. At 60 minutes later, the column containing the reaction solution was set to the recovery column that had been attached to the kit. Subsequently, 400 µL of the homogeneously suspended purification column suspension solution were added. After centrifugation (about 1,000 µg, 30 to 45 seconds), FITC-labeled Fab was recovered. The amount of antibody labeling was calculated by measuring absorbance at 280 nm and 495 nm according to the following formulae:

Formula for calculating protein concentration $$\text{Protein concentration}(M) = \frac{A_{280\,nm} - (A_{max} \times CF)}{\varepsilon_{protein}} \times \text{dilution factor}$$

$\varepsilon_{protein}$ = protein molar extinction coefficient $$CF = \text{Correction factor} = \frac{A_{280\,nm}}{A_{max}} = 0.3$$

Formula for calculating the degree of FITC labeling

Moles FITC per mole protein =

$$\frac{A_{max}\text{ of the labeled protein}}{\varepsilon_{fluor} \times \text{protein concentration}(M)} \times \text{dilution factor}$$

$\varepsilon_{fluor} = 70,000$ (FITC molar extinction coefficient)

Preparation of the FITC-labeled Fab-CAGE sample solution. The FITC-Fab solution (50 mM sodium borate, pH 8.5) was mixed with 6 CAGE variants at a volume ratio of 50%/50% (v/v %). Regarding CAGE (1:2), the FITC-Fab solution was mixed at volume ratios of 50%/50% (v/v %), 40%/60% (v/v %), and 30%/70% (v/v %). The mixed solutions were allowed to stand at room temperature for 1 hour. Subsequently, 300 µL of the mixed solutions obtained were used for the porcine skin penetrability test.

Preparation of the FITC-labeled Fab-CAGE-polysorbate sample solutions. Polysorbates 40 and 60 were mixed with the FITC-labeled Fab solution (50 mM sodium borate, pH 8.5) to obtain the final concentration of 3%. Subsequently, the resulting solutions were mixed with CAGE (1:2) at the volume ratios of 30%/70% (v/v %) [=30% CAGE (1:2)] or 40%/60% (v/v %) [=40% CAGE (1:2)]. Because of its nature of being solid at room temperature, polysorbate 60 was dissolved by 30-minute warming at 37° C. prior to the addition. Furthermore, the solution was warmed for 10 minutes at 37° C. to completely dissolve polysorbate 60 and was then mixed with CAGE (1:2). The resulting mixed solutions were allowed to stand at room temperature for 1 hour. The final concentration of antibodies was adjusted to 10 µg/mL.

Preparation of the porcine skin. In the porcine skin penetrability test, the cryopreserved skin of a WSP was unfrozen at room temperature. A pair of scissors were used to remove hair on the skin surface, followed by washing of the skin surface with PBS. The WSP skin, with the epidermis side upward, was set to the receiver chamber of a longitudinal diffusion cell (diffusion area: 1.77 cm2). The upper portion of the skin was filled with PBS (0.01% sodium azide). A contact gauge of conductivity was used to confirm skin conductivity at 100 Hz. The WSP skin with a resistivity of ≥5.65 kΩ/cm2 only was used in the porcine skin penetrability test based on previous studies [53,54].

Skin penetrability test using the porcine skin. The porcine skin was punched in a circle with a 36-mm diameter puncher. Subsequently, the porcine skin, with the epidermis side upward, was set on the receiver chamber of a longitudinal diffusion cell (diffusion area: 1.77 cm2). PBS (0.01% sodium azide, pH 7.4) was added into the interior of the receiver chamber and to the upper portion of the skin via a donor chamber, and the skin was allowed to stand in the incubator at 37° C. for 30 minutes. Meanwhile, the solution of the receiver chamber was stirred gently. The solution in the upper solution of the porcine skin was removed at 30 minutes later, and 300 µL each of 8 mixed solutions of FITF-Fab-CAGE variants were applied to the upper portion of the skin. The diffusion cell was returned to the incubator at 37° C., and the porcine skin penetrability test was conducted while stirring the solution in the receiver for 24 hours.

Confocal fluorescence microscopy. The WSP skin, whose skin resistivity had been confirmed to be ≥5.65 kΩ/cm2 and with the epidermis side upward, was set on the receiver chamber of a longitudinal diffusion cell (diffusion area: 1.77 cm2). PBS (0.01% sodium azide, pH 7.4) was added into the interior of the receiver chamber and to the upper portion of the skin, and the skin was allowed to stand in the incubator at 37° C. for 30 minutes. Meanwhile, the solution in the receiver chamber was stirred gently. The solution on top of the WSP skin was removed at 30 minutes later, and the sample mixed solution of FITC-labeled Fab and CAGE (1:2) was added. The diffusion cell was returned to the incubator at 37° C., and the porcine skin penetrability test was conducted while stirring the solution in the receiver chamber for 24 hours. Subsequently, the diffusion cell was removed at 24 hours later to wash the epidermis side of the skin with PBS twice. The skin was then punched in a circle with a 15-mm diameter puncher, followed by freezing with dry ice. The Lica CM1950™ cryostat was used to prepare the 20-□m frozen sections from the frozen skin. The upright Zeiss LSM 710 NLO™ ready was used to observe the frozen sections at an excitation wavelength of 488 nm and a fluorescence wavelength of 526 nm.

Results

Confocal fluorescence microscopy after the transdermal delivery of FITC-labeled Fab-CAGE (1:2). Six CAGE variants of different compositions were synthesized to examine the absorption-enhancing effect of the variants by fluorescence microscopy. CAGE variants improved the skin penetration of Fab in composition- and concentration-dependent manners (FIGS. 2 and 3, respectively). Various compositions of CAGE ranging from 1:1 to 1:4 were tested in their undiluted form. CAGE (1:2) exhibited the most potent skin penetration-enhancing effect of Fab (FIG. 2D). Fab by itself when delivered from PBS, did not penetrate beyond the stratum corneum (FIG. 2G). The dependence of skin delivery on CAGE concentration was explored using 1:2 as an example. Fab penetration increased monotonically with CAGE concentration.

Effects of CAGE (1:2) concentrations on Fab deactivation. ELISA was conducted to examine the antigen-recognizing ability of Fab in an attempt to verify whether Fab conformation is sustained after its combination with CAGE (1:2), i.e., whether Fab is deactivated. CAGE (1:2) in itself showed high absorbance indicative of coating and blocking of the antigen in ELISA. Therefore, Fab was first incubated with CAGE, CAGE subsequently removed, and then ELISA conducted. Dialysis was used for removing CAGE as it has been reported to be a method useful for removing DESs [41]. The absorbance of the undialyzed, aqueous solution of Fab was considered to be 100%. CAGE induced significant loss of signal to about 5% in ≥5% CAGE (1:2) compared to control, indicating that Fab was mostly deactivated (FIG. 4). This observation is in contrast to that for small proteins such as insulin which were shown to maintain their structure and activity upon exposure to CAGE.

Deactivation-preventing effect of polysorbates on antibodies in CAGE (1:2). In the present study, 4 polysorbates were examined as additives to prevent the deactivation of Fab in CAGE (1:2) (FIG. 5). Concretely, 3%, 5%, 8%, and 10% polysorbates were added to 30%, 40% and 50% CAGE (1:2) to examine the Fab deactivation-prevention effect (hereafter preventive effect) of polysorbates in CAGE (1:2). FIG. 6 shows the result obtained from polysorbate 20. Fab deactivation was prevented in CAGE (1:2) when adding≥3% (v/v) polysorbate 20 to the Fab-30% CAGE (1:2) mixed solution. The preventive effect nearly reached 100% in 5% and 8% polysorbate 20 and decreased slightly when adding 10% polysorbate. Furthermore, 20% and 30% polysorbates were added for comparison purposes. The preventive effect of polysorbates decreased in the presence of 40% CAGE (1:2) compared to 30% CAGE (1:2). 3% polysorbate showed about 50% preventive effect; however, the effect decreased with increasing polysorbate 20 concentrations and became comparable when adding 10% polysorbate 20 compared to 3% polysorbate 20. In case of 50% CAGE (1:2) an approximately 50% preventive effect was observed when 8% polysorbate 20 was added. However, Fab was mostly deactivated at other concentrations of polysorbate 20. FIG. 7 collectively shows the preventive effect of polysorbates 20, 40, 60, and 80 in 30% to 50% CAGE (1:2).

In the case of 30% CAGE (1:2) (FIG. 7A), all polysorbates generally exhibited excellent protective effect, although some specific trends were seen. In particular, in the case of 40% CAGE (FIG. 7B), a greater dependence of the protective effect on polysorbate composition was found. In case of 50% CAGE (FIG. 7C), a generally low level of protection was observed, although 8% polysorbate 20 exhibited high protection.

Confocal fluorescence microscopy for the transdermal delivery of FITC-labeled Fab in the presence of 3% polysorbate 40 or 3% polysorbate 60. It was next sought to determine whether the addition of polysorbates adversely impacts skin penetration. 3% polysorbate 60 in either 30% or 40% CAGE (1:2) was used in these experiments since>80% prevention of deactivation was observed. Comparable skin penetration of FITC-labeled Fab was verified in the presence of 30% CAGE alone or 30% CAGE+3% polysorbate 60 (FIGS. 8C and 8D). Similar results were found for 40% CAGE (FIGS. 8G and 8H). As controls, polysorbate alone or PBS did not induce skin penetration of Fab.

Discussion

Examined herein is the enhancing effect of 6 CAGE variants on skin penetration of Fab. CAGE (1:2) exhibited the most potent absorption-enhancing effect (FIG. 2) in line with the previous study [40]. Furthermore, the effects of CAGE concentrations on the skin penetration of Fab were examined. Fab exhibited concentration-dependent skin penetration (FIG. 3). Previous studies based on FTIR measurement have demonstrated that the effect of CAGE on skin penetration is mediated by the effect on lipids. Without wishing to be bound by theory, it is contemplated herein that the concentration-dependent absorption-enhancing effect of CAGE on transdermally delivered Fab (FIG. 3) was mediated by a concentration-dependent effect on the lipids.

Figure 4:
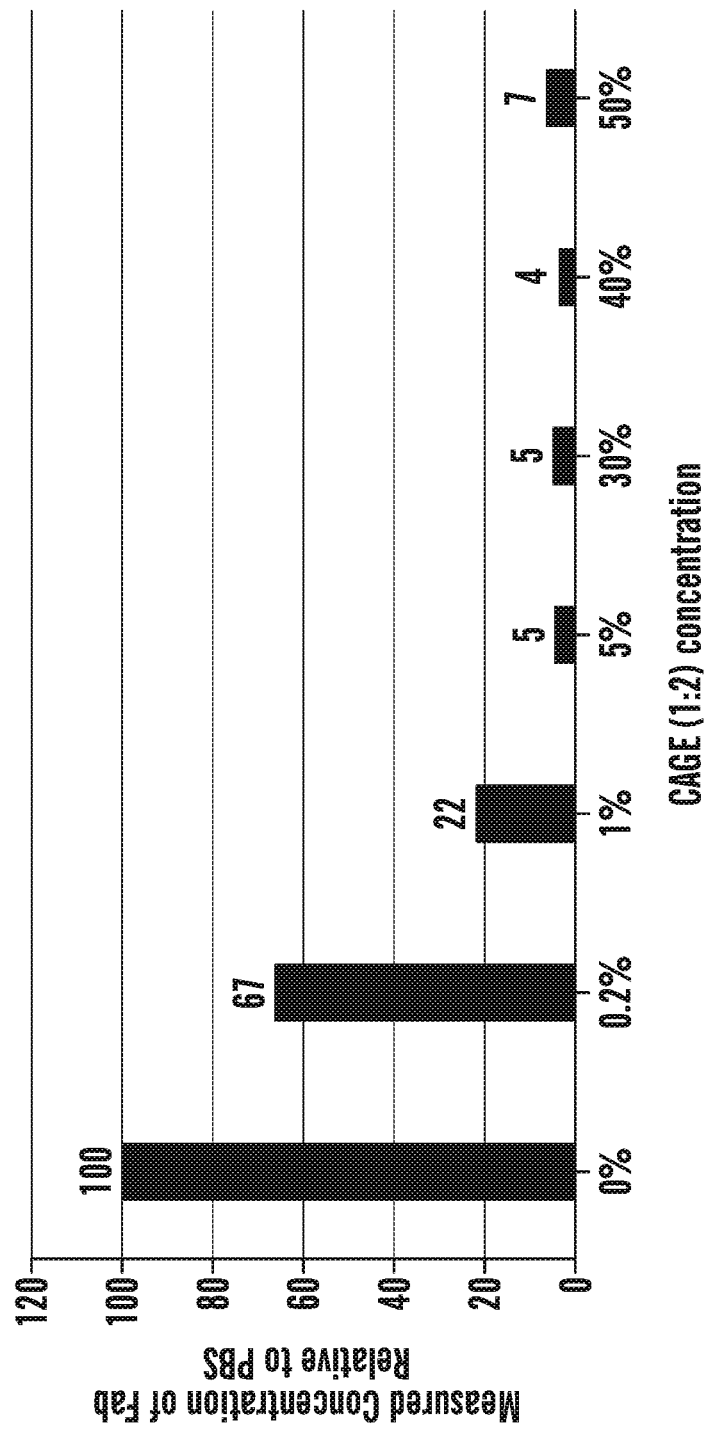
FIG. 4 depicts the effect of CAGE (1:2) concentrations on Fab deactivation. The Fab concentration is 10 μg/mL in 10 mM phosphate buffer.

Some ionic liquids and DESs have been known to stabilize the structure of proteins, while others denature proteins. Experimental studies [46,47,55,56], in silico studies [42,57], as well as experimental and in silico studies [43,45] of these materials have been conducted. ELISA indicated that the Fab was deactivated in a concentration dependent manner (FIG. 4), however, the mechanisms of this deactivation are unclear. Additives capable of preventing Fab deactivation while sustaining the transdermal absorption-enhancing effect of CAGE (1:2) were investigated. The major categories of these materials are include hydrophobic interaction stabilizers [62,63], water-structure makers that stabilize the hydrogen bonding [64], and electrostatic interaction stabilizers [63,65].

Figure 5:
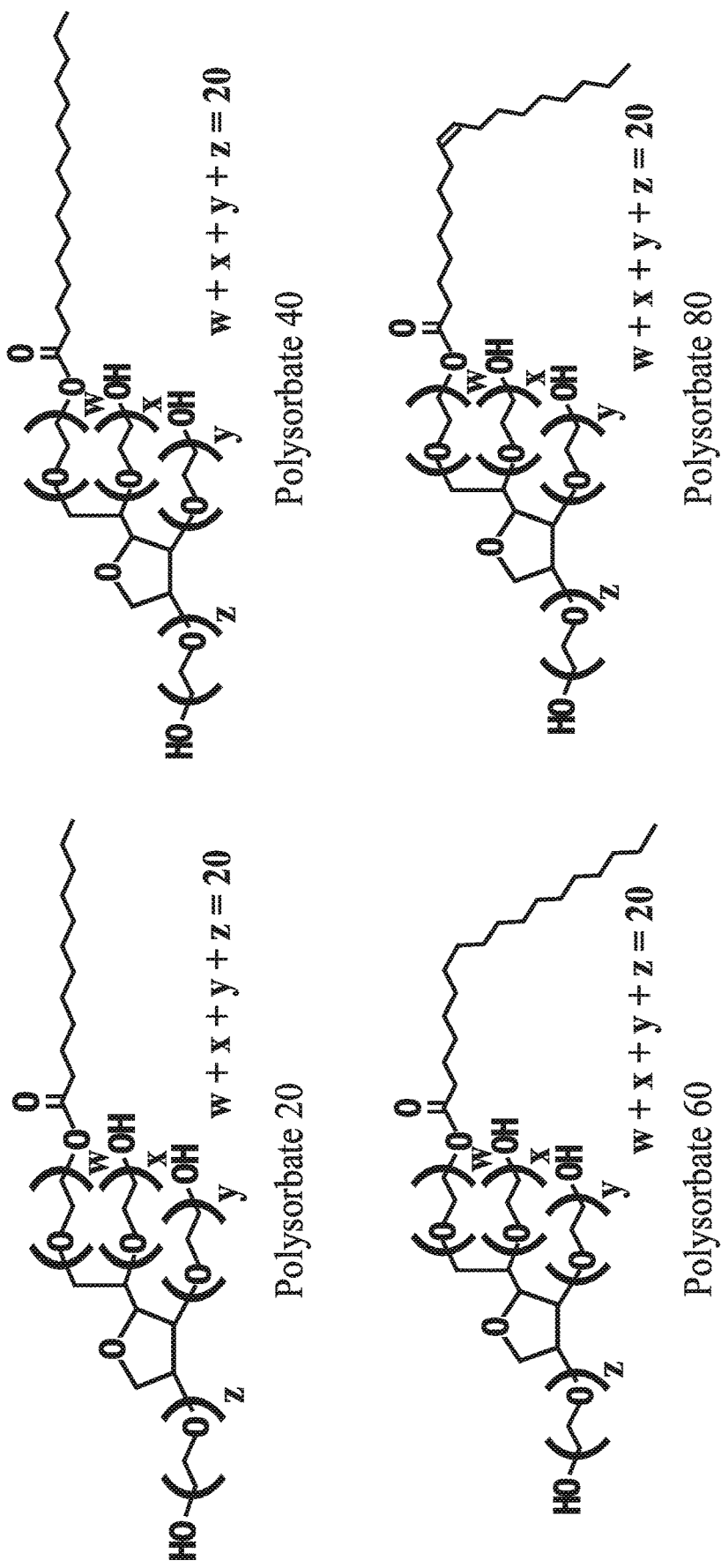
FIG. 5 depicts the structures of 4 polysorbates.
Figure 6:
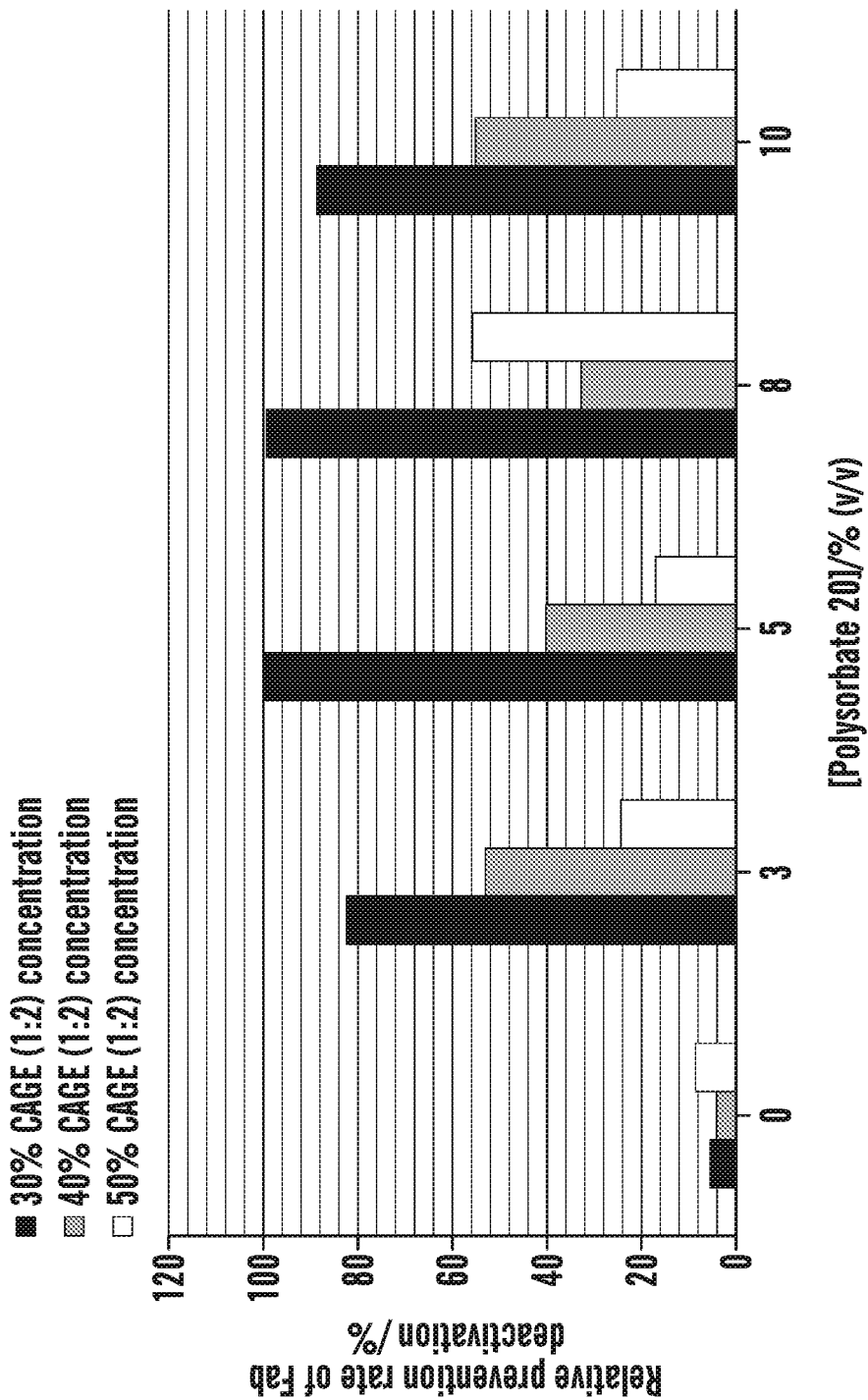
FIG. 6 depicts the preventive effect of polysorbate 20 on Fab deactivation in the presence of 30%, 40%, and 50% CAGE (1:2). The Fab concentration is 10 μg/mL in 10 mM phosphate buffer.

Described herein is the investigation of 4 polysorbates as additives to prevent Fab deactivation in CAGE (1:2) (FIG. 5). All 4 polysorbates are nonionic surfactants that have the common backbone and the different side chains of fatty acids. Their structures afford hydrophobicity and hydrophilicity by means of the hydrocarbon chain and the ethylene oxide subunit, respectively. The Food and Drug Administration has indicated a maximal dose of polysorbates for topical application of ≤10% (w/w) for all 4 polysorbates [66]. The driving forces for interactions between ionic liquids and proteins are hydrophobic interaction [67], hydrogen bonding, and electrostatic interaction, and protein deactivation induced by ionic liquids is caused by these interactions [48,49]. Without wishing to be bound by theory, it is contemplated herein that one or more of hydrophobic interaction, hydrogen bonding, and electrostatic interaction are involved in Fab deactivation in CAGE (1:2).

Figure 7A:
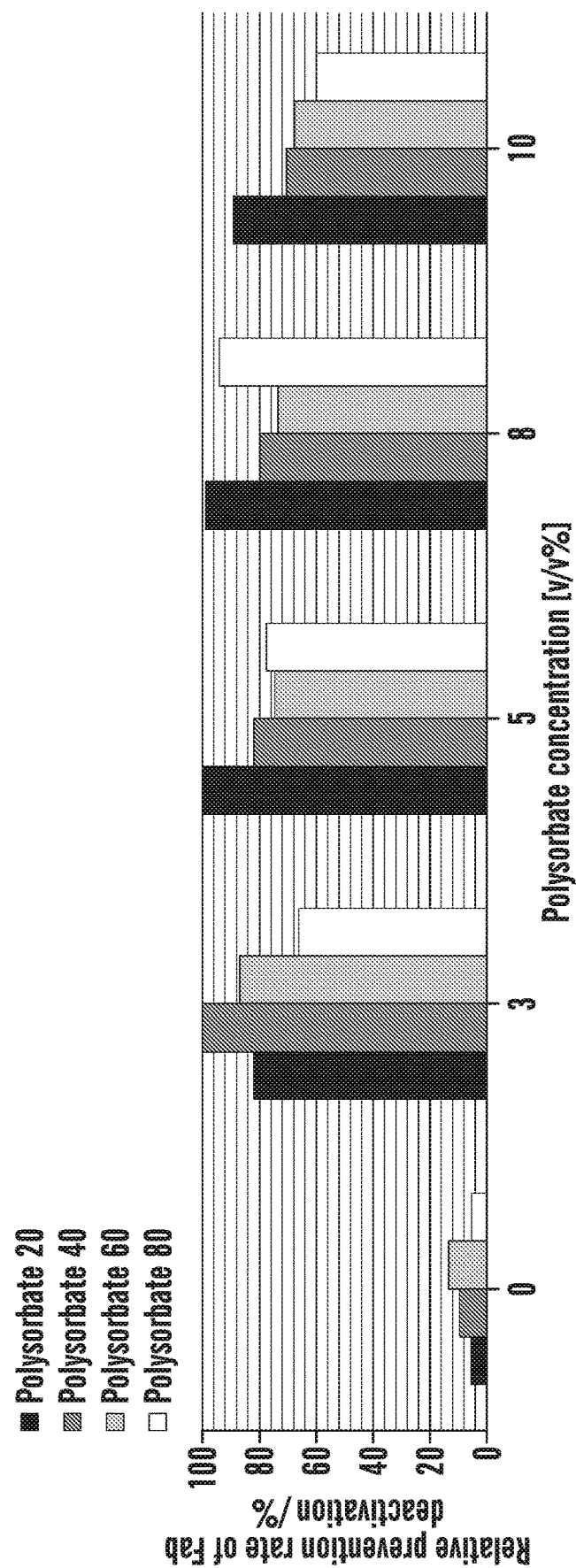
FIGS. 7A-7C depict the preventive effect of 4 polysorbates on Fab deactivation in the presence of CAGE (1:2).
Figure 7B:
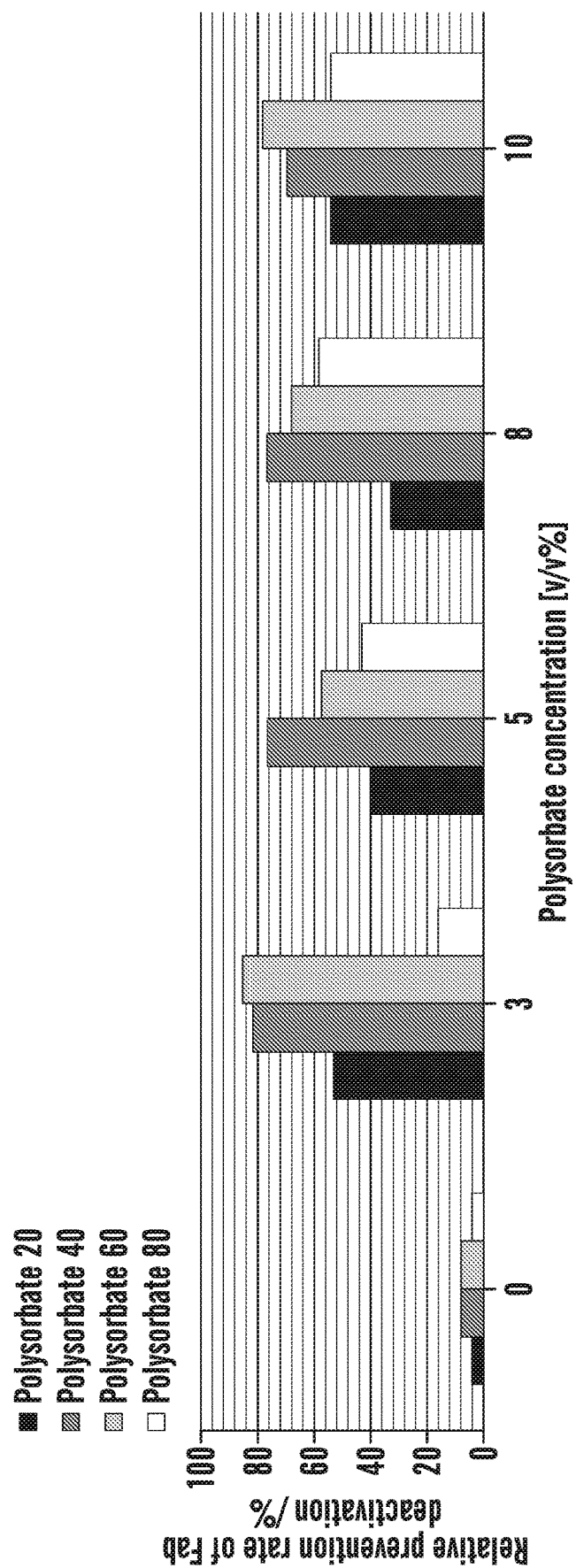
Figure 7C:
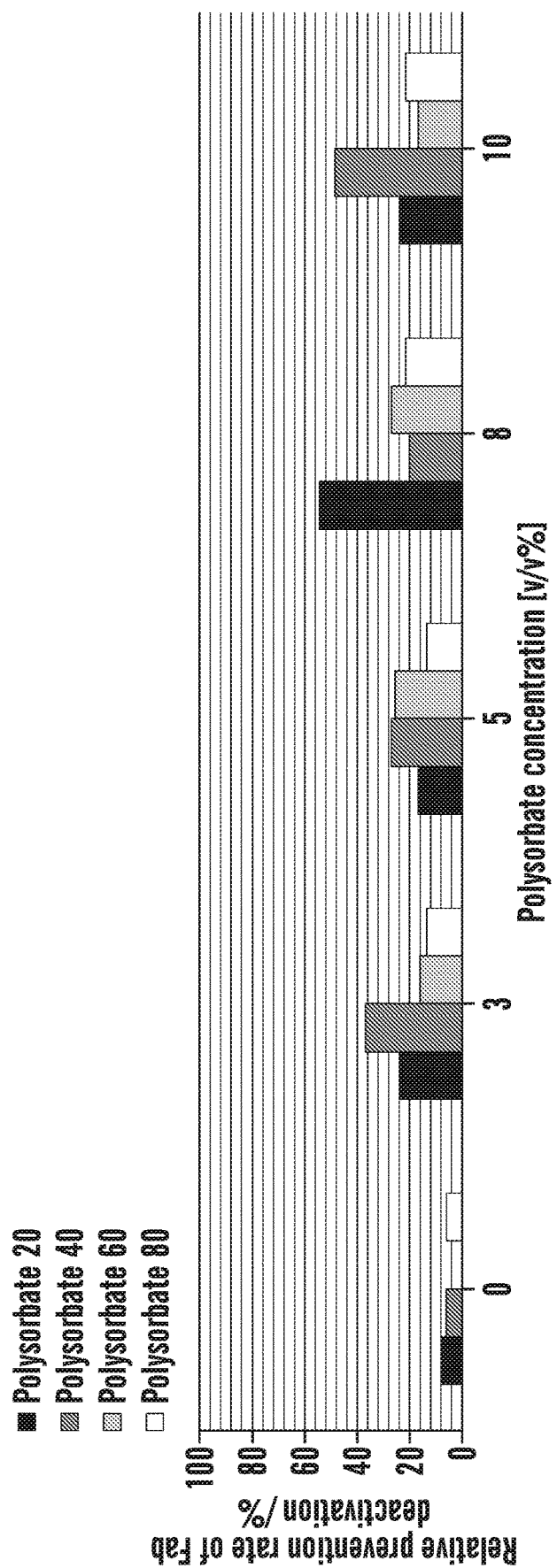

Polysorbate 20 and polysorbate 40 have similar structures, and differ in the length of the alkyl chain (FIG. 5). Namely, the degree of hydrophobic interaction with Fab differs between polysorbate 20 and polysorbate 40. As illustrated in FIGS. 7A and 7B, polysorbate 40 prevented Fab deactivation at a lower concentration than did polysorbate 20 suggesting the importance of hydrophobic interaction between polysorbate and Fab. Furthermore, polysorbate 40 and polysorbate 60 showed the equivalent Fab deactivation-preventing effects, thus supporting the importance of hydrophobic interaction between polysorbates and Fab (FIG. 7B).

In the presence of 30% and 40% CAGE (1:2), polysorbate 80 needs to be at a higher concentration compared to polysorbate 40 and polysorbate 60 to exert the Fab deactivation-preventing effect. Therefore, polysorbate 40 and polysorbate 60 were more effective. To date, polysorbate 40 and polysorbate 60 have not been reported to be more effective than polysorbate 20 and polysorbate 80 as additives for protein conformation.

In the presence of 30% CAGE (1:2), 3% to 8% of all polysorbates showed ≥80% preventive effect. In the presence of 40% CAGE (1:2), however, the preventive effect of polysorbates was reduced; 3% polysorbate 40 and 3% polysorbate 60 were most effective. 3% polysorbate 40 and 3% polysorbate 60 even in the presence of 40% CAGE (1:2) showed the preventive effect (≥80%) equivalent to that in the presence of 30% CAGE (1:2).

In an aqueous solution, polysorbate 20 and polysorbate 80 interact with the Fab region of antibodies, not the Fc region [69]. Fab may be protected from its deactivation caused by CAGE (1:2) through the interactions with the Fab region of polysorbates 40 and 60 that are similar in structure to polysorbate 20 and 80, respectively.

The maximal doses of polysorbates for topical application have been indicated, and the adverse reactions of topically applied polysorbates were reported recently [66,70-72]. It is desirable to minimize the doses of polysorbates from the viewpoint of toxicity, although there are differences in the indicated maximal doses [73]. In the present study, 3% polysorbate 40 and 3% polysorbate 60 showed the most potent preventive effect. Namely, 3% was favorable from the viewpoint of toxicities because of being lower than the maximal dose and other polysorbate concentrations.

Results from fluorescence microscopy indicate that 3% polysorbate 60 or polysorbate 40 do not adversely impact skin penetration of Fab (FIG. 8D). 3% polysorbate 40 alone did not impact skin penetration of the Fab. Results from the present study indicate the optimal formulation of ionic liquid [30% CAGE (1:2) and 40% CAGE (1:2)] including surfactants [(3% polysorbate 40 and 3% polysorbate 60)] that allows the transdermal delivery of Fab without causing its deactivation.

REFERENCES

[1] J. D. Bos, M. M. H. M. Meinardi, The 500 Dalton rule for the skin penetration, Exp. Dermatol. 9 (2000), 165-169.

[2] S. Li, W. Li, M. Prausnitz, Individually coated microneedles for co-delivery of multiple compounds with different properties, Drug Deliv. Transl. Res. 8 (2018), 1043-1052.

[3] I. C. Lee, W. M. Lin, J. C. Shu, S. W. Tsai, C. H. Chen, M. T. Tsai, Formulation of two-layer dissolving polymeric microneedle patches for insulin transdermal delivery in diabetic mice, J. Biomed. Mater. Res. A. 105 (2017), 84-93.

[4] M. C. Chen, M. H. Ling, S. J. Kusuma, Poly-γ-glutamic acid microneedles with a supporting structure design as a potential tool for transdermal delivery of insulin, Acta Biomater. (2015), 106-116.

[5] M. H. Ling, M. C. Chen, Dissolving polymer microneedle patches for rapid and efficient transdermal delivery of insulin to diabetic rats, Acta Biomater. 11 (2013), 8952-8961.

[6] M. Hultström, N. Roxhed, L. Nordquist, Intradermal insulin delivery: a promising future for diabetes management, J. Diabetes Sci. Technol. 3 (2014), 453-457.

[7] R. Rao, S. Nanda, Sonophoresis: recent advancements and future trends, J. Pharm. Pharmacol. 6 (2009), 689-705.

[8] P. Batheja, R. Thakur, B. Michniak, Transdermal iontophoresis, Expert Opin. Drug Deliv. 1 (2006), 127-138.

[9] C. M. Schoellhammer, D. Blankschtein, R. Langer, Skin permeabilization for transdermal drug delivery: recent advances and future prospects, Expert Opin. Drug Deliv. 3 (2014), 393-407.

[10] T. Han, D. B. Das, Permeability enhancement for transdermal delivery of large molecule using low-frequency sonophoresis combined with microneedles, J. Pharm. Sci. 102 (2013), 3614-22.

[11] H. Kalluri, A. K. Banga, Transdermal delivery of proteins, AAPS PharmSci. Tech. 12 (2011), 431-441.

[12] B. E. Polat, D. Blankschtein, R. Langer, Low-frequency sonophoresis: application to the transdermal delivery of macromolecules and hydrophilic drugs, Expert Opin. Drug Deliv. 7 (2010), 1415-1432.

[13] S. Katikaneni, G. Li, A. Badkar, A. K. Banga, Transdermal delivery of a approximately 13 kD protein—an in vivo comparison of physical enhancement methods, J. Drug Target. 18 (2010), 141-147.

[14] S. Del Rio-Sancho, C. Cros, B. Coutaz, M. Cuendet, Y. N. Kalia, Cutaneous iontophoresis of µ-conotoxin CnIIIC-A potent NaV1.4 antagonist with analgesic, anaesthetic and myorelaxant properties, Int. J. Pharm. 518 (2017), 59-65.

[15] D. S. Bernardi, C. Bitencourt, D. S. da Silveira, E. L. da Cruz, M. A. Pereira-da-Silva, L. H. Faccioli, R. F. Lopez, Effective transcutaneous immunization using a combination of iontophoresis and nanoparticles, Nanomedicine. 12 (2016), 2439-2448.

[16] K. Ita, Transdermal delivery of heparin: Physical enhancement techniques, Int. J. Pharm. 496 (2015), 240-249.

[17] G. Krishnan, M. S. Roberts, J. Grice, Y. G. Anissimov, H. R. Moghimi, H. A. Benson, Iontophoretic skin permeation of peptides: an investigation into the influence of molecular properties, iontophoretic conditions and formulation parameters, Drug Deliv Transl. Res. 4 (2014), 222-232.

[18] K. Sahu, M. Kaurav, R. S. Pandey, Protease loaded permeation enhancer liposomes for treatment of skin fibrosis arisen from second degree burn, Biomed. Pharmacother. 94 (2017), 747-757.

[19] M. S. Kapoor, S. GuhaSarkar, R. Banerjee, Stratum corneum modulation by chemical enhancers and lipid nanostructures: implications for transdermal drug delivery, Ther. Deliv. 8 (2017), 701-718.

[20] M. Kopečná, M. Macháček, E. Prchalová, P. Štěpánek, P. Drašar, M. Kotora, V. K. ávrová, Galactosyl pentadecene reversibly enhances transdermal and topical drug delivery, Pharm. Res. 34 (2017), 2097-2108.

[21] M. Vij, S. Alam, N. Gupta, V. Gotherwal, H. Gautam, K. M. Ansari, D. Santhiya, V. T. Natarajan, M. Ganguli, Non-invasive oil-based method to increase topical delivery of nucleic acids to skin, Mol. Ther. 25 (2017), 1342-1352.

[22] H. Kaplon, J. M. Reichert, Antibodies to watch in 2018, MAbs. 10 (2018), 183-203.

[23] R. Vaishya, V. Khurana, S. Patel, A. K. Mitra, Long-term delivery of protein therapeutics, Expert Opin. Drug Deliv. 12 (2015), 415-440.

[24] R. G. Jones, A. Martino, Targeted localized use of therapeutic antibodies: a review of non-systemic, topical and oral applications, Crit. Rev. Biotechnol. 36 (2016), 506-520.

[25] M. Streit, Z. Beleznay, L. R. Braathen, Topical application of the tumour necrosis factor-alfa antibody infliximab improves healing of chronic wounds, Wound J. 3 (2006), 171-179.

[26] M. Veselinovic, C. P. Neff, L. R. Mulder, Topical gel formulation of broadly neutralizing anti-HIV-1 monoclonal antibody VRC01 confers protection against HIV-1 vaginal challenge in a humanized mouse model, Virology. 432 (2012), 505-510.

[27] Z. Korkmaz, N. Ruzehaji, C. Tumer, H. Iwata, R. J. Ludwig, D. Zillikens, D. F. Murrell, A. J. Cowin, Topically applied flightless I neutralizing antibodies improve healing of blistered skin in in a murine model of epidermolysis bullosa acquisita, J. Invest. Dermatol. 133 (2013), 1008-1016.

[28] H. Haidari, Q. Zhang, E. Melville, Z. Kopecki, Y. Song, A. Cowin, S. Garg, Development of topical delivery systems for flightless neutralizing antibody, J. Pharm. Sci. 106 (2017), 1795-1804.

[29] E. Korkmaz, E. E. Friendrich, M. H. Ramadan, G. Erdos, A. R. Mathers, O. B. Ozdoganlar, N. R. Washburn, L. D. FaloJr, Therapeutic intradermal delivery of tumor necrosis factor-alpha antibodies using tip-loaded dissolvable microneedle arrays, Acta Biomaterials. 24 (2015), 96-105.

[30] S. P. Kelley, A. Narita, J. D. Holbrey, K. D. Green, W. M. Reichert, R. D. Rogers, Understanding the effects of ionicity in salts, solvates, co-crystals, ionic co-crystals, and ionic liquids, rather than nomenclature, is critical to understanding their behavior, Crystal Growth and Design. 13 (2013), 965-975.

[31] A. P. Abbott, D. Boothby, G. Capper, D. L. Davies, R. K. Rasheed, Deep eutectic solvents formed between choline chloride and carboxylic acids: versatile alternatives to ionic liquids, J. Am. Chem. Soc. 126 (2014), 9142-9147.

[32] C. Agatemor, K. N. Ibsen, E. E. L. Tanner, S. Mitragotri, Ionic liquids for addressing unmet needs in healthcare, Bioeng. Transl. Med. 3 (2018), 7-25.

[33] Bica K, Shamshina J, Hough W L, MacFarlane D R & Rogers R D, Liquid forms of pharmaceutical co-crystals: Exploring the boundaries of salt formation, Chem Commun (Camb). 47 (2011), 2267-2269.

[34] Whitney L. Hough, Marcin Smiglak, Héctor Rodríguez, Richard P. Swatloski, Scott K. Spear, Daniel T. Daly, Juliusz Pernak, Judith E. Grisel, Richard D. Carliss, Morgan D. Soutullo, James H. Davis, Jr., Robin D. Rogers, The third evolution of ionic liquids: active pharmaceutical ingredients, New J. of Chem. 31 (2007), 1429-1436.

[35] Weaver K D, Kim H J, Sun J, MacFarlane D R, Elliott G D, Cyto-toxicity and biocompatibility of a family of choline phosphate ionic liquids designed for pharmaceutical applications, Green Chemistry. 12 (2010), 507-513.

[36] K. S. Egorova, E. G. Gordeev, V. P. Ananikov, Biological activity of ionic liquids and their application in pharmaceutics and medicine, Chem. Rev. 117 (2017), 7132-7189.

[37] M. Zakrewsky, K. S. Lovejoy, T. L. Kern, T. E. Miller, V. Le, A. Nagy, A. M. Goumas, R. S. Iyer, R. E. Del Sesto, A. T. Koppisc, D. T. Fox, S. Mitragotri, Ionic liquids as a class of materials for transdermal delivery and pathogen neutralization, Proc. Natl. Acad. Sci. 111 (2014), 13313-13318.

[38] P. Karande, A. Jain, K. Ergun, V. Kispersky, S. Mitragotri, Design principles of chemical penetration enhancers for transdermal drug delivery, Proc. Natl. Acad. Sci. USA. 102 (2005) 4688-4693

[39] A. Banerjee, K. N. Ibsen, Y. Iwao, M. Zakrewsky, S. Mitragotri, Transdermal protein delivery using choline and geranate (CAGE) deep eutectic solvent. Adv. Healthc. Mater. (2017), doi: 10.1002/adhm.201601411.

[40] E. E. L. Tanner, K. N. Ibsen, S. Mitragotri, Transdermal insulin delivery using choline-based ionic liquids (CAGE), J Control Release. 286 (2018), 137-144.

[41] R. Esquembre, J. M. Sanz, J. G. Wall, F. del Monte, C. R. Mateo, M. L. Ferrer, Thermal unfolding and refolding of lysozyme in deep eutectic solvents and their aqueous dilutions, Phys. Chem. Chem. Phys. 15 (2013), 11248-11256.

[42] B. Uralcan, S. B. Kim, C. E. Markwalter, R. K. Prud'homme, P. G. Debenedetti, A computational study of the ionic liquid-induced destabilization of the miniprotein, Trp-Cage, J. Phys. Chem. B. 122 (2018), 5707-5715.

[43] M. Zhang, Y. Wang, H. Zhang, J. Cao, Z. Fei, Y. Wang, Impact of the alkyl chain length on binding of imidazolium-based ionic liquids to bovine serum albumin, Spectrochim. Acta A Mol. Biomol. Spectrosc. 196 (2018), 323-333.

[44] C. Schröder, Proteins in ionic liquids: current status of experiments and simulations, Top Curr. Chem. (Chain). 375 (2017), doi: 10.1007/s41061-017-0110-2.

[45] V. Lesch, A. Heuer, V. A. Tatsis, C. Holm, J. Smiatek, Peptides in the presence of aqueous ionic liquids-tunable co-solutes as denaturants or protectants?, Phys. Chem. Chem. Phys. 17 (2015), 26049-26053.

[46] W. Li, P. Wu, Insights into the deactivation of bovine serum albumin with a thermo-responsive ionic liquid, Soft Matter. 10 (2014), 6161-6171.

[47] B. K. Paul, A. Ganguly, N. Guchhait, Deciphering the interaction of a model transport protein with a prototypical imidazolium room temperature ionic liquid: effect on the conformation and activity of the protein, J. Photochem. Photobiol. B. 133 (2014), 99-107.

[48] J. K. Maurya, M. U. Mir, U. K. Singh, N. Maurya, N. Dohare, S. Patel, A. Ali, R. Patel, Molecular investigation of the interaction between ionic liquid type gemini surfactant and lysozyme-A spectroscopic and computational approach, Biopolymers. 103 (2015), 406-415.

[49] M. Silva, A. M. Figueiredo, E. J. Cabrita, Epitope mapping of imidazolium cations in ionic liquid-protein interactions unveils the balance between hydrophobicity and electrostatics towards protein destabilisation, Phys. Chem. Chem. Phys. 16 (2014), 23394-23403.

[50] T. Nakano, S. Kawamoto, C. Y. Lai, T. Sasaki, T. Aki, S. Shigeta, T. Goto, S. Sato, S. Goto, C. L. Chen, K. Ono, Liver transplantation-induced antihistone H1 autoantibodies suppress mixed lymphocyte reaction, Transplantation. 77 (2004), 1595-603.

[51] K. C. Chiang, Y. Shimada, T. Nakano, C. Y. Lai, L. W. Hsu, S. Goto, N. Ohmori, K. Mon, T. Miyagi, S. Kawamoto, K. Ono, C. L. Chen, T. Goto, S. Sato, A novel peptide mimotope identified as a potential immunosuppressive vaccine for organ transplantation, J. Immunol. 182 (2008), 4282-4288.

[52] F. J. Eller, R. J. Bartelt, B. S. Shasha, D. J. Schuster, D. G. Riley, P. A. Stansly, T. F. Mueller, K. D. Shuler, B. Johnson, J. H. Davis, C. A. Sutherland, Aggregation pheromone for the pepper weevil, *Anthonomus eugenii cano* (Coleoptera: Curculionidae): Identification and field activity, J. Chem. Ecol. 20 (1994), 1537-1555.

[53] P. Karande, A. Jain, S. Mitragotri, Discovery of transdermal penetration enhancers by high-throughput screening, Nature Biotec. 22 (2004), 192-197.

[54] D. J. Davies, R. J. Ward, J. R. Heylings, Multi-species assessment of electrical resistance as a skin integrity marker for in vitro percutaneous absorption studies, Toxicol. in vitro. 18 (2004), 351-358.

[55] U. K. Singh, R. Patel, Dynamics of ionic liquid-assisted refolding of denatured cytochrome c: a study of preferential interactions toward renaturation, Mol. Pharm. 15 (2018), 2684-2697.

[56] O. C. Fiebig, E. Mancini, G. Caputo, T. D. Vaden, Quantitative evaluation of myoglobin unfolding in the presence of guanidinium hydrochloride and ionic liquids in solution, J. Phys. Chem. B. 118 (2013), 406-412.

[57] Q, Shao, On the influence of hydrated imidazolium-based ionic liquid on protein structure stability: a molecular dynamics simulation study, J. Chem. Phys. 139 (2013), 115102. doi: 10.1063/1.4821588.

[58] A. G. Bakera, W. T. Hellera, Small-angle neutron scattering studies of model protein deactivation in aqueous solutions of the ionic liquid 1-butyl-3-methylimidazolium chloride, Chem. Eng. J. 147 (2009), 6-12.

[59] G. J. Jr. Thomas, B. Prescott, C. R. Middaugh, G. W. Litman, Raman spectra and conformational structures of Fab mu and (Fc)5 mu fragments of cryoglobulin IgM-kappa McE, Biochim. Biophys. Acta. 577 (1979), 285-290.

[60] G. M. Cheetham, G. Hale, H. Waldmann, A. C. Bloomer, Crystal structures of a rat anti-CD52 (CAMPATH-1) therapeutic antibody Fab fragment and its humanized counterpart, J. Mol. Biol. 284 (1998), 85-99.

[61] F. Zhang, X. Qi, X. Wang, D. Wei, J. Wu, L. Feng, H. Cai, Y. Wang, N. Zeng, T. Xu, A. Zhou, Y. Zheng, Structural basis of the therapeutic anti-PD-L1 antibody atezolizumab, Oncotarget. 8 (2017), 90215-90224.

[62] T. A. Khan, H. C. Mahler, R. S. Kishore, Key interactions of surfactants in therapeutic protein formulations: A review, Eur. J. Pharm. Biopharm. 97(Pt A) (2015), 60-67.

[63] S. Wang, G. Wu, X. Zhang, Z. Tian, N. Zhang, T. Hu, W. Dai, Stabiling two IgG1 monoclonal antibodies by surfactants: Balance between aggregation prevention and structure perturbation, Eur. J. Pharm. Biopharm. 114 (2017), 263-277.

[64] N. K. Jain, I. Roy, Effect of trehalose on protein structure, Protein Sci. 18 (2009), 24-36.

[65] P. Stärtzel, Arginine as an excipient for protein freeze-drying: A mini review, J. Pharm. Sci. 107 (2018), 960-967.

[66] https://www.accessdata.fda.gov/scripts/cder/iig/index.cfm?event=browsebyletter.page&letter=p

[67] M. Kumari, J. K. Maurya, M. Tasleem, P. Singh, R. Patel, Probing HSA-ionic liquid interactions by spectroscopic and molecular docking methods, J. Photochem. Photobiol. B. 138 (2014), 27-35.

[68] S. Deechongkit, J. Wen, L. O. Narhi, Y. Jiang, S. S. Park, B. A. Kerwin, Physical and biophysical effects of polysorbate 20 and 80 on darbepoetin alfa, J. Pharm. Sci. 98 (2009), 3200-3217.

[69] S. M. Singh, S. Bandi, D. N. M. Jones, K. M. G. Mallela, Effect of polysorbate 20 and polysorbate 80 on the higher-order structure of a monoclonal antibody and its Fab and Fc fragments probed using 2D nuclear magnetic resonance spectroscopy, J. Pharm. Sci. 106 (2017), 3486-3498.

[70] S. K. Singh, H. C. Mahler, C. Hartman, C. A. Stark, Are injection site reactions in monoclonal antibody therapies caused by polysorbate excipient degradants?, J. Pharm. Sci. pii: S0022-3549 (2018), 30451-30459.

[71] I. L. Budyak, B. L. Doyle, W. F. Weiss, Technical decision-making with higher order structure data: specific binding of a nonionic detergent perturbs higher order structure of a therapeutic monoclonal antibody. J. Pharm. Sci. 104 (2015), 1543-1547.

[72] S. Hermeling, W. Jiskoot, D. J. Crommelin, H. Schellekens, Reaction to the paper: interaction of polysorbate 80 with erythropoietin: a case study in protein-surfactant interaction, Pharm. Res. 23 (2006), 641-642.

[73] B. A. Kerwin, Polysorbate 20 and 80 used in the formulation of protein biotherapeutics: Structure and degradation pathways, J. Pharm. Sci. 97 (2008), 2924-2935.

What is claimed herein is:

1. A combination of an active compound comprising a polypeptide and a composition comprising:
   a) an ionic liquid at a concentration of at least 1% v/v; and
   b) at least one non-ionic surfactant comprising a neutral hydrophilic head group at a concentration of 3% w/v to 10% w/v;
   formulated for oral administration or for administration to a mucus membrane, wherein the mucus membrane is nasal, oral, or vaginal.

2. The combination of claim 1, wherein the at least one non-ionic surfactant is a polysorbate.

3. The combination of claim 2, wherein the polysorbate is selected from the group consisting of polysorbate 20, polysorbate 40, polysorbate 60, and polysorbate 80.

4. The combination of claim 1, wherein the ionic liquid is Choline And GEranate (CAGE).

5. The combination of claim 4, wherein the CAGE comprises a ratio of choline:geranic acid or geranate from 2:1 to 1:10.

6. The combination of claim 1, wherein the ionic liquid's anion comprises geranate and/or geranic acid.

7. The combination of claim 1, wherein the active compound has a molecular weight of greater than 450.

8. The combination of claim 1, wherein the active compound is polar.

9. The combination of claim 1, wherein the active compound comprises an antibody or antibody reagent.

10. The combination of claim 9, wherein the antibody reagent is a nanobody.

11. The combination of claim 1, wherein the active compound comprises insulin.

12. The combination of claim 1, wherein the combination further comprises a pharmaceutically acceptable carrier.

13. The combination of claim 1, wherein the combination is provided in a degradable capsule formulated for oral administration.

14. The combination of claim 1, wherein the combination is provided in one or more nanoparticles.

15. A method of administering at least one active compound to a subject, the method comprising administering the combination of claim 1.

16. The combination of claim 1, wherein the active compound comprises a GLP-1 polypeptide or mimetic or analog thereof.

17. The combination of claim 1, wherein the non-ionic surfactant comprising a neutral hydrophilic head group is polysorbate 40 or polysorbate 60.

18. The combination of claim 1, wherein the ionic liquid has a ratio of cation: anion from 1:1 to 1:4.

19. The combination of claim 18, wherein the non-ionic surfactant comprising a neutral hydrophilic head group is polysorbate 40 or polysorbate 60.

* * * * *